United States Patent
Bruck et al.

(10) Patent No.: US 9,890,970 B2
(45) Date of Patent: Feb. 13, 2018

(54) PROCESSING AND REPORTING USAGE INFORMATION FOR AN HVAC SYSTEM CONTROLLED BY A NETWORK-CONNECTED THERMOSTAT

(71) Applicant: Google Inc., Mountain View, CA (US)

(72) Inventors: Timo A. Bruck, Mountain View, CA (US); Evan J. Fisher, Mountain View, CA (US); James B. Simister, Mountain View, CA (US); Yoky Matsuoka, Mountain View, CA (US); David Sloo, Mountain View, CA (US); Clemens M. Knieper, Mountain View, CA (US); Anthony Michael Fadell, Mountain View, CA (US); Matthew Lee Rogers, Mountain View, CA (US); Michael Plitkins, Mountain View, CA (US); Mark Malhotra, Mountain View, CA (US)

(73) Assignee: Google Inc., Mountain View, CA (US)

( * ) Notice: Subject to any disclaimer, the term of this patent is extended or adjusted under 35 U.S.C. 154(b) by 651 days.

(21) Appl. No.: 14/389,243

(22) PCT Filed: Mar. 29, 2013

(86) PCT No.: PCT/US2013/034718
§ 371 (c)(1),
(2) Date: Sep. 29, 2014

(87) PCT Pub. No.: WO2013/149210
PCT Pub. Date: Oct. 3, 2013

(65) Prior Publication Data
US 2015/0051741 A1    Feb. 19, 2015

Related U.S. Application Data

(63) Continuation-in-part of application No. 13/434,560, filed on Mar. 29, 2012, now Pat. No. 9,453,655.

(51) Int. Cl.
G05B 13/00 (2006.01)
F24F 11/00 (2018.01)
G05D 23/19 (2006.01)

(52) U.S. Cl.
CPC ...... *F24F 11/0086* (2013.01); *G05D 23/1902* (2013.01); *F24F 11/0012* (2013.01);
(Continued)

(58) Field of Classification Search
None
See application file for complete search history.

(56) References Cited

U.S. PATENT DOCUMENTS 3,991,357 A   11/1976   Kaminski
4,183,290 A   1/1980   Kucharczyk
(Continued)

FOREIGN PATENT DOCUMENTS

CA   2202008    2/2000
DE   19609390   9/1997
(Continued)

OTHER PUBLICATIONS

SCE Energy$mart Thermostat Study for Southern California Edison—Presentation of Study Results, Population Research Systems, Project #1010, Nov. 10, 2004, 51 pages.
(Continued)

*Primary Examiner* — Wissam Rashid
(74) *Attorney, Agent, or Firm* — Kilpatrick Townsend & Stockton LLP

(57) ABSTRACT

Systems and methods are described for interactively, graphically displaying and reporting performance information to a user of an HVAC system controlled by a self-programming network-connected thermostat. The information is made on a remote display device such as a smartphone, tablet computer or other computer, and includes a graphical daily or
(Continued)

monthly summary each of several days or months respectively. In response to a user selection of a day, detailed performance information is graphically displayed that can include an indication of HVAC activity on a timeline, the number of hours of HVAC activity, as well as one or more symbols on a timeline indicating setpoint changes, and when a setpoint was changed due to non-occupancy.

16 Claims, 48 Drawing Sheets

(52) U.S. Cl.
CPC ............... *F24F 2011/0071* (2013.01); *F24F 2011/0075* (2013.01); *F24F 2011/0091* (2013.01)

(56) References Cited

U.S. PATENT DOCUMENTS

| | | | |
|---|---|---|---|
| 4,223,831 A | 9/1980 | Szarka |
| 4,316,577 A | 2/1982 | Adams et al. |
| 4,335,847 A | 6/1982 | Levine |
| 4,460,125 A | 7/1984 | Barker et al. |
| 4,621,336 A | 11/1986 | Brown |
| 4,751,961 A | 6/1988 | Levine et al. |
| 4,768,706 A | 9/1988 | Parfitt |
| 4,847,781 A | 6/1989 | Brown, III et al. |
| 4,897,798 A | 1/1990 | Cler |
| 4,971,136 A | 11/1990 | Mathur et al. |
| 5,005,365 A | 4/1991 | Lynch |
| D321,903 S | 11/1991 | Chepaitis |
| 5,088,645 A | 2/1992 | Bell |
| 5,211,332 A | 5/1993 | Adams |
| 5,224,648 A | 7/1993 | Simon et al. |
| 5,224,649 A | 7/1993 | Brown et al. |
| 5,240,178 A | 8/1993 | Dewolf |
| 5,244,146 A | 9/1993 | Jefferson et al. |
| D341,848 S | 11/1993 | Bigelow et al. |
| 5,294,047 A | 3/1994 | Schwer et al. |
| 5,303,612 A | 4/1994 | Odom et al. |
| 5,395,042 A | 3/1995 | Riley et al. |
| 5,415,346 A | 5/1995 | Bishop |
| 5,460,327 A | 10/1995 | Hill et al. |
| 5,476,221 A | 12/1995 | Seymour |
| 5,482,209 A | 1/1996 | Cochran et al. |
| 5,485,954 A | 1/1996 | Guy et al. |
| 5,499,196 A | 3/1996 | Pacheco |
| 5,544,036 A | 8/1996 | Brown, Jr. et al. |
| 5,555,927 A | 9/1996 | Shah |
| 5,603,451 A | 2/1997 | Helander et al. |
| 5,611,484 A | 3/1997 | Uhrich |
| 5,627,531 A | 5/1997 | Posso et al. |
| 5,673,850 A | 10/1997 | Uptegraph |
| 5,761,083 A | 6/1998 | Brown, Jr. et al. |
| D396,488 S | 7/1998 | Kunkler |
| 5,808,294 A | 9/1998 | Neumann |
| 5,808,602 A | 9/1998 | Sellers |
| 5,816,491 A | 10/1998 | Berkeley et al. |
| 5,902,183 A | 5/1999 | D'Souza |
| 5,909,378 A | 6/1999 | De Milleville |
| 5,918,474 A | 7/1999 | Khanpara et al. |
| 5,931,378 A | 8/1999 | Schramm |
| 5,959,621 A | 9/1999 | Nawaz et al. |
| 5,973,662 A | 10/1999 | Singers et al. |
| 5,977,964 A | 11/1999 | Williams et al. |
| 6,020,881 A | 2/2000 | Naughton et al. |
| 6,032,867 A | 3/2000 | Dushane et al. |
| 6,062,482 A | 5/2000 | Gauthier et al. |
| 6,066,843 A | 5/2000 | Scheremeta |
| D428,399 S | 7/2000 | Kahn et al. |
| 6,098,893 A | 8/2000 | Berglund et al. |
| 6,122,603 A | 9/2000 | Budike, Jr. |
| 6,164,374 A | 12/2000 | Rhodes et al. |
| 6,206,295 B1 | 3/2001 | LaCoste |
| 6,211,921 B1 | 4/2001 | Cherian et al. |
| 6,213,404 B1 | 4/2001 | Dushane et al. |
| 6,216,956 B1 | 4/2001 | Ehlers et al. |
| 6,286,764 B1 | 9/2001 | Garvey et al. |
| 6,298,285 B1 | 10/2001 | Addink et al. |
| 6,311,105 B1 | 10/2001 | Budike, Jr. |
| D450,059 S | 11/2001 | Itou |
| 6,349,883 B1 | 2/2002 | Simmons et al. |
| 6,351,693 B1 | 2/2002 | Monie et al. |
| 6,356,204 B1 | 3/2002 | Guindi et al. |
| 6,363,422 B1 | 3/2002 | Hunter et al. |
| 6,370,894 B1 | 4/2002 | Thompson |
| 6,415,205 B1 | 7/2002 | Myron et al. |
| 6,453,687 B2 | 9/2002 | Sharood et al. |
| D464,660 S | 10/2002 | Weng et al. |
| 6,478,233 B1 | 11/2002 | Shah |
| 6,502,758 B2 | 1/2003 | Cottrell |
| 6,513,723 B1 | 2/2003 | Mueller et al. |
| 6,519,509 B1 | 2/2003 | Nierlich et al. |
| D471,825 S | 3/2003 | Peabody |
| 6,574,581 B1 | 6/2003 | Bohrer et al. |
| 6,595,430 B1 | 7/2003 | Shah |
| 6,619,055 B1 | 9/2003 | Addy |
| 6,622,925 B2 | 9/2003 | Carner et al. |
| D480,401 S | 10/2003 | Kahn et al. |
| 6,636,197 B1 | 10/2003 | Goldenberg et al. |
| 6,641,054 B2 | 11/2003 | Morey |
| 6,641,055 B1 | 11/2003 | Tiernan |
| 6,643,567 B2 | 11/2003 | Kolk et al. |
| 6,644,557 B1 | 11/2003 | Jacobs |
| 6,645,066 B2 | 11/2003 | Gutta et al. |
| D485,279 S | 1/2004 | DeCombe |
| 6,726,112 B1 | 4/2004 | Ho |
| D491,956 S | 6/2004 | Ombao et al. |
| 6,769,482 B2 | 8/2004 | Wagner et al. |
| 6,785,630 B2 | 8/2004 | Kolk et al. |
| 6,798,341 B1 | 9/2004 | Eckel et al. |
| D497,617 S | 10/2004 | Decombe et al. |
| 6,814,299 B1 | 11/2004 | Carey |
| 6,824,069 B2 | 11/2004 | Rosen |
| 6,851,621 B1 | 2/2005 | Wacker et al. |
| D503,631 S | 4/2005 | Peabody |
| 6,891,838 B1 | 5/2005 | Petite et al. |
| 6,904,385 B1 | 6/2005 | Budike, Jr. |
| 6,909,921 B1 | 6/2005 | Bilger |
| 6,951,306 B2 | 10/2005 | DeLuca |
| D511,527 S | 11/2005 | Hernandez et al. |
| 6,975,958 B2 | 12/2005 | Bohrer et al. |
| 6,990,821 B2 | 1/2006 | Singh et al. |
| 7,000,849 B2 | 2/2006 | Ashworth et al. |
| 7,024,336 B2 | 4/2006 | Salsbury et al. |
| 7,028,912 B1 | 4/2006 | Rosen |
| 7,038,667 B1 | 5/2006 | Vassallo et al. |
| 7,055,759 B2 | 6/2006 | Wacker et al. |
| 7,083,109 B2 | 8/2006 | Pouchak |
| 7,108,194 B1 | 9/2006 | Hankins, II |
| 7,111,788 B2 | 9/2006 | Reponen |
| 7,114,554 B2 | 10/2006 | Bergman et al. |
| 7,135,965 B2 | 11/2006 | Chapman, Jr. et al. |
| 7,140,551 B2 | 11/2006 | de Pauw et al. |
| 7,141,748 B2 | 11/2006 | Tanaka et al. |
| 7,142,948 B2 | 11/2006 | Metz |
| 7,149,727 B1 | 12/2006 | Nicholls et al. |
| 7,149,729 B2 | 12/2006 | Kaasten et al. |
| 7,152,806 B1 | 12/2006 | Rosen |
| 7,156,318 B1 | 1/2007 | Rosen |
| 7,159,789 B2 | 1/2007 | Schwendinger et al. |
| 7,159,790 B2 | 1/2007 | Schwendinger et al. |
| 7,181,317 B2 | 2/2007 | Amundson et al. |
| 7,188,482 B2 | 3/2007 | Sadegh et al. |
| 7,222,494 B2 | 5/2007 | Peterson et al. |
| 7,222,800 B2 | 5/2007 | Wruck |
| 7,225,054 B2 | 5/2007 | Amundson et al. |
| D544,877 S | 6/2007 | Sasser |
| 7,258,280 B2 | 8/2007 | Wolfson |
| D550,691 S | 9/2007 | Hally et al. |
| 7,264,175 B2 | 9/2007 | Schwendinger et al. |
| 7,274,972 B2 | 9/2007 | Amundson et al. |

(56) References Cited

U.S. PATENT DOCUMENTS

| | | |
|---|---|---|
| 7,287,709 B2 | 10/2007 | Proffitt et al. |
| 7,289,887 B2 | 10/2007 | Rodgers |
| 7,299,996 B2 | 11/2007 | Garrett et al. |
| 7,302,642 B2 | 11/2007 | Smith et al. |
| 7,333,880 B2 | 2/2008 | Brewster et al. |
| 7,346,467 B2 | 3/2008 | Bohrer et al. |
| D566,587 S | 4/2008 | Rosen |
| 7,379,791 B2 | 5/2008 | Tamarkin et al. |
| RE40,437 E | 7/2008 | Rosen |
| 7,418,663 B2 | 8/2008 | Pettinati et al. |
| 7,427,926 B2 | 9/2008 | Sinclair et al. |
| 7,434,742 B2 | 10/2008 | Mueller et al. |
| 7,451,937 B2 | 11/2008 | Flood et al. |
| 7,455,240 B2 | 11/2008 | Chapman, Jr. et al. |
| 7,460,690 B2 | 12/2008 | Cohen et al. |
| 7,469,550 B2 | 12/2008 | Chapman, Jr. et al. |
| D588,152 S | 3/2009 | Okada |
| 7,509,753 B2 | 3/2009 | Nicosia et al. |
| D589,792 S | 4/2009 | Clabough et al. |
| D590,412 S | 4/2009 | Saft et al. |
| 7,516,106 B2 | 4/2009 | Ehlers et al. |
| D593,120 S | 5/2009 | Bouchard et al. |
| 7,537,171 B2 | 5/2009 | Mueller et al. |
| D594,015 S | 6/2009 | Singh et al. |
| D595,309 S | 6/2009 | Saski et al. |
| 7,555,364 B2 | 6/2009 | Poth et al. |
| D596,194 S | 7/2009 | Vu et al. |
| D597,101 S | 7/2009 | Chaudhri et al. |
| 7,558,648 B2 | 7/2009 | Hoglund et al. |
| D598,463 S | 8/2009 | Hirsch et al. |
| 7,571,014 B1 | 8/2009 | Lambourne et al. |
| 7,571,865 B2 | 8/2009 | Nicodem et al. |
| 7,575,179 B2 | 8/2009 | Morrow et al. |
| D599,810 S | 9/2009 | Scalisi et al. |
| 7,584,899 B2 | 9/2009 | De Pauw et al. |
| 7,600,694 B2 | 10/2009 | Helt et al. |
| D603,277 S | 11/2009 | Clausen et al. |
| D603,421 S | 11/2009 | Ebeling et al. |
| D604,740 S | 11/2009 | Matheny et al. |
| 7,614,567 B2 | 11/2009 | Chapman, Jr. et al. |
| 7,620,996 B2 | 11/2009 | Torres et al. |
| D607,001 S | 12/2009 | Ording |
| 7,624,931 B2 | 12/2009 | Chapman, Jr. et al. |
| 7,634,504 B2 | 12/2009 | Amundson |
| 7,641,126 B2 | 1/2010 | Schultz et al. |
| 7,644,869 B2 | 1/2010 | Hoglund et al. |
| 7,667,163 B2 | 2/2010 | Ashworth et al. |
| D613,301 S | 4/2010 | Guntaur et al. |
| D614,194 S | 4/2010 | Guntaur et al. |
| D614,196 S | 4/2010 | Guntaur et al. |
| 7,693,582 B2 | 4/2010 | Bergman et al. |
| 7,702,424 B2 | 4/2010 | Cannon et al. |
| 7,703,694 B2 | 4/2010 | Mueller et al. |
| D614,976 S | 5/2010 | Skafdrup et al. |
| D615,546 S | 5/2010 | Lundy et al. |
| D616,460 S | 5/2010 | Pearson et al. |
| 7,721,209 B2 | 5/2010 | Tilton |
| 7,726,581 B2 | 6/2010 | Naujok et al. |
| D619,613 S | 7/2010 | Dunn |
| 7,784,704 B2 | 8/2010 | Harter |
| 7,802,618 B2 | 9/2010 | Simon et al. |
| D625,325 S | 10/2010 | Vu et al. |
| D625,734 S | 10/2010 | Kurozumi et al. |
| D626,133 S | 10/2010 | Murphy et al. |
| 7,823,076 B2 | 10/2010 | Borovsky et al. |
| RE41,922 E | 11/2010 | Gough et al. |
| 7,845,576 B2 | 12/2010 | Siddaramanna et al. |
| 7,848,900 B2 | 12/2010 | Steinberg et al. |
| 7,849,698 B2 | 12/2010 | Harrod et al. |
| 7,854,389 B2 | 12/2010 | Ahmed |
| D630,649 S | 1/2011 | Tokunaga et al. |
| 7,890,195 B2 | 2/2011 | Bergman et al. |
| 7,900,849 B2 | 3/2011 | Barton et al. |
| 7,904,209 B2 | 3/2011 | Podgorny et al. |
| 7,904,830 B2 | 3/2011 | Hoglund et al. |
| 7,908,116 B2 | 3/2011 | Steinberg et al. |
| 7,908,117 B2 | 3/2011 | Steinberg et al. |
| D638,835 S | 5/2011 | Akana et al. |
| D640,269 S | 6/2011 | Chen |
| D640,273 S | 6/2011 | Arnold et al. |
| D640,278 S | 6/2011 | Woo |
| D640,285 S | 6/2011 | Woo |
| D641,373 S | 7/2011 | Gardner et al. |
| 7,984,384 B2 | 7/2011 | Chaudhri et al. |
| D643,045 S | 8/2011 | Woo |
| 8,010,237 B2 | 8/2011 | Cheung et al. |
| 8,019,567 B2 | 9/2011 | Steinberg et al. |
| 8,037,022 B2 | 10/2011 | Rahman et al. |
| D648,735 S | 11/2011 | Arnold et al. |
| D651,529 S | 1/2012 | Mongell et al. |
| 8,090,477 B1 | 1/2012 | Steinberg |
| 8,091,375 B2 | 1/2012 | Crawford |
| 8,091,794 B2 | 1/2012 | Siddaramanna et al. |
| 8,131,207 B2 | 3/2012 | Hwang et al. |
| 8,131,497 B2 | 3/2012 | Steinberg et al. |
| 8,131,506 B2 | 3/2012 | Steinberg et al. |
| 8,136,052 B2 | 3/2012 | Shin et al. |
| D656,950 S | 4/2012 | Shallcross et al. |
| D656,952 S | 4/2012 | Weir et al. |
| 8,155,900 B1 | 4/2012 | Adams |
| 8,156,060 B2 | 4/2012 | Borzestowski et al. |
| 8,166,395 B2 | 4/2012 | Omi et al. |
| D658,674 S | 5/2012 | Shallcross et al. |
| 8,174,381 B2 | 5/2012 | Imes et al. |
| 8,180,492 B2 | 5/2012 | Steinberg |
| 8,185,164 B2 | 5/2012 | Kim |
| 8,195,313 B1 | 6/2012 | Fadell et al. |
| D663,743 S | 7/2012 | Tanghe et al. |
| D663,744 S | 7/2012 | Tanghe et al. |
| D664,559 S | 7/2012 | Ismail et al. |
| 8,219,249 B2 | 7/2012 | Harrod et al. |
| 8,223,134 B1 | 7/2012 | Forstall et al. |
| 8,234,581 B2 | 7/2012 | Kake |
| D664,978 S | 8/2012 | Tanghe et al. |
| D665,397 S | 8/2012 | Naranjo et al. |
| 8,243,017 B2 | 8/2012 | Brodersen et al. |
| 8,253,704 B2 | 8/2012 | Jang |
| 8,253,747 B2 | 8/2012 | Niles et al. |
| 8,280,536 B1 | 10/2012 | Fadell et al. |
| 8,281,244 B2 | 10/2012 | Neuman et al. |
| D671,136 S | 11/2012 | Barnett et al. |
| 8,316,022 B2 | 11/2012 | Matsuda et al. |
| D673,171 S | 12/2012 | Peters et al. |
| D673,172 S | 12/2012 | Peters et al. |
| 8,341,557 B2 | 12/2012 | Pisula et al. |
| 8,442,695 B2 | 5/2013 | Imes et al. |
| 8,442,752 B2 | 5/2013 | Wijaya et al. |
| 8,571,518 B2 | 10/2013 | Imes et al. |
| 8,893,032 B2 | 11/2014 | Bruck et al. |
| 2002/0005435 A1 | 1/2002 | Cottrell |
| 2002/0022991 A1 | 2/2002 | Sharod et al. |
| 2002/0178047 A1 | 11/2002 | Or |
| 2003/0034898 A1 | 2/2003 | Shamoon et al. |
| 2003/0042320 A1 | 3/2003 | Decker |
| 2003/0070437 A1 | 4/2003 | Hafner et al. |
| 2003/0093186 A1 | 5/2003 | Patterson et al. |
| 2003/0112262 A1 | 6/2003 | Adatia et al. |
| 2003/0231001 A1 | 12/2003 | Bruning |
| 2004/0034484 A1 | 2/2004 | Solomita, Jr. et al. |
| 2004/0055446 A1 | 3/2004 | Robbin et al. |
| 2004/0074978 A1 | 4/2004 | Rosen |
| 2004/0095237 A1 | 5/2004 | Chen et al. |
| 2004/0133314 A1 | 7/2004 | Ehlers et al. |
| 2004/0164238 A1 | 8/2004 | Xu et al. |
| 2004/0225955 A1 | 11/2004 | Ly |
| 2004/0249479 A1 | 12/2004 | Shorrock |
| 2004/0256472 A1 | 12/2004 | DeLuca |
| 2004/0260427 A1 | 12/2004 | Wimsatt |
| 2004/0262410 A1 | 12/2004 | Hull |
| 2005/0043907 A1 | 2/2005 | Eckel et al. |
| 2005/0053063 A1 | 3/2005 | Madhavan |
| 2005/0055432 A1 | 3/2005 | Rodgers |
| 2005/0071780 A1 | 3/2005 | Muller et al. |
| 2005/0090915 A1 | 4/2005 | Geiwitz |

(56) References Cited

U.S. PATENT DOCUMENTS

| | | |
|---|---|---|
| 2005/0119766 A1 | 6/2005 | Amundson et al. |
| 2005/0119793 A1 | 6/2005 | Amundson et al. |
| 2005/0128067 A1 | 6/2005 | Zakrewski |
| 2005/0150968 A1 | 7/2005 | Shearer |
| 2005/0159847 A1 | 7/2005 | Shah et al. |
| 2005/0189429 A1 | 9/2005 | Breeden |
| 2005/0192915 A1 | 9/2005 | Ahmed et al. |
| 2005/0194456 A1 | 9/2005 | Tessier et al. |
| 2005/0195757 A1 | 9/2005 | Kidder et al. |
| 2005/0204997 A1 | 9/2005 | Fournier |
| 2005/0280421 A1 | 12/2005 | Yomoda et al. |
| 2006/0065750 A1 | 3/2006 | Fairless |
| 2006/0147003 A1 | 7/2006 | Archacki et al. |
| 2006/0186214 A1 | 8/2006 | Simon et al. |
| 2006/0196953 A1 | 9/2006 | Simon et al. |
| 2006/0206220 A1 | 9/2006 | Amundson |
| 2007/0001830 A1 | 1/2007 | Dagci et al. |
| 2007/0043478 A1 | 2/2007 | Ehlers et al. |
| 2007/0045430 A1 | 3/2007 | Chapman et al. |
| 2007/0045431 A1 | 3/2007 | Chapman, Jr. et al. |
| 2007/0045433 A1 | 3/2007 | Chapman et al. |
| 2007/0045444 A1 | 3/2007 | Gray et al. |
| 2007/0050732 A1 | 3/2007 | Chapman et al. |
| 2007/0057079 A1 | 3/2007 | Stark et al. |
| 2007/0084941 A1 | 4/2007 | De Pauw et al. |
| 2007/0105252 A1 | 5/2007 | Lee et al. |
| 2007/0114295 A1 | 5/2007 | Jenkins |
| 2007/0115902 A1 | 5/2007 | Shamoon et al. |
| 2007/0158442 A1 | 7/2007 | Chapman et al. |
| 2007/0158444 A1 | 7/2007 | Naujok et al. |
| 2007/0173978 A1 | 7/2007 | Fein et al. |
| 2007/0205297 A1 | 9/2007 | Finkam et al. |
| 2007/0213876 A1 | 9/2007 | Warren et al. |
| 2007/0225867 A1 | 9/2007 | Moorer et al. |
| 2007/0227721 A1 | 10/2007 | Springer et al. |
| 2007/0228183 A1 | 10/2007 | Kennedy et al. |
| 2007/0241203 A1 | 10/2007 | Wagner et al. |
| 2007/0257120 A1 | 11/2007 | Chapman et al. |
| 2007/0278320 A1 | 12/2007 | Lunacek et al. |
| 2008/0004838 A1 | 1/2008 | Yungkurth et al. |
| 2008/0006709 A1 | 1/2008 | Ashworth et al. |
| 2008/0015740 A1 | 1/2008 | Osann |
| 2008/0015742 A1 | 1/2008 | Kulyk et al. |
| 2008/0048046 A1 | 2/2008 | Wagner et al. |
| 2008/0054082 A1 | 3/2008 | Evans et al. |
| 2008/0054084 A1 | 3/2008 | Olson |
| 2008/0099568 A1 | 5/2008 | Nicodem et al. |
| 2008/0183335 A1 | 7/2008 | Poth et al. |
| 2008/0191045 A1 | 8/2008 | Harter |
| 2008/0215240 A1 | 9/2008 | Howard et al. |
| 2008/0221737 A1 | 9/2008 | Josephson et al. |
| 2008/0245480 A1 | 10/2008 | Knight et al. |
| 2008/0256475 A1 | 10/2008 | Amundson et al. |
| 2008/0262755 A1 | 10/2008 | Dayton et al. |
| 2008/0273754 A1 | 11/2008 | Hick et al. |
| 2008/0290183 A1 | 11/2008 | Laberge et al. |
| 2008/0317292 A1 | 12/2008 | Baker et al. |
| 2009/0001180 A1 | 1/2009 | Siddaramanna et al. |
| 2009/0001181 A1 | 1/2009 | Siddaramanna et al. |
| 2009/0012959 A1 | 1/2009 | Ylivainio et al. |
| 2009/0057427 A1 | 3/2009 | Geadelmann et al. |
| 2009/0099699 A1 | 4/2009 | Steinberg et al. |
| 2009/0125151 A1 | 5/2009 | Steinberg et al. |
| 2009/0140056 A1 | 6/2009 | Leen |
| 2009/0140057 A1 | 6/2009 | Leen |
| 2009/0140060 A1 | 6/2009 | Stoner et al. |
| 2009/0140064 A1 | 6/2009 | Schultz et al. |
| 2009/0143916 A1 | 6/2009 | Boll et al. |
| 2009/0143918 A1 | 6/2009 | Amundson et al. |
| 2009/0157529 A1 | 6/2009 | Ehlers et al. |
| 2009/0171862 A1 | 7/2009 | Harrod et al. |
| 2009/0194601 A1 | 8/2009 | Flohr |
| 2009/0195349 A1 | 8/2009 | Frader-Thompson et al. |
| 2009/0254225 A1 | 10/2009 | Boucher et al. |
| 2009/0259713 A1 | 10/2009 | Blumrich et al. |
| 2009/0261174 A1 | 10/2009 | Butler et al. |
| 2009/0263773 A1 | 10/2009 | Kotlyar et al. |
| 2009/0273610 A1 | 11/2009 | Busch et al. |
| 2009/0276714 A1 | 11/2009 | Kandlikar et al. |
| 2009/0283603 A1 | 11/2009 | Peterson et al. |
| 2009/0297901 A1 | 12/2009 | Kilian et al. |
| 2009/0327354 A1 | 12/2009 | Resnick et al. |
| 2010/0019051 A1 | 1/2010 | Rosen |
| 2010/0025483 A1 | 2/2010 | Hoeynck et al. |
| 2010/0050004 A1 | 2/2010 | Hamilton, II et al. |
| 2010/0058450 A1 | 3/2010 | Fein et al. |
| 2010/0070084 A1 | 3/2010 | Steinberg et al. |
| 2010/0070085 A1 | 3/2010 | Harrod et al. |
| 2010/0070086 A1 | 3/2010 | Harrod et al. |
| 2010/0070089 A1 | 3/2010 | Harrod et al. |
| 2010/0070093 A1 | 3/2010 | Harrod et al. |
| 2010/0070234 A1 | 3/2010 | Steinberg et al. |
| 2010/0070907 A1 | 3/2010 | Harrod et al. |
| 2010/0084482 A1 | 4/2010 | Kennedy et al. |
| 2010/0104074 A1 | 4/2010 | Yang |
| 2010/0106305 A1 | 4/2010 | Pavlak et al. |
| 2010/0106322 A1 | 4/2010 | Grohman |
| 2010/0107070 A1 | 4/2010 | Devineni et al. |
| 2010/0107076 A1 | 4/2010 | Grohman et al. |
| 2010/0107103 A1 | 4/2010 | Wallaert et al. |
| 2010/0163633 A1 | 7/2010 | Barrett et al. |
| 2010/0167783 A1 | 7/2010 | Alameh et al. |
| 2010/0168924 A1 | 7/2010 | Tessier et al. |
| 2010/0179704 A1 | 7/2010 | Ozog |
| 2010/0198425 A1 | 8/2010 | Donovan |
| 2010/0211224 A1 | 8/2010 | Keeling et al. |
| 2010/0261465 A1 | 10/2010 | Rhoads et al. |
| 2010/0262298 A1 | 10/2010 | Johnson et al. |
| 2010/0262299 A1 | 10/2010 | Cheung et al. |
| 2010/0273610 A1 | 10/2010 | Johnson |
| 2010/0276482 A1 | 11/2010 | Raihi et al. |
| 2010/0280667 A1 | 11/2010 | Steinberg |
| 2010/0282857 A1 | 11/2010 | Steinberg |
| 2010/0289643 A1 | 11/2010 | Trundle et al. |
| 2010/0308119 A1 | 12/2010 | Steinberg et al. |
| 2010/0318227 A1 | 12/2010 | Steinberg et al. |
| 2011/0001812 A1 | 1/2011 | Kang et al. |
| 2011/0015797 A1 | 1/2011 | Gilstrap |
| 2011/0015798 A1 | 1/2011 | Golden et al. |
| 2011/0015802 A1 | 1/2011 | Imes |
| 2011/0022242 A1 | 1/2011 | Bukhin et al. |
| 2011/0029488 A1 | 2/2011 | Fuerst et al. |
| 2011/0046756 A1 | 2/2011 | Park |
| 2011/0046792 A1 | 2/2011 | Imes et al. |
| 2011/0046805 A1 | 2/2011 | Bedros et al. |
| 2011/0046806 A1 | 2/2011 | Nagel et al. |
| 2011/0054710 A1 | 3/2011 | Imes et al. |
| 2011/0077758 A1 | 3/2011 | Tran et al. |
| 2011/0077896 A1 | 3/2011 | Steinberg et al. |
| 2011/0078675 A1 | 3/2011 | Van Camp et al. |
| 2011/0095897 A1 | 4/2011 | Sutrave |
| 2011/0106328 A1 | 5/2011 | Zhou et al. |
| 2011/0132990 A1 | 6/2011 | Liri et al. |
| 2011/0151837 A1 | 6/2011 | Winbush, III |
| 2011/0160913 A1 | 6/2011 | Parker et al. |
| 2011/0166828 A1 | 7/2011 | Steinberg et al. |
| 2011/0167369 A1 | 7/2011 | Van Os |
| 2011/0184563 A1 | 7/2011 | Foslien |
| 2011/0185895 A1 | 8/2011 | Freen |
| 2011/0202185 A1 | 8/2011 | Imes et al. |
| 2011/0257795 A1 | 10/2011 | Narayanarnurthy et al. |
| 2011/0282937 A1 | 11/2011 | Deshpande et al. |
| 2011/0290893 A1 | 12/2011 | Steinberg |
| 2011/0307103 A1 | 12/2011 | Cheung et al. |
| 2011/0307112 A1 | 12/2011 | Barrilleaux |
| 2012/0005590 A1 | 1/2012 | Lombard et al. |
| 2012/0017611 A1 | 1/2012 | Coffel et al. |
| 2012/0036250 A1 | 2/2012 | Vaswani et al. |
| 2012/0046792 A1 | 2/2012 | Secor |
| 2012/0053745 A1 | 3/2012 | Ng |
| 2012/0065783 A1 | 3/2012 | Fadell et al. |
| 2012/0065935 A1 | 3/2012 | Steinberg et al. |
| 2012/0068854 A1 | 3/2012 | Shiflet et al. |
| 2012/0085831 A1 | 4/2012 | Kopp |

(56) References Cited

U.S. PATENT DOCUMENTS

| | | |
|---|---|---|
| 2012/0086562 A1 | 4/2012 | Steinberg |
| 2012/0089523 A1 | 4/2012 | Hurri et al. |
| 2012/0101637 A1 | 4/2012 | Imes et al. |
| 2012/0116593 A1 | 5/2012 | Amundson et al. |
| 2012/0130513 A1 | 5/2012 | Hao et al. |
| 2012/0130546 A1 | 5/2012 | Matas et al. |
| 2012/0130907 A1 | 5/2012 | Thompson et al. |
| 2012/0131504 A1 | 5/2012 | Fadell et al. |
| 2012/0143536 A1 | 6/2012 | Greaves et al. |
| 2012/0158350 A1 | 6/2012 | Steinberg et al. |
| 2012/0166616 A1 | 6/2012 | Meehan |
| 2012/0221151 A1 | 8/2012 | Steinberg |
| 2012/0252430 A1 | 10/2012 | Imes et al. |
| 2012/0274602 A1 | 11/2012 | Bita |
| 2012/0296488 A1 | 11/2012 | Dharwada et al. |
| 2013/0014057 A1 | 1/2013 | Reinpoldt et al. |
| 2013/0055132 A1* | 2/2013 | Foslien ............ G06F 17/30554 715/771 |
| 2013/0116953 A1 | 5/2013 | Pollard |
| 2013/0263034 A1 | 10/2013 | Bruck et al. |
| 2015/0058779 A1 | 2/2015 | Bruck et al. |

FOREIGN PATENT DOCUMENTS

| | | |
|---|---|---|
| EP | 434926 | 7/1991 |
| EP | 196069 | 12/1991 |
| EP | 720077 | 7/1996 |
| EP | 802471 | 10/1997 |
| EP | 1065079 | 1/2001 |
| EP | 1731984 | 12/2006 |
| EP | 2157492 | 2/2010 |
| EP | 2157492 A2 | 2/2010 |
| EP | 1703356 | 9/2011 |
| GB | 2212317 | 5/1992 |
| JP | 59106311 | 6/1984 |
| JP | 1252850 | 10/1989 |
| JP | 09298780 | 11/1997 |
| JP | 10023565 A | 1/1998 |
| JP | 2002087050 | 3/2002 |
| JP | 2003054290 | 2/2003 |
| NL | 1024986 | 6/2005 |
| WO | 0248851 | 6/2002 |
| WO | 2008054938 | 5/2008 |
| WO | 2009073496 | 6/2009 |
| WO | 2009073496 A2 | 6/2009 |
| WO | 2010033563 A1 | 3/2010 |
| WO | 2011/003023 A1 | 1/2011 |
| WO | 2011128416 | 10/2011 |
| WO | 2011149600 A2 | 12/2011 |
| WO | 2012/024534 A2 | 2/2012 |
| WO | 2013058820 | 4/2013 |
| WO | 2013149210 | 10/2013 |

OTHER PUBLICATIONS

The Clever Thermostat User Manual and Installation Guide, ICY BV ICY3815 Timer-Thermostat, 2009, pp. 1-36.
De Almeida, et al., Advanced Monitoring Technologies for the Evaluation of Demand-Side Management Programs, Energy, Vo. 19, No. 6, 1994, pp. 661-678.
Gevorkian, Alternative Energy Systems in Building Design, 2009, pp. 195-200.
Hoffman, et al., Integration of Remote Meter Reading, Load Control and Monitoring of Customers'Installations for Customer Automation with Telephone Line Signaling, Electricity Distribution, 1989, CIRED 1989. 10th International Conference on May 8-12, 1989. pp. 421-424.
Levy, A Vision of Demand Response—2016, The Electricity Journal, vol. 19, Issue 8, Oct. 2006, pp. 12-23.
Lopes, Case Studies in Advanced Thermostat Control for Demand Response, AEIC Load Research Conference, St. Louis, MO, Jul. 2004, 36 pages.
Martinez, SCE Energy$mart Thermostat Program, Advanced Load Control Alliance, Oct. 5, 2004, 20 pages.
Matty, Advanced Energy Management for Home Use, IEEE Transaction on Consumer electronics, vol. 35, No. 3, Aug. 1989, pp. 584-588.
Motegi, et al., Introduction to Commercial Building Control Strategies and Techniques for Demand Response, Demand Response Research Center, May 22, 2007, 35 pages.
First Office Action dated Sep. 25, 2015, for Chinese Patent Application No. 201380029046.X, filed Mar. 29, 2013, 8 pages (with English Translation.).
International Application No. PCT/US2013/034718, International Search Report and Written Opinion dated Sep. 6, 2013, 22 pages.
International Search Report and Written Opinion dated Jul. 6, 2012, for International Patent Application No. PCT/US2012/030084 filed Mar. 22, 2012, all pages.
Aprilaire Electronic Thermostats Model 8355 User's Manual, Research Products corporation, Dec. 2000, 16 pages.
Braeburn 5300 Installer Guide, Braeburn Systems, LLC, Dec. 9, 2009, 10 pages.
Braeburn Model 5200 Braeburn Systems, LLc, Jul. 20, 2011, 11 pages.
Ecobee Smart Si Thermostat Installation Manual, Ecobee, Apr. 3, 2012, 40 pages.
Ecobee Smart Si Thermostat User Manual, Ecobee, Apr. 3, 2012, 44 pages.
Ecobee Smart Thermostat Installation Manual, Jun. 29, 2011, 20 pages.
Ecobee Smart Thermostat User Manual, May 11, 2010, 20 pages.
Electric Heat Lock Out on Heat Pumps, Washington State University Extension Energy Program, Apr. 2010, pp. 1-3.
Honeywell Installation Guide FocusPRO TH6000 Series, Honeywell International, Inc., Jan. 5, 2012, 24 pages.
Honeywell Operating Manual FocusPRO TH6000 Series, Honeywell International, Inc., Mar. 25, 2011, 80 pages.
Honeywell Prestige THX9321-9421 Operating Manual, Honeywell International, Inc., Jul. 6, 2011, 120 pages.
Honeywell THX9321 Prestige 2.0 and TXH9421 Prestige IAQ 2.0 with EIM Product Data, Honeywell International, Inc., 68-0311, Jan. 2012, 126 pages.
Hunter Internet Thermostat Installation Guide, Hunter Fan Co., Aug. 14, 2012, 8 pages.
Lennox ComfortSense 5000 Owners guide, Lennox Industries, Inc., Feb. 2008, 32 pages.
Lennox ComfortSense 7000 Owners Guide, Lennox Industries, Inc., May 2009, 15 pages.
Lennox iComfort Manual, Lennox Industries, Inc., Dec. 2010, 20 pages.
Lux PSPU732T Manual, LUX Products Corporation, Jan. 6, 2009, 48 pages.
NetX RP32-WIFI Network Thermostat consumer Brochure, Netowrk Thermostat, May 2011, 2 pages.
NetX RP32-WIFI Network Thermostat Specification Sheet, Network Thermostat, Feb. 28, 2012, 2 pages.
RobertShaw Product Manual 9620, Maple Chase Company, Jun. 12, 2001, 14 pages.
RobertShaw Product Manual 9825i2, Maple Chase Company, Jul. 17, 2006, 36 pages.
SYSTXCCUIZ01-V Infinity Control Installation Instructions, Carrier Corp., May 31, 2012, 20 pages.
T8611G Chronotherm IV Deluxe Programmable Heat Pump Thermostat Product Data, Honeywell International, Inc., Oct. 1997, 24 pages.
TB-PAC, PB-PHP, Base Series Programmable Thermostats, Carrier Corp., May 14, 2012, 8 pages.
The Perfect Climate Comfort Center PC8900A W8900A-C Product Data Sheet, Honeywell International Inc., Apr. 2001, 44 pages.
TP-PAC, TP-PHP, TP-NAC, TP-NHP Performance Series AC/HP Thermostat Installation Instructions, Carrier corp., Sep. 2007, 56 pages.
Trane Communicating Thermostats for Fan Coil, Trane, May 2011, 32 pages.

(56) References Cited

OTHER PUBLICATIONS

Trane Communicating thermostats for Heat Pump Control, Trane, May 2011, 32 pages.
Trane Install XL600 Installation Manual, Trane, Mar. 2006, 16 pages.
Trane XL950 Installation Guide, Trane, Mar. 2011, 20 pages.
Venstar T2900 Manual, Venstar, Inc., Apr. 2008, 113 pages.
Venstar T5800 Manual, Venstar, Inc., Sep. 7, 2011, 63 pages.
VisionPRO TH8000 Series Installation Guide, Honeywell International, Inc., Jan. 2012, 12 pages.
VisionPRO TH8000 Series Operating Manual, Honeywell International, Inc., Mar. 2011, 96 pages.
VisionPRO Wi-Fi Programmable Thermostat User Guide, Honeywll International, Inc., Aug. 2012, 48 pages.
White Rodgers (Emerson) Model 1F81-261 Installation and Operating Instructions, White Rodgers Apr. 15, 2010, 8 pages.
White Rodgers (Emerson) Model IF98EZ-1621 Homeowner's User Guide, White Rodgers, Jan. 25, 2012, 28 pages.
Akhlaghinia, et al., Occupancy Monitoring in Intelligent Environment through Integrated Wireless Localizing Agents, IEEE, 2009, 7 pages.
Akhlaghinia, et al., Occupant Behavior Prediction in Ambient Intelligence Computing Environment, Journal of Uncertain Systems, vol. 2, No. 2, 2008, pp. 85-100.
Allen, et al., Real-Time Earthquake Detection and Hazard Assessment by ElarmS Across California, Geophysical Research Letters, vol. 36, L00B08, 2009, pp. 1-6.
Deleeuw, Ecobee WiFi Enabled Smart Thermostat Part 2: The Features Review, retrieved from <URL:http://www.homenetworkenabled.com/content.php?136-ecobee-WiFi-enabled-Smart-Thermostat-Part-2-The-Features-review> [retrieved on Jan. 8, 2013], Dec. 2, 2011, 5 pages.
Gao, et al., The Self-Programming Thermostat: Optimizing Setback Schedules Based on Home Occupancy Patterns, In Proceedings of the First ACM Workshop on Embedded Sensing Systems for Energy-Efficiency in Buildings, Nov. 3, 2009, 6 pages.
Loisos, et al., Buildings End-Use Energy Efficiency: Alternatives to Compressor Cooling, California Energy Commission, Public Interest Energy Research, Jan. 2000, 80 pages.
Lu, et al., The Smart Thermostat: Using Occupancy Sensors to Save Energy in Homes, In Proceedings of the 8th ACM Conference on Embedded Networked Sensor Systems, Nov. 3-5, 2010, pp. 211-224.
Mozer, The Neural Network House: An Environmental that Adapts to its Inhabitants, Proceedings of the American Association for Artificial Intelligence SS-98-02-, 1998, pp. 110-114.
Ros, et al., Multi-Sensor Human Tracking with the Bayesian Occupancy Filter, IEEE, 2009, 8 pages.
Wong, et al., Maximum Likelihood Estimation of ARMA Model with Error Processes for Replicated Observations, National University of Singapore, Department of Economics, Working Paper No. 0217, Feb. 2002, pp. 1-19.
Extended European Search Report dated Jan. 25, 2016, for European Patent Application No. 13769316.4, 8 pages.
Notification on the Grant of Patent Right for Invention for Chinese Patent Application 201380029046.X, dated Jun. 2, 2016, 6 pages. English Translation.
Energy Joule, Ambient Devices, 2011, retrieved from the Internet: <URL: http://web.archive.org/web/20110723210421/http://www.ambientdevices.com/products/energyjoule.html> [retrieved on Aug. 1, 2012], Jul. 23, 2011, 2 pages.
Hai Lin, et al., Internet Based Monitoring and controls for HVAC applications, Janwary 2002, IEEE, p. 49-54.
Honeywell CT2700, An Electronic Round Programmable Thermostat—User's Guide, Honeywell, Inc., 1997, 8 pages.
Honeywell CT8775A,C, The digital Round Non-Programmable Thermostats—Owner's Guide, Honeywell International Inc., 2003, 20 pages.
Honeywell T8700C, An Electronic Round Programmable Thermostat—Owner's Guide, Honeywell, Inc., 1997, 12 pages.
Honeywell T8775 The Digital Round Thermostat, Honeywell, 2003, 2 pages.
Honeywell T8775AC Digital Round Thermostat Manual No. 69-1679EF-1, www.honeywell.com/yourhome, Jun. 2004, pp. 1-16.
ICY 3815TT-001 Timer-Thermostat Package Box, ICY BV Product Bar Code No. 8717953007902, 2009, 2 pages.
Introducing the New Smart Si Thermostat, Datasheet [online], retrieved from the Internet: <URL: https://www.ecobee.com/solutions/home/smart-si/> [retrieved on Feb. 25, 2013], Ecobee, Mar. 12, 2012, 4 pages.
The Clever Thermostat, ICY BV Web Page, http://www.icy.nl/en/consumer/products/clever-thermostat, ICY BV, 2012, 1 page.
U.S. Appl. No. 60/512,886, Volkswagen Rotary Knob for Motor Vehicle—English Translation of German Application filed on Oct. 20, 2003.
Arens et al., Demand Response Electrical Appliance Manager—User Interface Design, Development and Testing, Poster, Demand Response Enabling Technology Development, University of California Berkeley, 2005, 1 page.
Arens et al., Demand Response Enabled Thermostat—Control Strategies and Interface, Demand Response Enabling Technology Development Poster, University of California Berkeley, 2004, 1 page.
Arens et al., Demand Response Enabling Technology Development, Phase I Report: Jun. 2003-Nov. 2005, University of California Berkeley, Apr. 4, 2006 pp. 1-108.
Arens et al., New Thermostat Demand Response Enabling Technology, Poster, University of California Berkeley, Jun. 10, 2004.
Auslander et al., UC Berkeley DR Research Energy Management Group, Power Point Presentation, DR ETD Workshop, State of California Energy Commission, Jun. 11, 2007, pp. 1-35.
Bourke, Server Load Balancing, O'Reilly & Associates, Inc., Aug. 2001, 182 pages.
Chatzigiannakis et al., Priority Based Adaptive Coordination of Wireless Sensors and Actors, Q2SWinet '06, Oct. 2006, pp. 37-44.
Chen et al., Demand Response-Enabled Residential Thermostat Controls, Abstract, ACEEE Summer Study on Energy Efficiency in Buildings, Mechanical Engineering Dept. and Architecture Dept., University of California Berkeley, 2008, pp. 1-24 through 1-36.
Green, Thermo Heat Tech Cool, Popular Mechanics Electronic Thermostat Guide, Oct. 1985, pp. 155-158.
Meier et al., Thermostat Interface Usability: A Survey, Ernest Orlando Lawrence Berkeley National Laboratory, Environmental Energy Technologies Division, Berkeley California, Sep. 2010, pp. 1-73.
Peffer et al., A Tale of Two Houses: The Human Dimension of Demand Response Enabling Technology from a Case Study of Adaptive Wireless Thermostat, Abstract, ACEEE Summer Study on Energy Efficiency in Buildings, Architecture Dept. and Mechanical Engineering Dept., University of California Berkeley, 2008, pp. 7-242 through 7-253.
Peffer et al., Smart Comfort At Home: Design of a Residential Thermostat to Achieve Thermal Comfort, and Save Money and Peak Energy, University of California Berkeley, Mar. 2007, 1 page.
Salus, S-Series Digital Thermostat Instruction Manual-ST620 Model No. Instruction Manual, www.salus-tech.com, Version 005, Apr. 29, 2010, 24 pages.
Sanford, iPod (Click Wheel) (2004), www.apple-history.com, retrieved from the Internet: <URL: http://apple-history.com/ipod> [retrieved on Apr. 9, 2012], 2012, 2 pages.
White et al., A Conceptual Model for Simulation Load Balancing, Proceedings of the 1998 Spring Simulation Interoperability Workshop, 1998, pp. 1-7.
Wright et al., DR ETD—Summary of New Thermostat, TempNode, & New Meter (UC Berkeley Project), Power Point Presentation, Public Interest Energy Research, University of California Berkeley, 2005, pp. 1-49.
Non-Final Office Action dated Dec. 26, 2012 for U.S. Appl. No. 13/624,875, filed Sep. 21, 2012, all pages.
Final Office Action dated Aug. 30, 2013 for U.S. Appl. No. 13/624,875, filed Sep. 21, 2012, all pages.
Notice of Allowance dated Jul. 18, 2014 for U.S. Appl. No. 13/624,875, filed Sep. 21, 2012, all pages.

(56) References Cited

OTHER PUBLICATIONS

Non-Final Office Action dated Oct. 20, 2014 for U.S. Appl. No. 13/434,560, filed Mar. 29, 2012, all pages.
Final Office Action dated Apr. 7, 2015 for U.S. Appl. No. 13/434,450, filed Mar. 29, 2012, all pages.
Detroitborg, Nest Learning Thermostat; Unboxing & Review. Feb. 10, 2012.
International Search Report and Written Opinion received in PCT Application No. PCT/US2013/034718 dated Sep. 6, 2013.
U.S. Appl. No. 15/258,422 filed Sep 7, 2016, Notice of Allowance dated Apr. 11, 2017, all pages.

* cited by examiner

⌧ = orange (heating, second stage heating)
⌧ = salmon (first stage heating)
⌧ = blue (cooling)

$$\boxed{\begin{array}{c}\text{AutoAway Estimated}\\\text{Usage/NonUsage}\end{array}} = \left(A_{autoawayheat}^{Mo.\ 2} - A_{autoawayheat}^{Mo.\ 1}\right)*(Slope_{heat}) + \left(A_{autoawaycool}^{Mo.\ 2} - A_{autoawaycool}^{Mo.\ 1}\right)*(Slope_{cool})$$

FIG. 30

$$\boxed{\begin{array}{c}\text{ManAway Estimated}\\\text{Usage/NonUsage}\end{array}} = \left(A_{manawayheat}^{Mo.\ 2} - A_{manawayheat}^{Mo.\ 1}\right)*(Slope_{heat}) + \left(A_{manawaycool}^{Mo.\ 2} - A_{manawaycool}^{Mo.\ 1}\right)*(Slope_{cool})$$

FIG. 31

$$\begin{array}{c}\text{Schedule Change Estimated}\\\text{Usage/NonUsage}\end{array}$$
$$\shortparallel$$
$$\left(\frac{A_{sched.heat-0}^{Mo.\ 2}}{t_{heat}^{Mo.\ 2}} - \frac{A_{sched.heat-0}^{Mo.\ 1}}{t_{heat}^{Mo.\ 1}}\right)*t_{heat}^{Mo.\ 2}*(Slope_{heat}) + \left(\frac{A_{sched.cool-0}^{Mo.\ 2}}{t_{cool}^{Mo.\ 2}} - \frac{A_{sched.cool-0}^{Mo.\ 1}}{t_{cool}^{Mo.\ 1}}\right)*t_{cool}^{Mo.\ 2}*(Slope_{cool})$$

FIG. 32

$$\begin{array}{c}\text{Manual Change Estimated}\\\text{Usage/NonUsage}\end{array}$$
$$\shortparallel$$
$$\left(\frac{A_{man.heat-0}^{Mo.\ 2}}{t_{heat.man}^{Mo.\ 2}} - \frac{A_{man.heat-0}^{Mo.\ 1}}{t_{heat.man}^{Mo.\ 1}}\right)*t_{heat.man}^{Mo.\ 2}*(Slope_{heat}) + \left(\frac{A_{man.cool-0}^{Mo.\ 2}}{t_{cool.man}^{Mo.\ 2}} - \frac{A_{man.cool-0}^{Mo.\ 1}}{t_{cool.man}^{Mo.\ 1}}\right)*t_{cool}^{Mo.\ 2}*(Slope_{cool})$$

FIG. 33

$$\boxed{\begin{array}{c}\text{Off Mode}\\\text{Estimated Usage/}\\\text{NonUsage}\end{array}} = \frac{\left(t_{off}^{Mo.\ 2} - t_{off}^{Mo.\ 1}\right)*\left(t_{heat.usage.mo.\ 2} + t_{heat.usage.mo.1} + t_{cool.usage.mo.\ 2} + t_{cool.usage.mo.1}\right)}{t_{cool}^{Mo.\ 2} + t_{cool}^{Mo.\ 1} + t_{heat}^{Mo.\ 1} + t_{heat}^{Mo.\ 2}}$$

FIG. 34

$$\boxed{\begin{array}{c}\text{Calendar}\\\text{Estimated Usage/}\\\text{NonUsage}\end{array}} = \frac{\left(D_{Mo.2} - D_{Mo.1}\right)*\left(t_{heat.usage.mo.2} + t_{heat.usage.mo.1} + t_{cool.usage.mo.2} + t_{cool.usage.mo.1}\right)}{D_{Mo.2} + D_{Mo.1}}$$

FIG. 35

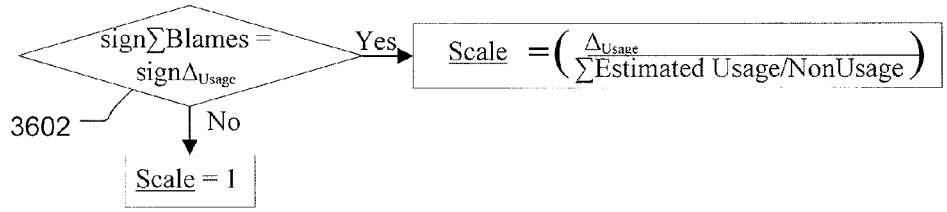
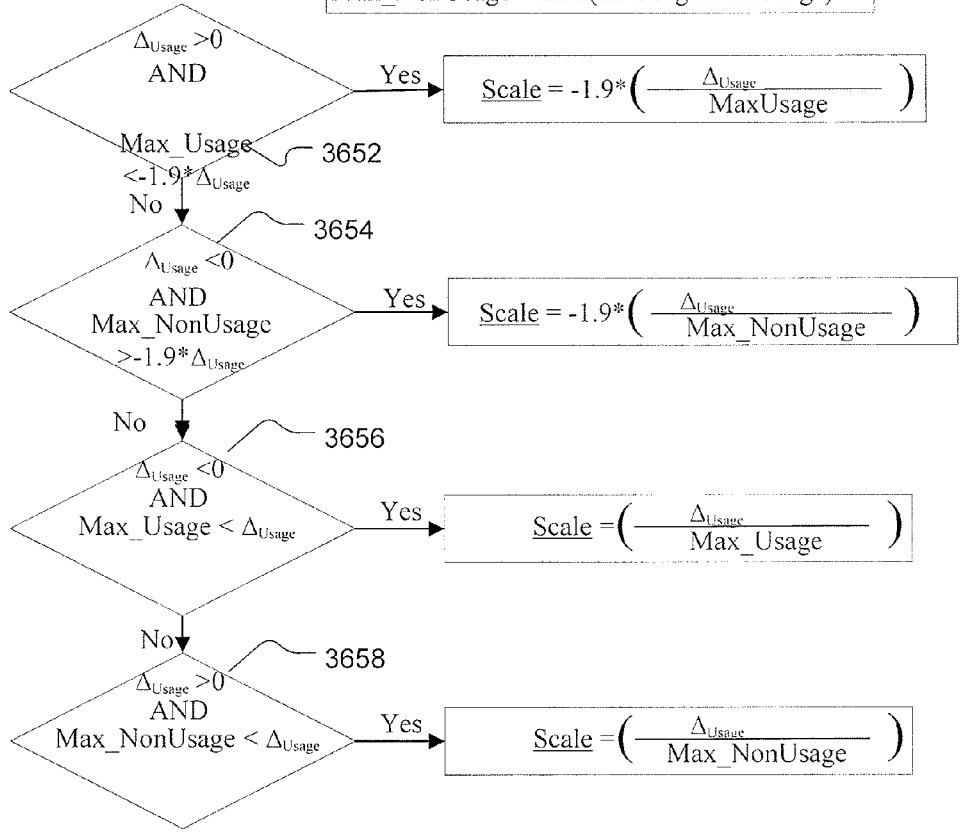
FIG. 36

PROCESSING AND REPORTING USAGE INFORMATION FOR AN HVAC SYSTEM CONTROLLED BY A NETWORK-CONNECTED THERMOSTAT

CROSS-REFERENCE TO RELATED APPLICATIONS

This patent application is a national stage entry of PCT/US13/34718, filed Mar. 29, 2013, which claims the benefit of U.S. Ser. No. 13/434,560 filed Mar. 29, 2012, which are hereby incorporated herein by reference in their entirety.

FIELD

This patent specification relates to systems, methods, and related computer program products for the monitoring and control of energy-consuming systems or other resource-consuming systems. More particularly, this patent specification relates to systems and methods for updating climate control algorithms.

BACKGROUND

Substantial effort and attention continues toward the development of newer and more sustainable energy supplies. The conservation of energy by increased energy efficiency remains crucial to the world's energy future. According to an October 2010 report from the U.S. Department of Energy, heating and cooling account for 56% of the energy use in a typical U.S. home, making it the largest energy expense for most homes. Along with improvements in the physical plant associated with home heating and cooling (e.g., improved insulation, higher efficiency furnaces), substantial increases in energy efficiency can be achieved by better control and regulation of home heating and cooling equipment. By activating heating, ventilation, and air conditioning (HVAC) equipment for judiciously selected time intervals and carefully chosen operating levels, substantial energy can be saved while at the same time keeping the living space suitably comfortable for its occupants.

To encourage users to adopt energy saving operating levels while still maintaining comfort for the occupants, it would be useful to the user to have access to HVAC performance information especially related to HVAC activity and energy consumption.

SUMMARY

Provided according to one or more embodiments is a method for method of interactively and graphically displaying performance information to a user of an HVAC system controlled by a thermostat is described. The method includes using the thermostat to gather information relating to HVAC system usage; on a remote display device, graphically displaying performance information based on the gathered information, the displayed performance information including a graphical daily summary for each of a plurality of days; and in response to a user selection of a day, graphically displaying on the display device detailed performance information for the user selected day.

According to some embodiments, the thermostat is self-programming network-connected thermostat, and the display device is a touch sensitive display on mobile computing device such as a smartphone or a tablet computer. According to some embodiments, the detailed performance information includes a graphical indication of HVAC activity on a timeline, and indicates the number of hours of HVAC activity. According to some embodiments the detailed performance information also can include: one or more symbols indicating setpoint changes, and a symbol indicating on a timeline when a setpoint was changed due to non-occupancy.

According to some embodiments, the user can toggle the display between the detailed performance information and the graphical summary. The graphical summary for a day can include a symbol indicating energy saving performance was achieved during the day, as well as a symbol indicating a primary causative agent which is responsible for above or below HVAC energy performance.

According to some embodiments, a method is described of analyzing performance information for an HVAC system controlled by a self-programming network-connected thermostat. The method includes: using the thermostat to gather information relating to HVAC system usage; calculating one or more HVAC usage parameters for a time interval as being above or below an average; evaluating a plurality of potential causative agents for potential causation for the calculated usage parameter being above or below the average; and based on the evaluation, selecting a primary causative agent.

According to some embodiments, the plurality of potential causative agents can include user changes to thermostat setpoints, weather, and/or an energy saving feature of the thermostat such as automatic detection of non-occupancy. The usage parameters can include a parameter relating to energy consumption, duration of HVAC system activity, and/or an amount of time multiplied by a temperature differential. According to some embodiments, a symbol indicating the selected primary causative agent is graphically displayed to the user.

According to some embodiments a method is described of encouraging a user to adopt energy saving thermostat temperature settings using an interactive display. The method includes: receiving user input representing a change in a temperature setting, such as a setpoint change; in response to received user input, displaying in real time a graphical symbol in a first form indicating to the user that the change in the temperature setting would result in moderate energy savings; receiving further user input indicating a further change in the temperature setting; and in response to the received further user input, in real time altering the first form of the graphical symbol to a second form indicating that the further change would result in even greater energy savings. According to some embodiments the second form of the graphical symbol has a higher contrast against a background and/or a more saturated color than the first form of the graphical symbol. According to some embodiments, the graphical symbol is in a leaf shape.

A further embodiment describes a method for characterizing the operation of an HVAC system controlled by an HVAC controller. First historical data are received, which data are representative of actual HVAC usage by the HVAC system for each of a first historical time interval and a second historical time interval. The first historical data are processed to determine an HVAC usage difference between the first historical time interval and the second historical time interval. Second historical data representative of one or more parameters characterizing each of a preselected plurality of causative agents over each of the first and second historical time intervals, each causative agent being known to at least partially influence HVAC usage by said HVAC system. The first and second historical data are processed to generate, for each causative agent, a model that characterizes a relationship between said one or more causative agent parameters and an associated HVAC usage estimate of said HVAC system. The second historical data is also processed in conjunction with the causative agent models to compute a relative contribution of each of the causative agents toward the HVAC usage difference between the first and second historical time intervals. An energy usage report is generated that includes at least (i) the HVAC usage difference between the first and second historical time intervals, and (ii) an attribution of a primary causative agent from the plurality of causative agents as a primary reason for the HVAC usage difference, wherein the primary causative agent has the highest relative contribution from the causative agents toward the HVAC usage difference; and displaying said energy usage report on an electronic display.

It will be appreciated that these systems and methods are novel, as are applications thereof and many of the components, systems, methods and algorithms employed and included therein. It should be appreciated that embodiments of the presently described inventive body of work can be implemented in numerous ways, including as processes, apparata, systems, devices, methods, computer readable media, computational algorithms, embedded or distributed software and/or as a combination thereof. Several illustrative embodiments are described below.

BRIEF DESCRIPTION OF THE DRAWINGS

The inventive body of work will be readily understood by referring to the following detailed description in conjunction with the accompanying drawings, in which:

FIG. 30 is an equation in accordance with an embodiment to quantify the estimated HVAC run time attributable Auto-Away;

FIG. 31 is an equation in accordance with an embodiment to quantify the estimated HVAC run time attributable Manual-Away;

FIG. 32 is an equation in accordance with an embodiment to quantify the estimated HVAC run time attributable to a change in temperature schedule;

FIG. 33 is an equation in accordance with an embodiment to quantify the estimated HVAC run time attributable to a manual change in a temperature schedule;

FIG. 34 is an equation in accordance with an embodiment to quantify the estimated HVAC run time attributable using the off-mode;

FIG. 35 is an equation in accordance with an embodiment to quantify the estimated HVAC run time attributable a difference in the calendar days between months;

FIG. 36 is an exemplary process flow to scale estimated HVAC run time for causal agents to have them make sense as compared to the actual HVAC run time;

DETAILED DESCRIPTION

Figure 1:
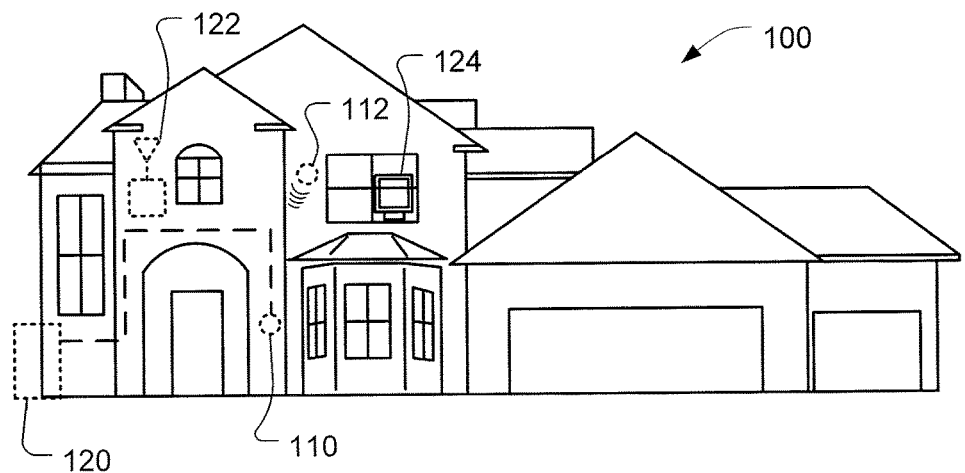
FIG. 1 is a diagram of an enclosure in which environmental conditions are controlled, according to some embodiments.

The subject matter of this patent specification also relates to the subject matter of the following commonly assigned applications: U.S. Ser. No. 12/881,430 filed Sep. 14, 2010; U.S. Ser. No. 12/881,463 filed Sep. 14, 2010; U.S. Prov. Ser. No. 61/415,771 filed Nov. 19, 2010; U.S. Prov. Ser. No. 61/429,093 filed Dec. 31, 2010; U.S. Ser. No. 12/984,602 filed Jan. 4, 2011; U.S. Ser. No. 12/987,257 filed Jan. 10, 2011; U.S. Ser. No. 13/033,573 filed Feb. 23, 2011; U.S. Ser. No. 29/386,021, filed Feb. 23, 2011; U.S. Ser. No. 13/034,666 filed Feb. 24, 2011; U.S. Ser. No. 13/034,674 filed Feb. 24, 2011; U.S. Ser. No. 13/034,678 filed Feb. 24, 2011; U.S. Ser. No. 13/038,191 filed Mar. 1, 2011; U.S. Ser. No. 13/038,206 filed Mar. 1, 2011; U.S. Ser. No. 29/399,609 filed Aug. 16, 2011; U.S. Ser. No. 29/399,614 filed Aug. 16, 2011; U.S. Ser. No. 29/399,617 filed Aug. 16, 2011; U.S. Ser. No. 29/399,618 filed Aug. 16, 2011; U.S. Ser. No. 29/399,621 filed Aug. 16, 2011; U.S. Ser. No. 29/399,623 filed Aug. 16, 2011; U.S. Ser. No. 29/399,625 filed Aug. 16, 2011; U.S. Ser. No. 29/399,627 filed Aug. 16, 2011; U.S. Ser. No. 29/399,630 filed Aug. 16, 2011; U.S. Ser. No. 29/399,632 filed Aug. 16, 2011; U.S. Ser. No. 29/399,633 filed Aug. 16, 2011; U.S. Ser. No. 29/399,636 filed Aug. 16, 2011; U.S. Ser. No. 29/399,637 filed Aug. 16, 2011; U.S. Ser. No. 13/199,108, filed Aug. 17, 2011; U.S. Ser. No. 13/267,871 filed Oct. 6, 2011; U.S. Ser. No. 13/267,877 filed Oct. 6, 2011; U.S. Ser. No. 13/269,501, filed Oct. 7, 2011; U.S. Ser. No. 29/404,096 filed Oct. 14, 2011; U.S. Ser. No. 29/404,097 filed Oct. 14, 2011; U.S. Ser. No. 29/404,098 filed Oct. 14, 2011; U.S. Ser. No. 29/404,099 filed Oct. 14, 2011; U.S. Ser. No. 29/404,101 filed Oct. 14, 2011; U.S. Ser. No. 29/404,103 filed Oct. 14, 2011; U.S. Ser. No. 29/404,104 filed Oct. 14, 2011; U.S. Ser. No. 29/404,105 filed Oct. 14, 2011; U.S. Ser. No. 13/275,307 filed Oct. 17, 2011; U.S. Ser. No. 13/275,311 filed Oct. 17, 2011; U.S. Ser. No. 13/317,423 filed Oct. 17, 2011; U.S. Ser. No. 13/279,151 filed Oct. 21, 2011; U.S. Ser. No. 13/317,557 filed Oct. 21, 2011; and U.S. Prov. Ser. No. 61/627,996 filed Oct. 21, 2011. PCT/US11/61339 filed Nov. 18, 2011; PCT/US11/61344 filed Nov. 18, 2011; PCT/US11/61365 filed Nov. 18, 2011; PCT/US11/61379 filed Nov. 18, 2011; PCT/US11/61391 filed Nov. 18, 2011; PCT/US11/61479 filed Nov. 18, 2011; PCT/US11/61457 filed Nov. 18, 2011; PCT/US11/61470 filed Nov. 18, 2011; PCT/US11/61339 filed Nov. 18, 2011; PCT/US11/61491 filed Nov. 18, 2011; PCT/US11/61437 filed Nov. 18, 2011; PCT/US11/61503 filed Nov. 18, 2011; U.S. Ser. No. 13/342,156 filed Jan. 2, 2012; PCT/US12/00008 filed Jan. 3, 2012; PCT/US12/20088 filed Jan. 3, 2012; PCT/US12/20026 filed Jan. 3, 2012; PCT/US12/00007 filed Jan. 3, 2012; U.S. Ser. No. 13/351,688 filed Jan. 17, 2012; U.S. Ser. No. 13/356,762 filed Jan. 24, 2012; and PCT/US12/30084 filed Mar. 22, 2012. Each of the above-referenced patent applications is incorporated by reference herein. The above-referenced patent applications are collectively referenced hereinbelow as "the commonly assigned incorporated applications."

A detailed description of the inventive body of work is provided below. While several embodiments are described, it should be understood that the inventive body of work is not limited to any one embodiment, but instead encompasses numerous alternatives, modifications, and equivalents. In addition, while numerous specific details are set forth in the following description in order to provide a thorough understanding of the inventive body of work, some embodiments can be practiced without some or all of these details. Moreover, for the purpose of clarity, certain technical material that is known in the related art has not been described in detail in order to avoid unnecessarily obscuring the inventive body of work.

As used herein the term "HVAC" includes systems providing both heating and cooling, heating only, cooling only, as well as systems that provide other occupant comfort and/or conditioning functionality such as humidification, dehumidification and ventilation.

As used herein the terms power "harvesting," "sharing" and "stealing" when referring to HVAC thermostats all refer to the thermostat are designed to derive power from the power transformer through the equipment load without using a direct or common wire source directly from the transformer.

As used herein the term "residential" when referring to an HVAC system means a type of HVAC system that is suitable to heat, cool and/or otherwise condition the interior of a building that is primarily used as a single family dwelling. An example of a cooling system that would be considered residential would have a cooling capacity of less than about 5 tons of refrigeration (1 ton of refrigeration=12,000 Btu/h).

As used herein the term "light commercial" when referring to an HVAC system means a type of HVAC system that is suitable to heat, cool and/or otherwise condition the interior of a building that is primarily used for commercial purposes, but is of a size and construction that a residential HVAC system is considered suitable. An example of a cooling system that would be considered residential would have a cooling capacity of less than about 5 tons of refrigeration.

As used herein the term "thermostat" means a device or system for regulating parameters such as temperature and/or humidity within at least a part of an enclosure. The term "thermostat" may include a control unit for a heating and/or cooling system or a component part of a heater or air conditioner. As used herein the term "thermostat" can also refer generally to a versatile sensing and control unit (VSCU unit) that is configured and adapted to provide sophisticated, customized, energy-saving HVAC control functionality while at the same time being visually appealing, non-intimidating, elegant to behold, and delightfully easy to use.

FIG. 1 is a diagram of an enclosure in which environmental conditions are controlled, according to some embodiments. Enclosure 100 is, in this example, a single-family dwelling. According to other embodiments, the enclosure can be, for example, a duplex, an apartment within an apartment building, a light commercial structure such as an office or retail store, or a structure or enclosure that is a combination of the above. Thermostat 110 controls HVAC system 120 as will be described in further detail below. According to some embodiments, the HVAC system 120 is has a cooling capacity less than about 5 tons. According to some embodiments, a remote device 112 wirelessly communicates with the thermostat 110 and can be used to display information to a user and to receive user input from the remote location of the device 112. Although many of the embodiments are described herein as being carried out by a thermostat such as thermostat 110, according to some embodiments, the same or similar techniques are employed using a remote device such as device 112.

Some embodiments of thermostat 110 in FIG. 1 incorporate one or more sensors to gather data from the environment associated with enclosure 100. Sensors incorporated in thermostat 110 may detect occupancy, temperature, light and other environmental conditions and influence the control and operation of HVAC system 120. Sensors incorporated within thermostat 110 do not protrude from the surface of the thermostat 110 thereby providing a sleek and elegant design that does not draw attention from the occupants in a house or other enclosure. As a result, thermostat 110 readily fits with almost any décor while adding to the overall appeal of the interior design.

As used herein, a "learning" thermostat refers to a thermostat, or one of plural communicating thermostats in a multi-thermostat network, having an ability to automatically establish and/or modify at least one future setpoint in a heating and/or cooling schedule based on at least one automatically sensed event and/or at least one past or current user input. As used herein, a "primary" thermostat refers to a thermostat that is electrically connected to actuate all or part of an HVAC system, such as by virtue of electrical connection to HVAC control wires (e.g. W, G, Y, etc.) leading to the HVAC system. As used herein, an "auxiliary" thermostat refers to a thermostat that is not electrically connected to actuate an HVAC system, but that otherwise contains at least one sensor and influences or facilitates primary thermostat control of an HVAC system by virtue of data communications with the primary thermostat. In one particularly useful scenario, the thermostat 110 is a primary learning thermostat and is wall-mounted and connected to all of the HVAC control wires, while the remote thermostat 112 is an auxiliary learning thermostat positioned on a nightstand or dresser, the auxiliary learning thermostat being similar in appearance and user-interface features as the primary learning thermostat, the auxiliary learning thermostat further having similar sensing capabilities (e.g., temperature, humidity, motion, ambient light, proximity) as the primary learning thermostat, but the auxiliary learning thermostat not being connected to any of the HVAC wires. Although it is not connected to any HVAC wires, the auxiliary learning thermostat wirelessly communicates with and cooperates with the primary learning thermostat for improved control of the HVAC system, such as by providing additional temperature data at its respective location in the enclosure, providing additional occupancy information, providing an additional user interface for the user, and so forth.

It is to be appreciated that while certain embodiments are particularly advantageous where the thermostat 110 is a primary learning thermostat and the remote thermostat 112 is an auxiliary learning thermostat, the scope of the present teachings is not so limited. Thus, for example, while certain initial provisioning methods that automatically pair associate a network-connected thermostat with an online user account are particularly advantageous where the thermostat is a primary learning thermostat, the methods are more generally applicable to scenarios involving primary non-learning thermostats, auxiliary learning thermostats, auxiliary non-learning thermostats, or other types of network-connected thermostats and/or network-connected sensors.

By way of further example, while certain graphical user interfaces for remote control of a thermostat may be particularly advantageous where the thermostat is a primary learning thermostat, the methods are more generally applicable to scenarios involving primary non-learning thermostats, auxiliary learning thermostats, auxiliary non-learning thermostats, or other types of network-connected thermostats and/or network-connected sensors. By way of even further example, while certain methods for cooperative, battery-conserving information polling of a thermostat by a remote cloud-based management server may be particularly advantageous where the thermostat is a primary learning thermostat, the methods are more generally applicable to scenarios involving primary non-learning thermostats, auxiliary learning thermostats, auxiliary non-learning thermostats, or other types of network-connected thermostats and/or network-connected sensors.

Enclosure 100 further includes a private network accessible both wirelessly and through wired connections and may also be referred to as a Local Area Network or LAN. Network devices on the private network include a computer 124, thermostat 110 and remote thermostat 112 in accordance with some embodiments of the present invention. In one embodiment, the private network is implemented using an integrated router 122 that provides routing, wireless access point functionality, firewall and multiple wired connection ports for connecting to various wired network devices, such as computer 124. Other embodiments may instead use multiple discrete switches, routers and other devices (not shown) to perform networking functions equivalent to or in addition to those provided by integrated router 122.

Integrated router 122 further provides network devices access to a public network, such as the Internet, provided enclosure 100 has a connection to the public network generally through a cable-modem, DSL modem and a service provider of the Internet or other public network. The Internet and other public networks are sometimes referred to as a Wide-Area Network or WAN. In one embodiment, integrated router 122 may direct communications to other devices on these networks using a network protocol such as TCP/IP. If the communications are directed to a device or service outside the private network, integrated router 122 may route the communications outside the private network to the public network such as the Internet.

In some embodiments, thermostat 110 may wirelessly communicate with remote thermostat 112 over the private network or through an ad hoc network formed directly with remote thermostat 112. During communication with remote thermostat 112, thermostat 110 may gather information remotely from the user and from the environment detectable by the remote thermostat 112. For example, remote thermostat 112 may wirelessly communicate with the thermostat 110 providing user input from the remote location of remote thermostat 112 or may be used to display information to a user, or both. Like thermostat 110, embodiments of remote thermostat 112 may also include sensors to gather data related to occupancy, temperature, light and other environmental conditions. In an alternate embodiment, remote thermostat 112 may also be located outside of the enclosure 100.

In accordance with some embodiments, a computer device 124 in enclosure 100 may remotely control thermostat 110 by accessing a thermostat management account through a thermostat management system (not shown in FIG. 1) located on a public network such as the Internet. The thermostat management system passes control information over the network back to thermostat 110 provided the thermostat 110 is also associated or paired to the thermostat management account on the thermostat management system. Data collected by thermostat 110 also passes from the private network associated with enclosure 100 through integrated router 122 and to the thermostat management system over the public network. Other computer devices not in enclosure 100 such as Smartphones, laptops and tablet computers (not shown in FIG. 1) may also control thermostat 110 provided they have access to the public network and both the thermostat management system and thermostat management account. Further details on accessing the public network, such as the Internet, and a thermostat like thermostat 110 in accordance with embodiments of the present invention is described in further detail later herein.

Figure 2:
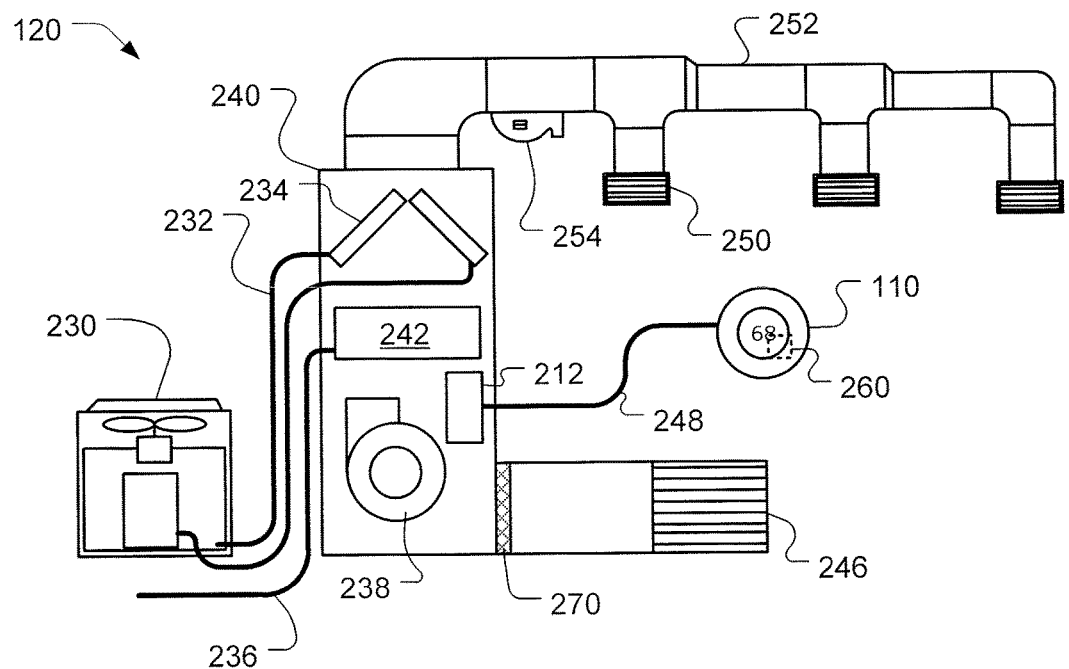
FIG. 2 is a diagram of an HVAC system, according to some embodiments.

FIG. 2 is a schematic diagram of an HVAC system, according to some embodiments. HVAC system 120 provides heating, cooling, ventilation, and/or air handling for the enclosure 100, such as a single-family home depicted in FIG. 1. System 120 depicts a forced air type heating and cooling system, although according to other embodiments, other types of HVAC systems could be used such as radiant heat based systems, heat-pump based systems, and others.

In heating, heating coils or elements 242 within air handler 240 provide a source of heat using electricity or gas via line 236. Cool air is drawn from the enclosure via return air duct 246 through filter 270, using fan 238 and is heated through heating coils or elements 242. The heated air flows back into the enclosure at one or more locations via supply air duct system 252 and supply air registers such as register 250. In cooling, an outside compressor 230 passes a gas such as Freon through a set of heat exchanger coils and then through an expansion valve. The gas then goes through line 232 to the cooling coils or evaporator coils 234 in the air handler 240 where it expands, cools and cools the air being circulated via fan 238. A humidifier 254 may optionally be included in various embodiments that returns moisture to the air before it passes through duct system 252. Although not shown in FIG. 2, alternate embodiments of HVAC system 120 may have other functionality such as venting air to and from the outside, one or more dampers to control airflow within the duct system 252 and an emergency heating unit. Overall operation of HVAC system 120 is selectively actuated by control electronics 212 communicating with thermostat 110 over control wires 248.

Figure 3A:
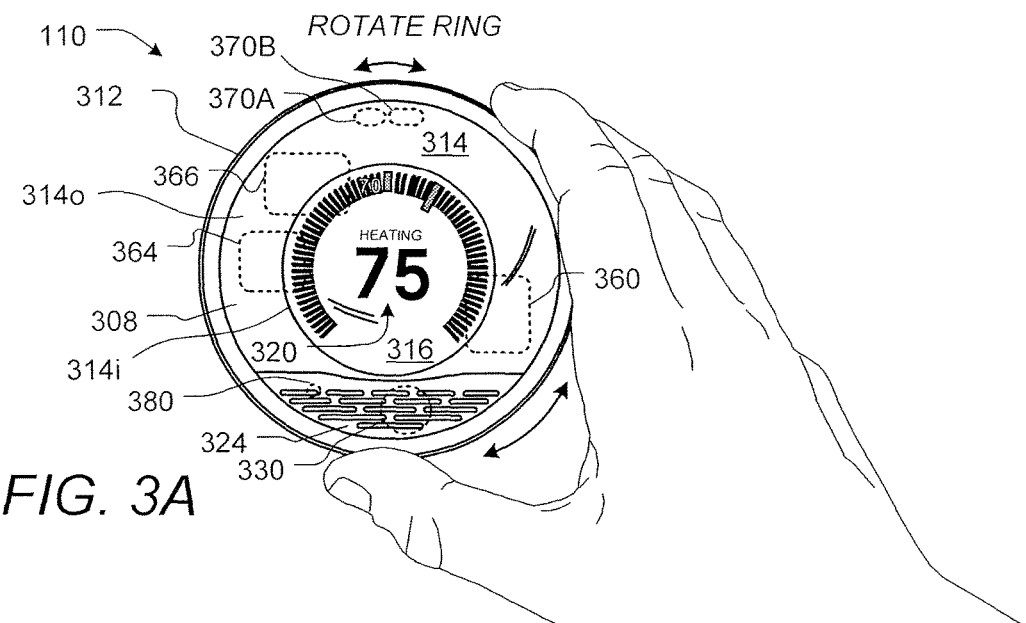
FIGS. 3A-3B illustrate a thermostat having a user-friendly interface, according to some embodiments.
Figure 3B:
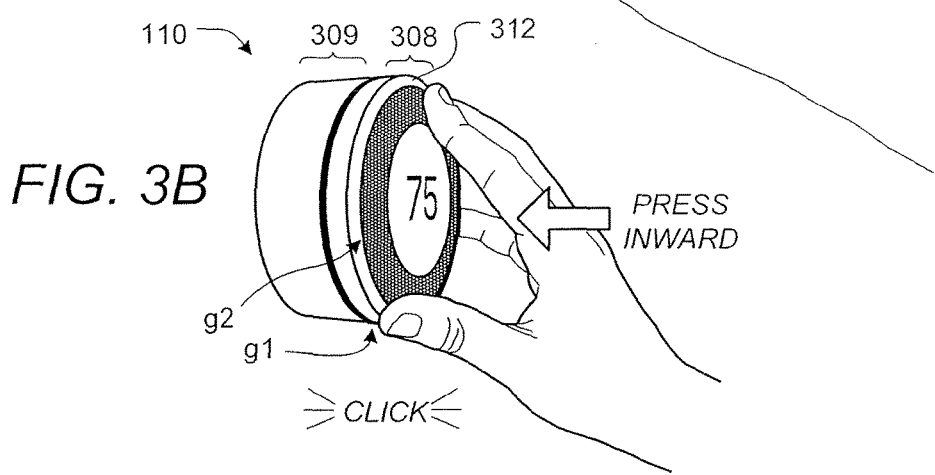

FIGS. 3A-3B illustrate a thermostat having a user-friendly interface, according to some embodiments. Unlike many prior art thermostats, thermostat 110 preferably has a sleek, simple, uncluttered and elegant design that does not detract from home decoration, and indeed can serve as a visually pleasing centerpiece for the immediate location in which it is installed. Moreover, user interaction with thermostat 110 is facilitated and greatly enhanced over known conventional thermostats by the design of thermostat 110. The thermostat 110 includes control circuitry and is electrically connected to an HVAC system, such as is shown in FIGS. 1 and 2. Thermostat 110 is wall mounted, is circular in shape, and has an outer rotatable ring 312 for receiving user input. Thermostat 110 is circular in shape in that it appears as a generally disk-like circular object when mounted on the wall. Thermostat 110 has a large front face lying inside the outer ring 312. According to some embodiments, thermostat 110 is approximately 80 mm in diameter. The outer rotatable ring 312 allows the user to make adjustments, such as selecting a new target temperature. For example, by rotating the outer ring 312 clockwise, the target temperature can be increased, and by rotating the outer ring 312 counter-clockwise, the target temperature can be decreased. The front face of the thermostat 110 comprises a clear cover 314 that according to some embodiments is polycarbonate, and a metallic portion 324 preferably having a number of slots formed therein as shown. According to some embodiments, the surface of cover 314 and metallic portion 324 form a common outward arc or spherical shape gently arcing outward, and this gentle arcing shape is continued by the outer ring 312.

Although being formed from a single lens-like piece of material such as polycarbonate, the cover 314 has two different regions or portions including an outer portion 314o and a central portion 314i. According to some embodiments, the cover 314 is painted or smoked around the outer portion 314o, but leaves the central portion 314i visibly clear so as to facilitate viewing of an electronic display 316 disposed thereunderneath. According to some embodiments, the curved cover 314 acts as a lens that tends to magnify the information being displayed in electronic display 316 to users. According to some embodiments the central electronic display 316 is a dot-matrix layout (individually addressable) such that arbitrary shapes can be generated, rather than being a segmented layout. According to some embodiments, a combination of dot-matrix layout and segmented layout is employed. According to some embodiments, central display 316 is a backlit color liquid crystal display (LCD). An example of information displayed on the electronic display 316 is illustrated in FIG. 3A, and includes central numerals 320 that are representative of a current setpoint temperature. According to some embodiments, metallic portion 324 has a number of slot-like openings so as to facilitate the use of a passive infrared motion sensor 330 mounted thereunderneath. The metallic portion 324 can alternatively be termed a metallic front grille portion. Further description of the metallic portion/front grille portion is provided in the commonly assigned U.S. Ser. No. 13/199, 108, supra. The thermostat 110 is preferably constructed such that the electronic display 316 is at a fixed orientation and does not rotate with the outer ring 312, so that the electronic display 316 remains easily read by the user. For some embodiments, the cover 314 and metallic portion 324 also remain at a fixed orientation and do not rotate with the outer ring 312. According to one embodiment in which the diameter of the thermostat 110 is about 80 mm, the diameter of the electronic display 316 is about 45 mm. According to some embodiments an LED indicator 380 is positioned beneath portion 324 to act as a low-power-consuming indicator of certain status conditions. For example, the LED indicator 380 can be used to display blinking red when a rechargeable battery of the thermostat (see FIG. 4A, infra) is very low and is being recharged. More generally, the LED indicator 380 can be used for communicating one or more status codes or error codes by virtue of red color, green color, various combinations of red and green, various different blinking rates, and so forth, which can be useful for troubleshooting purposes.

Motion sensing as well as other techniques can be use used in the detection and/or predict of occupancy, as is described further in the commonly assigned U.S. Ser. No. 12/881,430, supra. According to some embodiments, occupancy information is used in generating an effective and efficient scheduled program. Preferably, an active proximity sensor 370A is provided to detect an approaching user by infrared light reflection, and an ambient light sensor 370B is provided to sense visible light. The proximity sensor 370A can be used to detect proximity in the range of about one meter so that the thermostat 110 can initiate "waking up" when the user is approaching the thermostat and prior to the user touching the thermostat. Such use of proximity sensing is useful for enhancing the user experience by being "ready" for interaction as soon as, or very soon after the user is ready to interact with the thermostat. Further, the wake-up-on-proximity functionality also allows for energy savings within the thermostat by "sleeping" when no user interaction is taking place or about to take place. The ambient light sensor 370B can be used for a variety of intelligence-gathering purposes, such as for facilitating confirmation of occupancy when sharp rising or falling edges are detected (because it is likely that there are occupants who are turning the lights on and off), and such as for detecting long term (e.g., 24-hour) patterns of ambient light intensity for confirming and/or automatically establishing the time of day.

According to some embodiments, for the combined purposes of inspiring user confidence and further promoting visual and functional elegance, the thermostat 110 is controlled by only two types of user input, the first being a rotation of the outer ring 312 as shown in FIG. 3A (referenced hereafter as a "rotate ring" or "ring rotation" input), and the second being an inward push on an outer cap 308 (see FIG. 3B) until an audible and/or tactile "click" occurs (referenced hereafter as an "inward click" or simply "click" input). For the embodiment of FIGS. 3A-3B, the outer cap 308 is an assembly that includes all of the outer ring 312, cover 314, electronic display 316, and metallic portion 324. When pressed inwardly by the user, the outer cap 308 travels inwardly by a small amount, such as 0.5 mm, against an interior metallic dome switch (not shown), and then springably travels back outwardly by that same amount when the inward pressure is released, providing a satisfying tactile "click" sensation to the user's hand, along with a corresponding gentle audible clicking sound. Thus, for the embodiment of FIGS. 3A-3B, an inward click can be achieved by direct pressing on the outer ring 312 itself, or by indirect pressing of the outer ring by virtue of providing inward pressure on the cover 314, metallic portion 314, or by various combinations thereof. For other embodiments, the thermostat 110 can be mechanically configured such that only the outer ring 312 travels inwardly for the inward click input, while the cover 314 and metallic portion 324 remain motionless. It is to be appreciated that a variety of different selections and combinations of the particular mechanical elements that will travel inwardly to achieve the "inward click" input are within the scope of the present teachings, whether it be the outer ring 312 itself, some part of the cover 314, or some combination thereof. However, it has been found particularly advantageous to provide the user with an ability to quickly go back and forth between registering "ring rotations" and "inward clicks" with a single hand and with minimal amount of time and effort involved, and so the ability to provide an inward click directly by pressing the outer ring 312 has been found particularly advantageous, since the user's fingers do not need to be lifted out of contact with the device, or slid along its surface, in order to go between ring rotations and inward clicks. Moreover, by virtue of the strategic placement of the electronic display 316 centrally inside the rotatable ring 312, a further advantage is provided in that the user can naturally focus their attention on the electronic display throughout the input process, right in the middle of where their hand is performing its functions. The combination of intuitive outer ring rotation, especially as applied to (but not limited to) the changing of a thermostat's setpoint temperature, conveniently folded together with the satisfying physical sensation of inward clicking, together with accommodating natural focus on the electronic display in the central midst of their fingers' activity, adds significantly to an intuitive, seamless, and downright fun user experience. Further descriptions of advantageous mechanical user-interfaces and related designs, which are employed according to some embodiments, can be found in U.S. Ser. No. 13/033,573, supra, U.S. Ser. No. 29/386,021, supra, and U.S. Ser. No. 13/199,108, supra.

Figure 3C:
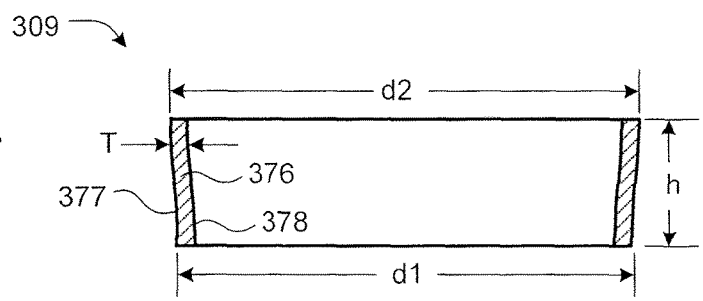
FIG. 3C illustrates a cross-sectional view of a shell portion of a frame of the thermostat of FIGS. 3A-3B.

FIG. 3C illustrates a cross-sectional view of a shell portion 309 of a frame of the thermostat of FIGS. 3A-B, which has been found to provide a particularly pleasing and adaptable visual appearance of the overall thermostat 110 when viewed against a variety of different wall colors and wall textures in a variety of different home environments and home settings. While the thermostat itself will functionally adapt to the user's schedule as described herein and in one or more of the commonly assigned incorporated applications, supra, the outer shell portion 309 is specially configured to convey a "chameleon" quality or characteristic such that the overall device appears to naturally blend in, in a visual and decorative sense, with many of the most common wall colors and wall textures found in home and business environments, at least in part because it will appear to assume the surrounding colors and even textures when viewed from many different angles. The shell portion 309 has the shape of a frustum that is gently curved when viewed in cross-section, and comprises a sidewall 376 that is made of a clear solid material, such as polycarbonate plastic. The sidewall 376 is backpainted with a substantially flat silver- or nickel-colored paint, the paint being applied to an inside surface 378 of the sidewall 376 but not to an outside surface 377 thereof. The outside surface 377 is smooth and glossy but is not painted. The sidewall 376 can have a thickness T of about 1.5 mm, a diameter d1 of about 78.8 mm at a first end that is nearer to the wall when mounted, and a diameter d2 of about 81.2 mm at a second end that is farther from the wall when mounted, the diameter change taking place across an outward width dimension "h" of about 22.5 mm, the diameter change taking place in either a linear fashion or, more preferably, a slightly nonlinear fashion with increasing outward distance to form a slightly curved shape when viewed in profile, as shown in FIG. 3C. The outer ring 312 of outer cap 308 is preferably constructed to match the diameter d2 where disposed near the second end of the shell portion 309 across a modestly sized gap g1 therefrom, and then to gently arc back inwardly to meet the cover 314 across a small gap g2. It is to be appreciated, of course, that FIG. 3C only illustrates the outer shell portion 309 of the thermostat 110, and that there are many electronic components internal thereto that are omitted from FIG. 3C for clarity of presentation, such electronic components being described further hereinbelow and/or in other ones of the commonly assigned incorporated applications, such as U.S. Ser. No. 13/199,108, supra.

According to some embodiments, the thermostat 110 includes a processing system 360, display driver 364 and a wireless communications system 366. The processing system 360 is adapted to cause the display driver 364 and display area 316 to display information to the user, and to receiver user input via the rotatable ring 312. The processing system 360, according to some embodiments, is capable of carrying out the governance of the operation of thermostat 110 including the user interface features described herein. The processing system 360 is further programmed and configured to carry out other operations as described further hereinbelow and/or in other ones of the commonly assigned incorporated applications. For example, processing system 360 is further programmed and configured to maintain and update a thermodynamic model for the enclosure in which the HVAC system is installed, such as described in U.S. Ser. No. 12/881,463, supra, and in International Patent App. No. PCT/US11/51579, incorporated herein by reference. According to some embodiments, the wireless communications system 366 is used to communicate with devices such as personal computers and/or other thermostats or HVAC system components, which can be peer-to-peer communications, communications through one or more servers located on a private network, and/or communications through a cloud-based service.

Figure 4:
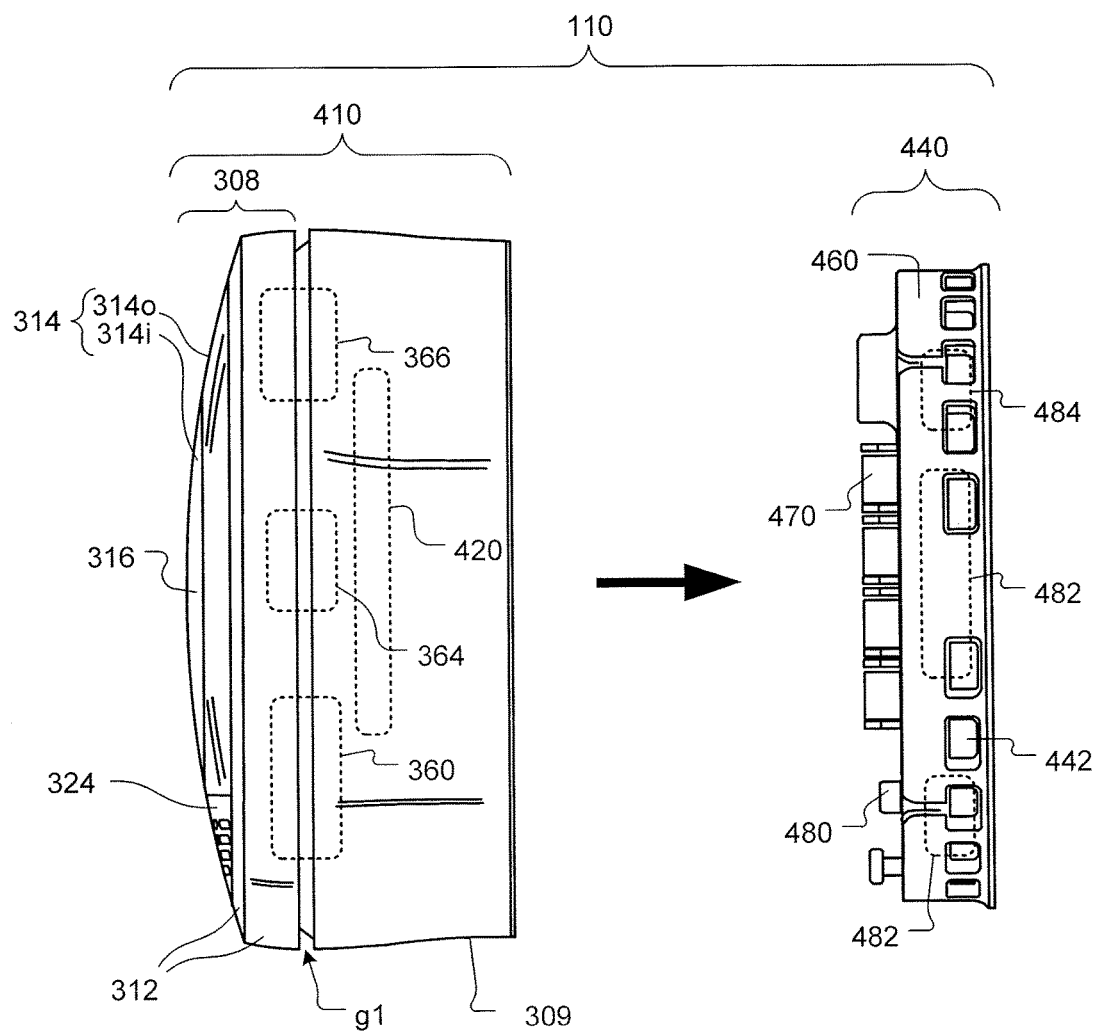
FIG. 4 illustrates a thermostat having a head unit and a backplate (or wall dock) for ease of installation, configuration and upgrading, according to some embodiments.

FIG. 4 illustrates a side view of the thermostat 110 including a head unit 410 and a backplate (or wall dock) 440 thereof for ease of installation, configuration and upgrading, according to some embodiments. As is described hereinabove, thermostat 110 is wall mounted is circular in shape, and has an outer rotatable ring 312 for receiving user input. Head unit 410 includes the outer cap 308 that includes the cover 314 and electronic display 316. Head unit 410 of round thermostat 110 is slidably mountable onto back plate 440 and slidably detachable therefrom. According to some embodiments the connection of the head unit 410 to backplate 440 can be accomplished using magnets, bayonet, latches and catches, tabs or ribs with matching indentations, or simply friction on mating portions of the head unit 410 and backplate 440. According to some embodiments, the head unit 410 includes a processing system 360, display driver 364 and a wireless communications system 366. Also shown is a rechargeable battery 420 that is recharged using recharging circuitry 422 that uses power from backplate that is either obtained via power harvesting (also referred to as power stealing and/or power sharing) from the HVAC system control circuit(s) or from a common wire, if available, as described in further detail in co-pending patent application U.S. Ser. No. 13/034,674, and Ser. No. 13/034,678, which are incorporated by reference herein. According to some embodiments, rechargeable battery 420 is a single cell lithium-ion or a lithium-polymer battery.

Backplate 440 includes electronics 482 and a temperature/humidity sensor 484 in housing 460, which are ventilated via vents 442. Two or more temperature sensors (not shown) are also located in the head unit 410 and cooperate to acquire reliable and accurate room temperature data. Wire connectors 470 are provided to allow for connection to HVAC system wires. Connection terminal 480 provides electrical connections between the head unit 410 and backplate 440. Backplate electronics 482 also includes power sharing circuitry for sensing and harvesting power available power from the HVAC system circuitry.

Figure 5:
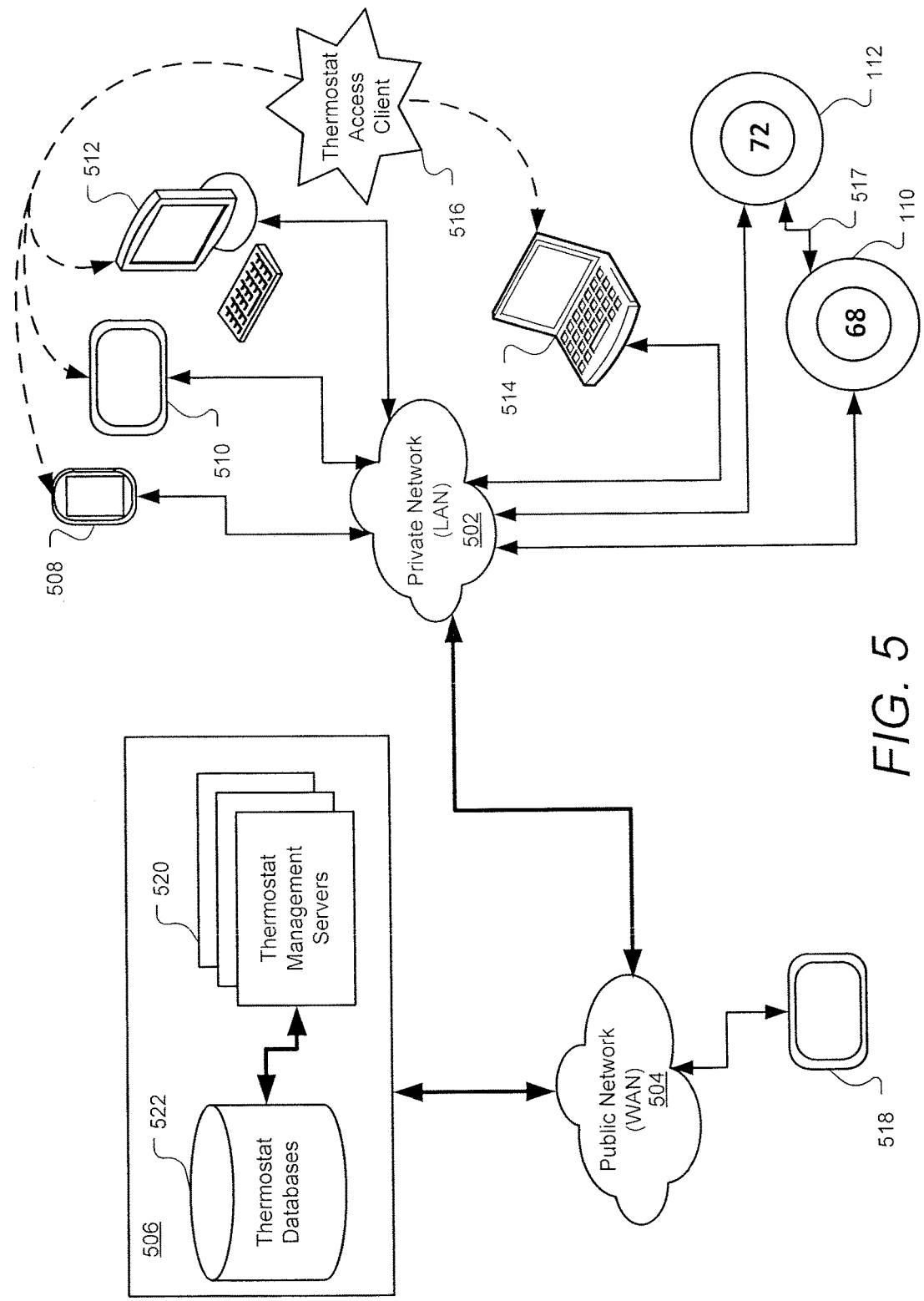
FIG. 5 illustrates thermostats and computers on a private network connected to a cloud-based thermostat management system designed in accordance with some embodiments.

FIG. 5 illustrates thermostats and computers on a private network 502 connected to a cloud-based thermostat management system 506 designed in accordance with some embodiments. In one embodiment, private network 502 is designed to provide network connectivity primarily within and near an enclosure, such as enclosure 100 in FIG. 1. Private network 502 additionally provides network connectivity for various devices such a smartphone 508, tablet 510, computer 512, and laptop 514, as well as the thermostat 110 and remote thermostat 112. A router (not shown) in private network 502, such as integrated router 122 in FIG. 1, may provide wired and wireless connectivity for these devices using a network protocol such as TCP/IP. Preferably, thermostat 110 and remote thermostat 112 are connected wirelessly to private network 502, for at least the reason that wired connections to the locations of the thermostats may not available, or it may be undesirable to incorporate such physical connections in either thermostat 110 or remote thermostat 112. For some embodiments, it is also possible for thermostat 110 and remote thermostat 112 to communicate directly with each other and other devices wireless using an ad hoc network 517 preferably setup directly between the devices and bypassing private network 502.

The embodiments described herein are advantageously configured to be compatible with a large variety of conventional integrated routers that service a large population of homes and businesses. Thus, by way of example only and not by way of limitation, the router (not shown) that services the private network 502 of FIG. 5 can be, for example, a D-Link DIR-655 Extreme N Wireless Router, a Netgear WNDR3700 RangeMax Dual Band Wireless USB Gigabit Router, a Buffalo Technology Nfiniti WZR-HP-G300NH Wireless-N Router, an Asus RT-N16 Wireless Router, Cisco Linksys E4200 Dual Band Wireless Router, or a Cisco Linksys E4200 Dual Band Wireless Router. Without loss of generality, some descriptions further hereinbelow will refer to an exemplary scenario in which the thermostats 110/112 are used in a home environment. However, it is to be appreciated that the described embodiments are not so limited, and are applicable to use of such thermostat(s) in any of a variety of enclosures including residential homes, business, vacation homes, hotels, hotel rooms, industrial facilities, and generally anywhere there is an HVAC system to be controlled.

Thermostat access client 516 is a client application designed in accordance with aspects of the present invention to access the thermostat management system 506 over public network 504. The term "thermostat management system" can be interchangeably referenced as a "cloud-based management server" for the thermostats, or more simply "cloud server", in various descriptions hereinabove and hereinbelow. Because thermostat access client 516 is designed to execute on different devices, multiple client applications may be developed using different technologies based on the requirements of the underlying device platform or operating system. For some embodiments, thermostat access client 516 is implemented such that end users operate their Internet-accessible devices (e.g., desktop computers, notebook computers, Internet-enabled mobile devices, cellphones having rendering engines, or the like) that are capable of accessing and interacting with the thermostat management system 506. The end user machine or device has a web browser (e.g., Internet Explorer, Firefox, Chrome, Safari) or other rendering engine that, typically, is compatible with AJAX technologies (e.g., XHTML, XML, CSS, DOM, JSON, and the like). AJAX technologies include XHTML (Extensible HTML) and CSS (Cascading Style Sheets) for marking up and styling information, the use of DOM (Document Object Model) accessed with client-side scripting languages, the use of an XMLHttpRequest object (an API used by a scripting language) to transfer XML and other text data asynchronously to and from a server using HTTP), and use of XML or JSON (Javascript Object Notation, a lightweight data interchange format) as a format to transfer data between the server and the client. In a web environment, an end user accesses the site in the usual manner, i.e., by opening the browser to a URL associated with a service provider domain. The user may authenticate to the site (or some portion thereof) by entry of a username and password. The connection between the end user entity machine and the system may be private (e.g., via SSL). The server side of the system may comprise conventional hosting components, such as IP switches, web servers, application servers, administration servers, databases, and the like. Where AJAX is used on the client side, client side code (an AJAX shim) executes natively in the end user's web browser or other rendering engine. Typically, this code is served to the client machine when the end user accesses the site, although in the alternative it may be resident on the client machine persistently. Finally, while a web-based application over Internet Protocol (IP) is described, this is not a limitation, as the techniques and exposed user interface technologies may be provided by a standalone application in any runtime application, whether fixed line or mobile. It is to be appreciated that although the TCP/IP protocol is set forth as the network protocol used for communications among the thermostat management system 506, the thermostat access client 514, and other devices for some embodiments, it is set forth by way of example and not by way of limitation, in that any other suitable protocol, such as UDP over IP in particular, may be used without departing from the scope of the present teachings.

In yet another embodiment, thermostat access client 516 may be a stand-alone application or "app" designed to be downloaded and run on a specific device such as smartphone 508 or a tablet 510 device running the Apple iOS operating system, Android operating system, or others. Developers create these stand-alone applications using a set of application programming interfaces (APIs) and libraries provided by the device manufacturer packaged in software development toolkit or SDK. Once completed, the "app" is made available for download to the respective device through an application store or "app" store curated by the app store owners to promote quality, usability and customer satisfaction.

In one embodiment, thermostat management system 506 illustrated in FIG. 5 may be accessed over public network 504 by computer devices on private network 502 running thermostat access client 516. Thermostat access client 516 accesses a thermostat management account (not illustrated) provisioned by thermostat management system 506, on behalf of the computer devices, in order to access or control thermostat 110 or remote thermostat 112. In addition, a computer device on private network 502 such as computer 512 may use the thermostat access client 516 and thermostat management account to gather data from thermostat 110 and remote thermostat 112.

Thermostat 110 and remote thermostat 112 may be accessed remotely from numerous different locations on the private network 502 or public network 504. As will be described in further detail hereinbelow, upon installation a thermostat such as thermostat 110 first registers with the thermostat management system 506 and then requests the thermostat management system create a pairing between the thermostat and a corresponding thermostat management account. Thereafter, a device such as a tablet 518 may be connected to public network 504 directly or through a series of other private networks (not shown) yet still access these thermostats, while outside the private network where they are located, by way of thermostat management system 506. In one embodiment, a tablet 518 running the Apple iOS operating system may remotely access to these thermostats through the thermostat management system 506 and thermostat management account using an iOS "app" version of thermostat access client 516. Pairing thermostats with the thermostat management account allows tablet 518 and other computer devices to remotely control, gather data, and generally interact with thermostats such as thermostat 110 and remote thermostat 112.

In one embodiment, thermostat management system 506 distributes the task of communication and control with the thermostats to one or more thermostat management servers 520. These thermostat management servers 520 may coordinate communication, manage access, process data and analyze results using data produced by thermostats such as thermostat 110 and remote thermostat 112. Intermediate and final results from computations on these servers 520, as well as raw data, may be stored temporarily or archived on thermostat databases 522 for future reference and use. Thermostat management servers 520 may also send a portion of the data along with control information, and more generally any of a variety of different kinds of information, back to thermostat 110 and remote thermostat 112. Results from the thermostat management servers 520 may also be stored in one or more thermostat databases 522 for subsequent access by a device such as tablet 518 running thermostat access client 516.

These thermostat management servers 520 each may perform one or several discrete functions, may serve as redundant fail-over servers for these different discrete functions or may share performance of certain discrete functions in tandem or in a cluster as well as other combinations performing more complex operations in parallel or distributed over one or more clusters of computers. In some embodiments, one of the thermostat management servers 520 may correspond directly to a physical computer or computing device while in other embodiments, the thermostat management servers 520 may be virtualized servers running on one or more physical computers under the control of a virtual machine computing environment such as provided by VMWARE of Palo Alto, Calif. or any other virtual machine provider. In yet another embodiment, the thermostat management servers 520 and thermostat databases 522 are provisioned from a "cloud" computing and storage environment such as the Elastic Compute Cloud or EC2 offering from Amazon.com of Seattle, Wash. In an EC2 solution, for example, the thermostat management servers 520 may be allocated according to processor cycles and storage requirements rather than according to a number of computers, either real or virtual, thought to be required for the task at hand.

Figure 6:
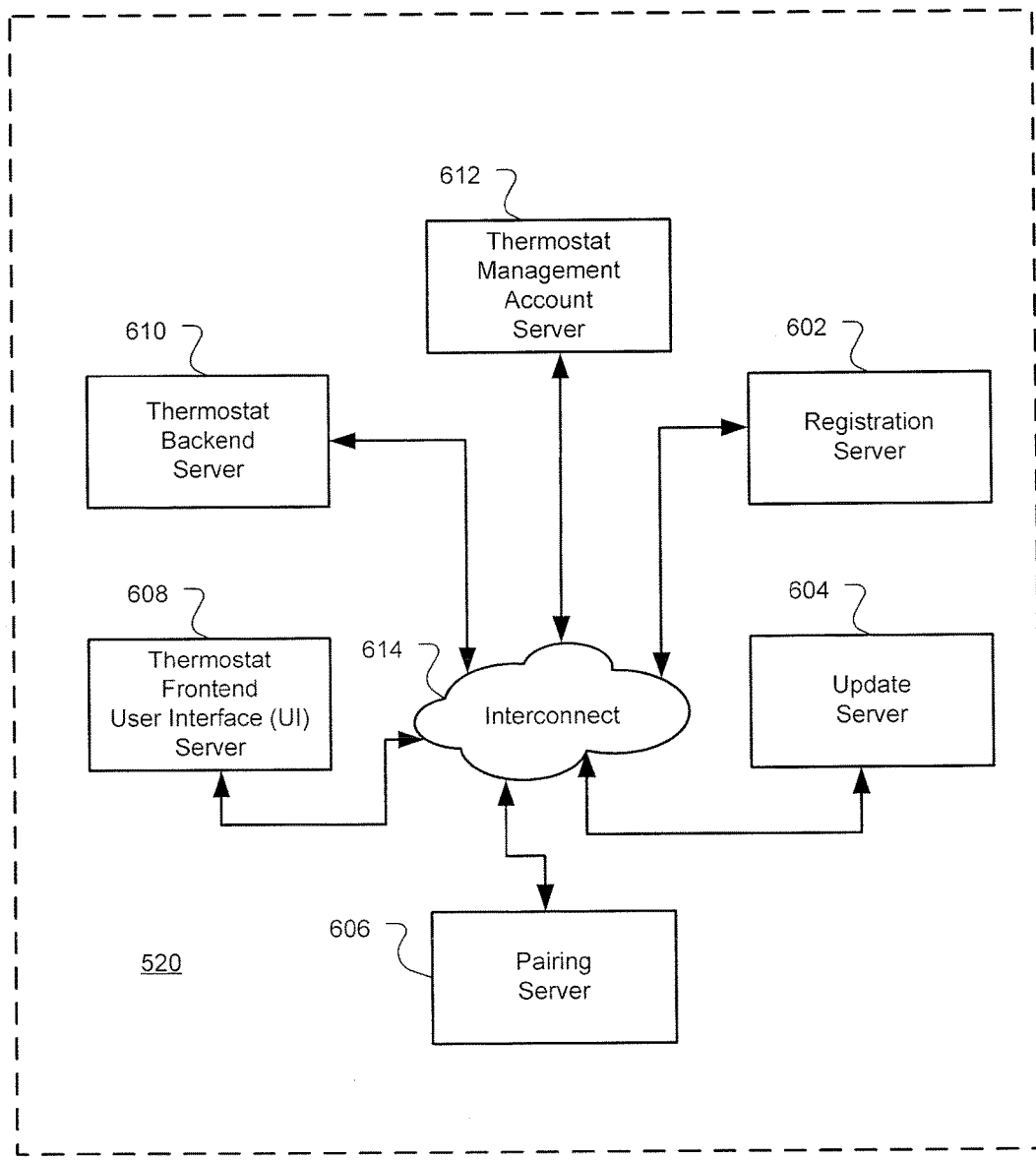
FIG. 6 illustrates one combination of thermostat management servers used to implement a thermostat management system in accordance with some embodiments.

FIG. 6 illustrates one combination of thermostat management servers 520 used to implement a thermostat management system 506 in accordance with some embodiments. In one embodiment, the thermostat management system 506 includes a registration server 602, an update server 604, a pairing server 606, a thermostat frontend user interface (UI) server 608, a thermostat backend server 610, and a thermostat management account server 612. Interconnect 614 may connect servers using one or more high-speed network connections, a shared back plane, a combination of local and remote high-speed connections as well as one or more virtualized connections. While the configuration of thermostat management servers 520 is exemplary, it is should not be considered limiting in any way and it is contemplated that the distribution of functions may be handled through a different combination of servers and distribution of function over those servers.

In some embodiments, the thermostat management servers 520 making up this thermostat management system 506 may manage thermostats located in multiple enclosures across various geographic locations and time zones. Each enclosure may use one or several thermostats in accordance with embodiments of the present invention to control one or several HVAC systems, such as HVAC system 120 in FIG. 1. In some cases, there may be an increased need from the thermostat management system 506 for certain functions and therefore more servers to deliver these functional capabilities. It may be appreciated that the design of thermostat management system 506 and use of the thermostat management servers 520 may be scaled to meet these demands on the system and efficiently track and organize the data from these multiple enclosures and thermostats for processing, analysis, control and machine-learning purposes.

One embodiment of registration server 602 provides a number of services related to registering a thermostat on the thermostat management system 506 and preparing it for pairing with a thermostat management account. In operation, the registration server 602 may be first accessed by a thermostat when the thermostat is wired to the HVAC of an enclosure and then connected to the Internet through a private network. To make the thermostat known on system 520, the thermostat sends thermostat metadata from the private network to the public network, such as the Internet, and then onto processing by registration server 602. Preferably, the thermostat metadata includes a unique thermostat identifier, such as one that is assigned at the time of manufacturing. As the communication that sends the thermostat metadata passes through the network address translator (NAT) of the router (not shown) that serves private network 502, it is appended with the public network address of that router, which is thus the public address that is "used" by the thermostat to communicate over the public network. The thermostat identifier is used to identify the thermostat from other thermostats being registered by registration server 602 and may be based, in part or in whole, on a media access control (MAC) address assigned to the NIC of the thermostat. As one security measure against registering unauthorized devices, registration server 602 may compare the MAC address in the thermostat metadata against a list of valid MAC addresses provided by the manufacturer of the thermostat or NIC component. In accordance with one embodiment, the thermostat registration is complete when the registration server 602 provisions an entry in a thermostat registration pool and marks the thermostat entry ready to be paired with a thermostat management account. Entries in the thermostat registration pool may be referenced by their unique thermostat identifier, the public network address that they used (or, more particularly, the public address of the private network router through which they connect to the Internet), and optionally other relevant metadata associated with the thermostat.

In some embodiments, update server 604 attempts to update software, firmware and configuration updates to each of the thermostats registered in the thermostat registration pool. If metadata from entries in the registration pool exclude versioning information, update server may need to further query each thermostat for current versions installed. Update server 604 may access entries in the registration pool and then use corresponding network addresses in each entry to connect to the associated thermostat over the public network or private network, or both.

If newer software versions exist than currently used on a thermostat, update server 604 proceeds to send software updates to the thermostat over the public network. For example, update server may use file transfer protocols such as ftp (file transfer protocol), tftp (trivial file transfer protocol) or more secure transfer protocols when uploading the new software. Once uploaded, installation and update of the software on the thermostat may occur immediately through an auto-update option on the thermostat or manually through the interface of the thermostat as requested by a user.

One embodiment of pairing server 606 facilitates the association or "pairing" of a thermostat with a thermostat management account on thermostat management account server 612. The term "thermostat management account" can be used interchangeably with "user account" herein unless specified otherwise. Once the thermostat is paired with a user account, a rich variety of network-enabled capabilities are enabled as described further herein and in one or more of the commonly assigned incorporated applications, supra. For example, once pairing has been achieved, a person with access to the thermostat management account may access the thermostat (through the thermostat management system 506 using the thermostat access client 516) for a variety of purposes such as seeing the current temperature of the home, changing the current setpoint, changing the mode of the thermostat between "home" and "away", and so forth. Moreover, the thermostat management system 506 can then start tracking the various information provided by the thermostat which, in turn, enables a rich variety of cloud-based data aggregation and analysis that can be used to provide relevant reports, summaries, updates, and recommendations to the user either through the thermostat display itself, through the thermostat access client 516, or both. A variety of other capabilities, such as demand-response actions in which the thermostat management server sends an energy alert and/or sends energy-saving setpoint commands to the thermostats of users who have enrolled in such programs, can be carried out.

In view of the importance of establishing a pairing between the thermostat and a thermostat management account, there is provided an ability for a fallback method of pairing, which can be termed a "manually assisted" method of pairing, that can take effect and be carried out in the event that the convenient auto-pairing methods described further hereinbelow cannot be securely and reliably carried out for a particular installation. The manually assisted method may use an alphanumeric "passcode" to pair the thermostat to the thermostat management account. Typically, the passcode is sent to the thermostat over a public network, like the Internet, and displayed on the display area of the thermostat. Authorization to access the thermostat is provided if the user obtaining the passcode from the display on the thermostat then enters it into a pairing dialog presented when the user logs into their thermostat management account. Pairing server 606 pairs the thermostat with the user's thermostat management account if the user enters that same passcode that was displayed on their thermostat display.

According to a preferred "auto-pairing" method, the pairing server 606 may automatically pair or "auto-pair" a thermostat management account to a thermostat if both are located on the same private network. If the thermostat and thermostat management account are associated with the same private network, embodiments of the present invention presume the thermostat is at the user's home, office, or other area where the user should also have control of the device. To make this determination automatically, the pairing server 606 compares the public network address that was used to register the thermostat over the Internet with the public network address used by the computer device that has most recently been used to access the thermostat management account. Since the thermostat and computer device only have private network addresses, the router on the private network they share inserts the same public network address into their packets thus allowing the two devices to access servers, services, and other devices on the Internet. "Auto-pairing" takes advantage of this fact and automatically pairs devices sharing the same public network address. This is particularly advantageous from a user standpoint in that the user is not bothered with the need to enter a passcode or other alphanumerical identifier in order to achieve the pairing process, and avoids the concern that a user may inadvertently enter incorrect codes or identifiers into the system. Details on auto-pairing and manually assisted pairing are described in further detail later herein.

Thermostat front end user-interface (UI) server 608 facilitates the generation and presentation of intuitive, user-friendly graphical user-interfaces that allow users to remotely access, configure, interact with, and control one or more of their network-connected thermostats 110/112 from a computer web browser, smartphone, tablet, or other computing device. The user-friendly graphical user-interfaces can also provide useful tools and interfaces that do not necessarily require real-time connectivity with the thermostats 110/112 with examples including, for some embodiments, providing user interfaces for displaying historical energy usage, historical sensor readings and/or occupancy patterns, allowing the user to learn about and/or enroll in demand-response programs, provide social networking forums that allow users to interact with each other in informative, competitive, fun ways that promote energy savings, provide access to local information including weather, public safety information, neighborhood calendar events, and local blogs, and more generally provide services and information associated with a comprehensive "energy portal" functionality. Examples of intuitive, user-friendly graphical user-interfaces provided by the UI server 608 according to one or more preferred embodiments are described further in co-pending U.S. patent application Ser. No. 13/317,423.

In some embodiments, a thermostat access client user-interface displays an image of a house representing a primary enclosure paired to the thermostat management account in the thermostat management system. Thermostat front end UI server 608 may further instruct the thermostat access client, such as thermostat access client 516 in FIG. 5, to display images visually representative of one or more thermostats 110/112 inside the primary enclosure. By default, each of the one or more thermostat images may also display a current temperature measurement in the enclosure. In some embodiments, the user-interface may also further display an image of an additional house, or houses, representing a secondary enclosure having additional thermostats that are also paired to the thermostat management account. The image of the additional house may appear smaller, out of focus or generally deemphasized visually in relationship to the image of the house representing the primary enclosure. Additional enclosures beyond the secondary enclosure can also be displayed in the user interface and should also appear visually deemphasized compared with the image displayed for the primary enclosure. Further information on the thermostat access client and user-interface are described in more detail in co-pending U.S. patent application Ser. No. 13/317,423.

Thermostat backend server 610 manages the storage of data used by various thermostat management servers in the thermostat management system 506. In some embodiments, thermostat backend server 610 may manage storage of the thermostat registration pool data used by the registration server 602 or may organize and store new software updates and releases for the update server 604. In another embodiment, thermostat backend server 610 may also store heating and cooling related data (i.e., date and time HVAC system was in either heating or cooling mode within the enclosure), sensor information, battery-level data, alarms, etc. associated with an enclosure that was sent to the thermostat management system 506 by thermostats registered therewith, and in some embodiments and provide pre-computed heating and cooling schedules, applications, and other data for download over the public network for use by the thermostats.

In some embodiments, thermostat management account server 612 is used to create new accounts and update existing accounts on thermostat management system 506. To access their thermostat over a thermostat access client 516 and enjoy the benefits of thermostat connectedness, the user is first required to create of a thermostat management account ("user account") on thermostat management account server 612 using their thermostat access client 516. Accordingly, users execute the thermostat access client 516 on a computer or other computer device to access the thermostat management account server 612. The thermostat management account server 612 should receive at least the zip code and/or city and state for the enclosure in which the thermostat is (or will be) installed, such that weather information provided by a weather service can be accessed and downloaded to the thermostat, which can be used as part of its optimal enclosure characterization and HVAC control algorithms. Optionally, a variety of other information including a user's contact information, enclosure street addresses, and so forth can also be received. Primary options associated with the thermostat management account server 612 include pairing one or more thermostats to the correct thermostat management account through pairing operations provided by pairing server 606. However, even if the account is not yet paired with a thermostat, the user may use the thermostat management account to access local information including weather, public safety information, neighborhood calendar events, local blogs and more information based upon the user's contact information, locale and other interests.

Figure 7A:
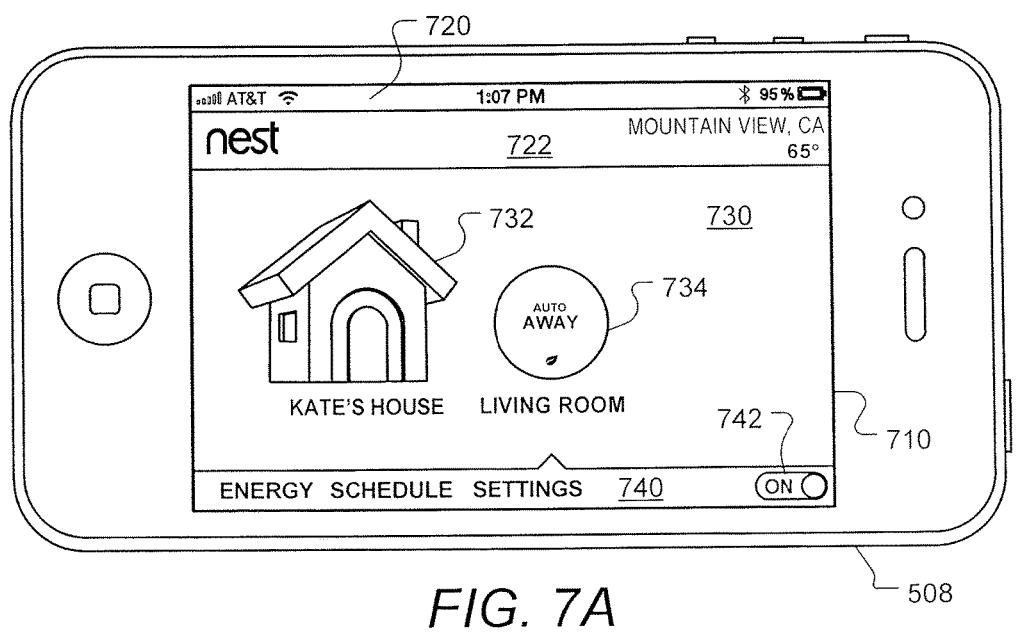
FIGS. 7A-7I illustrate aspects of a graphical user interface on a smart phone for performance and other information for an HVAC system controlled by a self-programming network-connected thermostat, according to some embodiments.
Figure 7B:
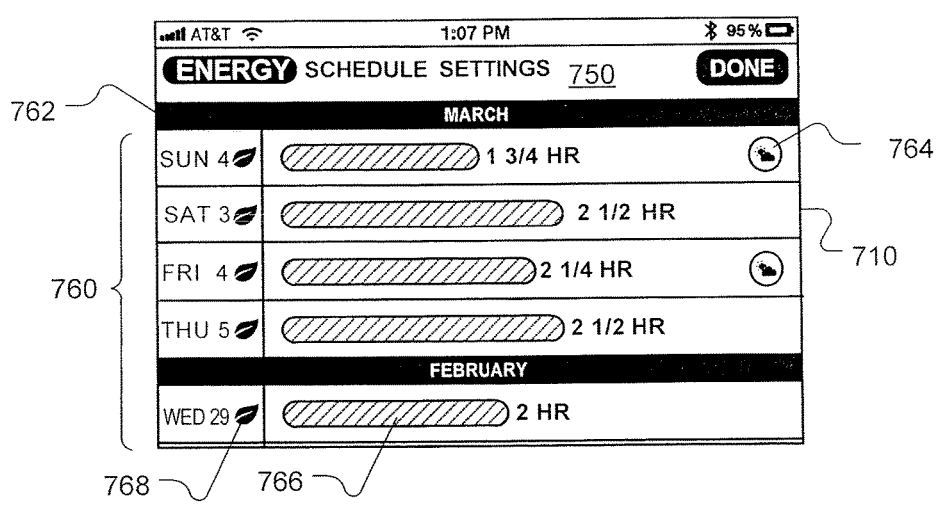

FIGS. 7A-7I illustrate aspects of a graphical user interface on a smart phone for performance and other information for an HVAC system controlled by a self-programming network-connected thermostat, according to some embodiments. In FIG. 7A, smartphone 508 is shown as an iPhone running the Apple iOS operating system, although according to other embodiments the smartphone 508 could be a different device running a different operating system such as Android, Symbian, RIM, or Windows operating systems. Smart phone 508 has a large touch sensitive display 710 on which various types of information can be shown and from which various types of user input can be received. The display area shows a top information bar 720 that is generated by and is standard to the operating system of the phone 508. An upper banner are 722 includes information such as the thermostat manufacture's logo, as well as the city name and current outdoor temperature for the location where the user's thermostat is installed. A main window area 730 shows a house symbol 732 with the name assigned in which thermostat is installed. A thermostat symbol 734 is also displayed along with the name assigned to the thermostat. For further details of user interfaces for remote devices such as smartphone 508, see co-pending U.S. patent application Ser. No. 13/317,423, which is incorporated herein by reference. The lower menu bar 740 has an arrow shape that points to the symbol to which the displayed menu applies. In the example shown in FIG. 7A, the arrow shape of menu 740 is pointed at the thermostat symbol 734, so the menu items, namely: Energy, Schedule, and Settings, pertain to the thermostat named "living room." Menu 740 also includes an on/off toggle button 742 from which the user can turn off or on the thermostat. When the "Energy" menu option of selected from menu 740 in FIG. 7A by the user, the display 710 transitions to that shown in FIG. 7B. An upper menu area 750 mimics the menu 740 in FIG. 7A and provides the user location information within the menu structure as well as provides a convenient means for the user to navigate within the menu structure. The central display area 760 shows energy related information to the user in a calendar format. The individual days of the month are shown below the month banners, such as banner 762, as shown. The user can gesture on the touch screen to scroll up and down through different days. Also shown is a leaf logo, such as logo 768 for Wednesday February 29$^{th}$, in cases where a leaf logo has been awarded for that day. Further details of awarding the leaf logo are provided herein. For each day, a horizontal bar, such as bar 766, is used to graphically indicate to the user the amount of energy used on that day for heating and/or cooling. In the case of FIG. 7B, heating was the only HVAC function used. The bars are colored to match the HVAC function such as orange for heating and blue for cooling. In cases where there is multi-stage heating different shades or hues such as salmon and orange can be used. Also shown next to each bar is the number hours, rounded to nearest quarter of an hour during which the HVAC function, in this case heating, was activated. According to some embodiments, the relative length of each bar represents the number of hours that the HVAC function was active. Since the number of hours of activity for an HVAC function is closely related to the energy usage by that function, the number hours is found to be a useful metric for displaying energy usage information to thermostat users. According to some embodiments, the lengths of the bars are normalized wherein day having the greatest amount of usage in the dataset has a full length bar. Also shown on the far right side of each day is a responsibility symbol 764 which indicates the determined primary cause for either over or under average energy usage for that day. According to some embodiment, a running average is used for the past seven days for purposes of calculating whether the energy usage was above or below average. According to some embodiments, three different responsibility symbols are used: weather (such as shown in symbol 764), users (people manually making changes to thermostat's set point or other settings), and away time (either due to auto-away or manually activated away modes).

Figure 7C:
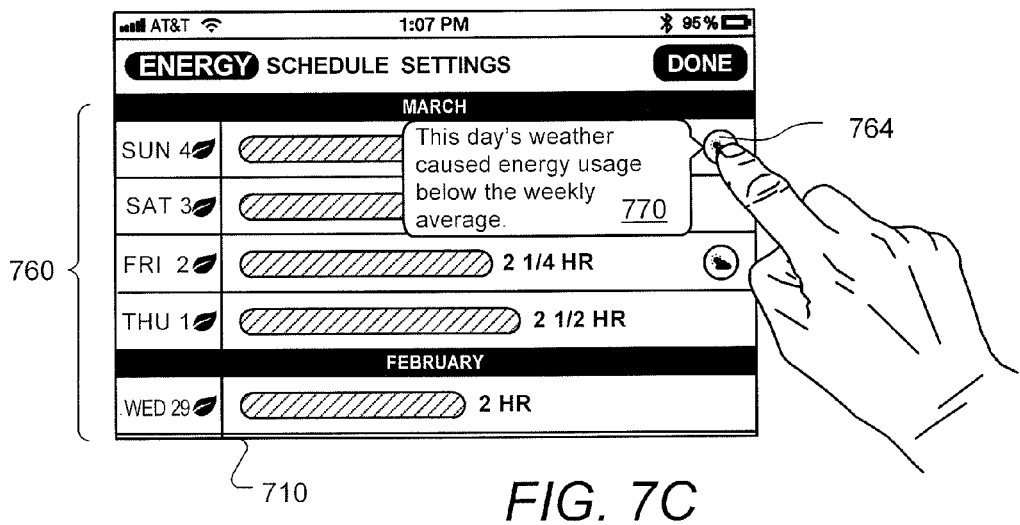

FIG. 7C shows the screen of FIG. 7B where the user is asking for more information regarding the responsibility symbol 762. The user can simply touch the responsibility symbol to get more information. In the case shown in FIG. 7C the pop up message 770 indicates to the user that the weather was believed to be primarily responsible for causing energy usage below the weekly average.

Figure 7D:
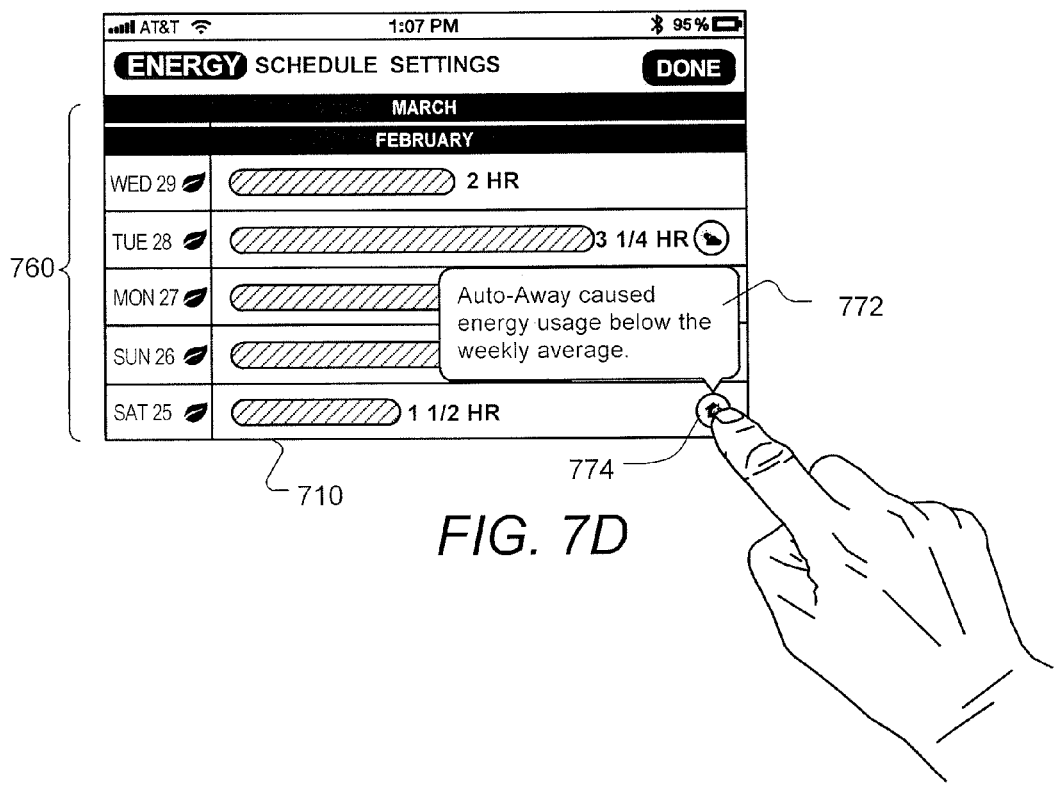

FIG. 7D shows another example of a user inquiring about a responsibility symbol. In this case, the user has selected an "away" symbol 774 which causes the message 772 to display. Message 772 indicates that the auto-away feature is primarily responsible for causing below average energy use for that day.

Figure 7E:
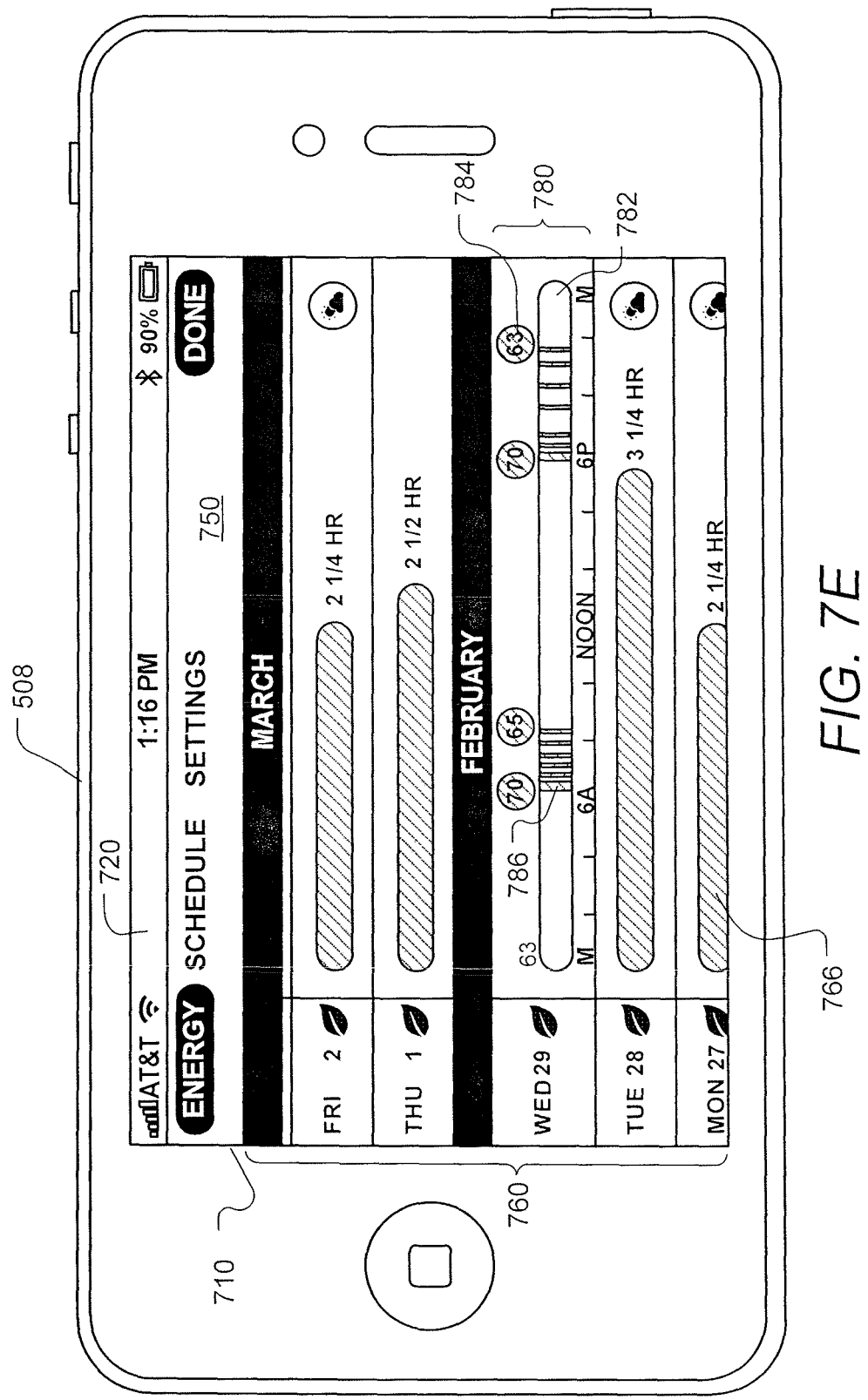

According to some embodiments, further detail for the energy usage throughout any given day is displayed when the user requests it. When the user touches one of the energy bar symbols, or anywhere on the row for that day, a detailed energy usage display for that day is activated. In FIG. 7E the detailed energy information 780 for February 29$^{th}$ is displayed in response to the user tapping on that day's area. If the user taps on the detailed area 780 again the display will toggle back to the simple daily display (such as shown by the other days in FIG. 7E). The detailed display are 780 includes a time line bar 782 for the entire day with hash marks or symbols for each two hours. The main bar 782 is used to indicate the times during the day and duration of each time the HVAC function was active (in this case single stage heating). The color of the horizontal activity bar, such as bar 786 matches the HVAC function being used, and the width of the activity bar corresponds to the time of day during which the function was active. Above the main timeline bar are indicators such as the set temperature and any modes becoming active such as an away mode (e.g. being manually set by a user or automatically set by auto-away). The small number on the far upper left of the timeline indicates the starting set point temperature (i.e. from the previous day). The circle symbols such as symbol 784 indicate the time of day and the temperature of a set point change. The symbols are used to indicate both scheduled setpoints and manually change setpoints.

Figure 7F:
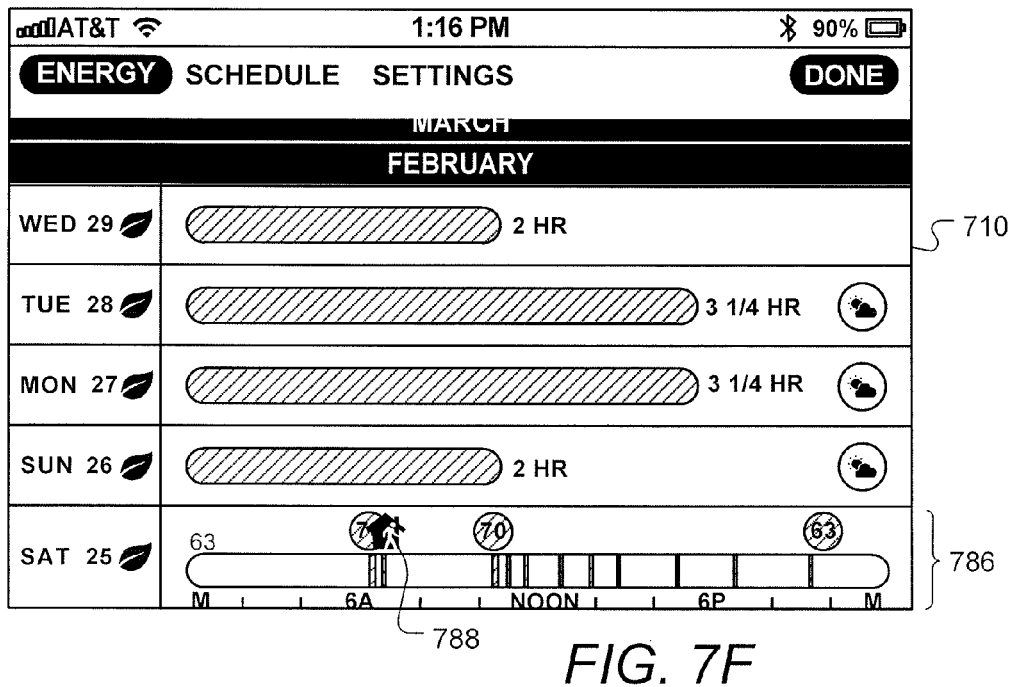

FIG. 7F shows another example of a detailed daily display, according to some embodiments. In this case detailed energy information 786 is shown for Saturday, February 25$^{th}$. As in the case shown in FIG. 7E, the user has selected this day by tapping on the day's area to reveal a detailed timeline bar showing HVAC function activity as well as events such as triggering an away mode and changes in setpoint temperatures. In this case the away symbol 788 is used to indicate that the thermostat went into an away mode (either manually or under auto-away) at about 7 AM.

Figure 7G:
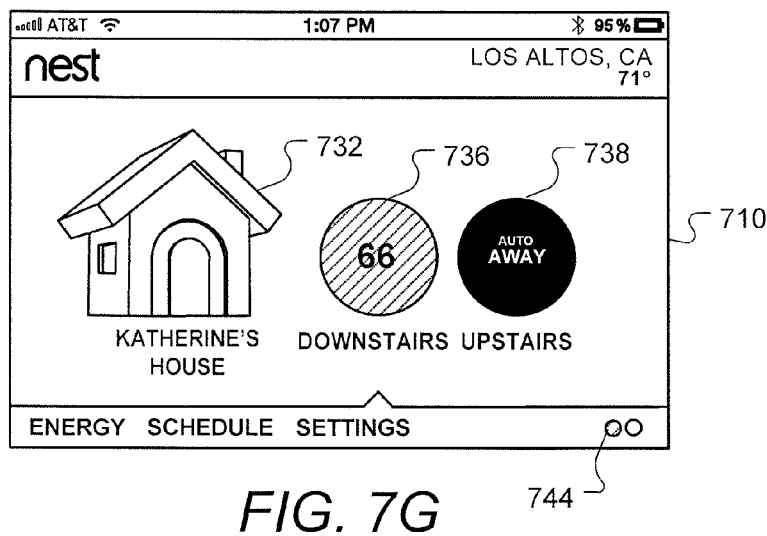

FIG. 7G shows an example of smartphone display area 710 for a different structure, according to some embodiments. In this case the structure is named Katherine's House shown by the house symbol 732 and includes two thermostats named "Downstairs" and "Upstairs" shown by thermostat symbols 736 and 738 respectively. At the time shown in FIG. 7G, the downstairs thermostat is heating to a set point temperature of 66 degrees while the upstairs thermostat is in an auto away mode as shown in the symbols 736 and 738. The arrow on the lower menu bar points to the downstairs thermostat, which controls both heating and cooling as shown by the two small circles on the right side of the lower menu bar. The HVAC function heating is currently active as shown by an orange color fill on the left circle while the right symbol has no colored fill (and so is shown with a white center). If the user selects the "energy" selection on the lower menu then detailed energy information for the downstairs thermostat is shown such as shown in FIG. 7H.

Figure 7H:
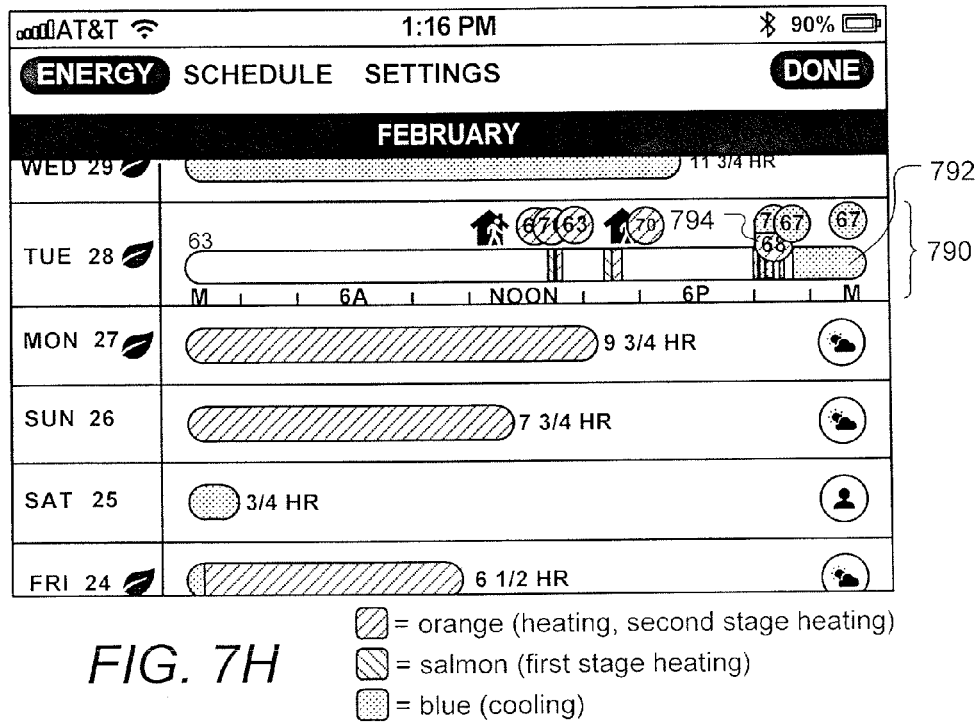
Figure 7I:
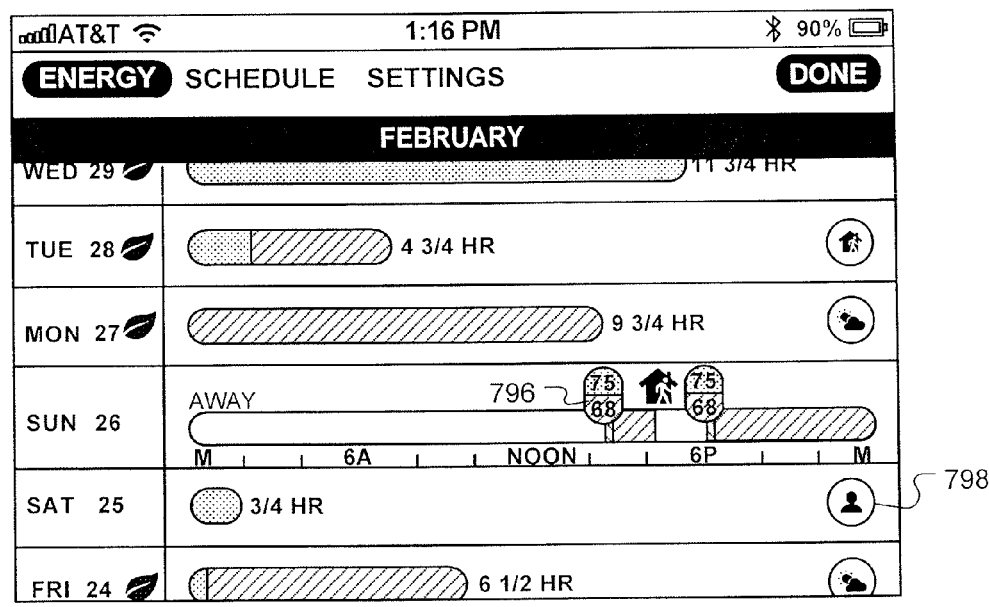

In FIG. 7H, the colors of the horizontal energy use bars for each day are shaded in different colors to indicate the HVAC function or functions that were active for that day. For example, for Sunday, February 26$^{th}$ only heating was used as indicated by the color of the bar which is shaded orange. On Saturday, February 25$^{th}$, only cooling was used as indicated by the color of the bar which is shaded blue. On Friday, February 24$^{th}$, both heating and cooling where used and their relative amounts are shown by the colored shading, in this case a small amount of cooling and larger amount of heating. The user has toggled a detailed energy view for Tuesday, February 28$^{th}$ as shown by detailed information 790. In this particular HVAC system, the heating system includes two stages of heating, which is indicated by two different shades of orange shading in the small energy usage bars. For example, close to about 1 PM the first stage heating was used, indicated by a salmon colored shading, followed by the second stage of heating, indicated by a more saturated orange colored shading. In this example cooling was used after about 9:30 PM as indicated by a blue colored shading. On this day setpoint range was used as indicated by the oval symbol 794. The range setpoint is used to maintain the temperature within a range by using both heating and cooling. According to some embodiments, other colors and/or patterns can be used. For example for relatively expensive and/or energy consuming heating cycles such as heat-pump secondary heat strips a bright red or bright red and black striped fill can be used. Also in cases of two-stage cooling, darker and lighter colors of blue can be used. Details of the range setpoint symbols are also shown in FIG. 7I. The range setpoint symbol 796 indicates that range setpoint of 75 degrees for cooling and 68 degrees for heating. FIG. 7I also shows an example of an user responsibility symbol 798 indicating that lower than average energy usage for that day was due to user settings (e.g. the user setting a lower than average setpoint).

Figure 8A:
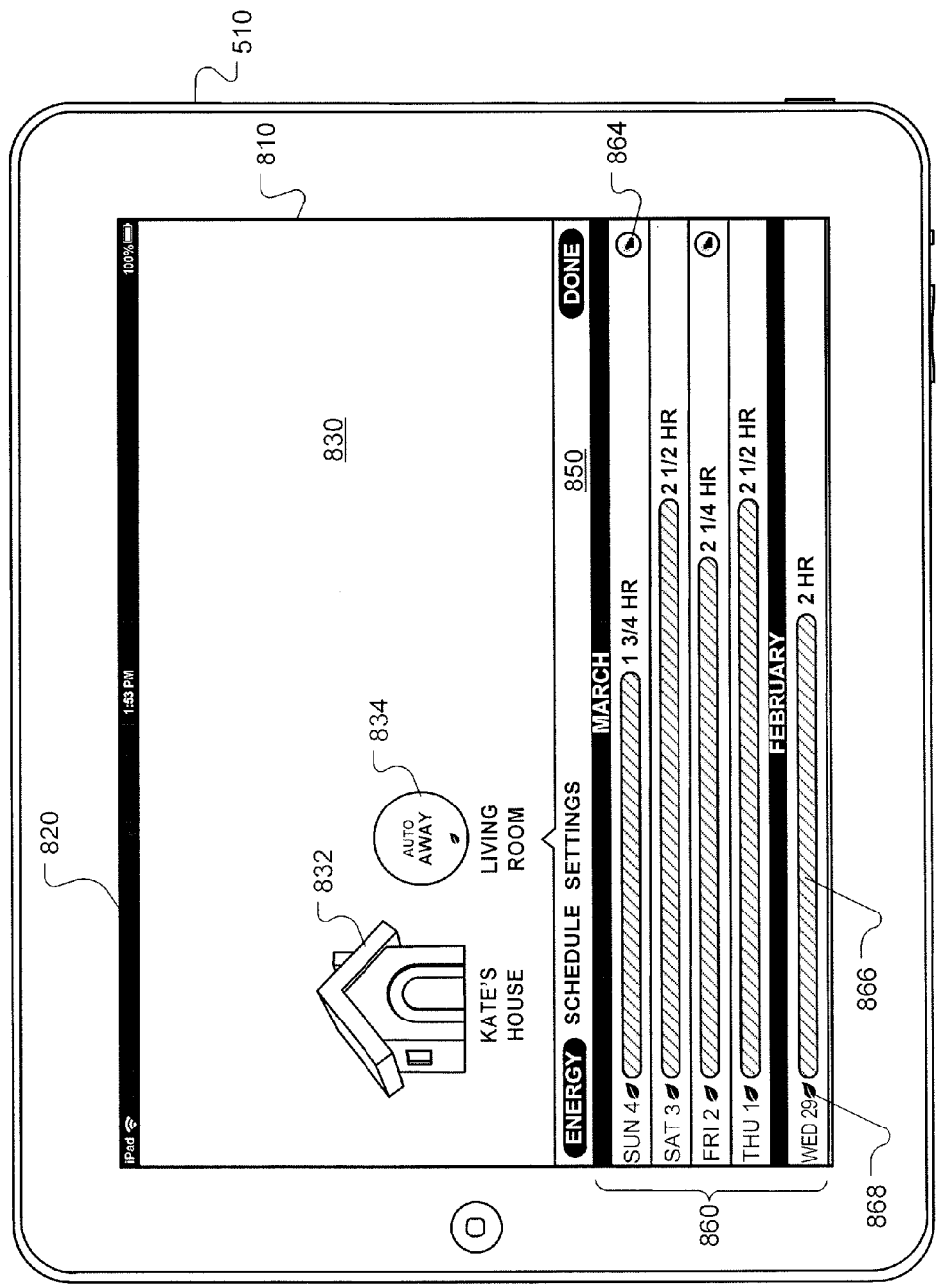
FIGS. 8A-8K illustrate aspects of a graphical user interface on a tablet computer for performance and other information for an HVAC system controlled by a self-programming network-connected thermostat, according to some embodiments.

FIGS. 8A-8K illustrate aspects of a graphical user interface on a tablet computer for performance and other information for an HVAC system controlled by a self-programming network-connected thermostat, according to some embodiments. In FIG. 8A, tablet computer 510 is shown as an iPad running the Apple iOS operating system, although according to other embodiments the tablet 510 could be a different device running a different operating system such as the Android, Blackberry or Windows operating systems. Tablet 510 has a large touch sensitive display 810 on which various types of information can be shown and from which various types of user input can be received. The display area shows a top information bar 820 that is generated by and is standard to the operating system of the tablet 510. A main window area 830 shows a house symbol 832 with the name assigned in which thermostat is installed. A thermostat symbol 834 is also displayed along with the name assigned to the thermostat. For further details of user interfaces for remote devices such as tablet 510, see co-pending U.S. patent application Ser. No. 13/317,423, which is incorporated herein by reference. The lower menu bar 850 has an arrow shape that points to the symbol to which the displayed menu applies. In the example shown in FIG. 8A, the arrow shape of menu 850 is pointed at the thermostat logo 834, so the menu items, namely: Energy, Schedule, and Settings, pertain to the thermostat named "living room." IN the example shown in FIG. 8A, the "Energy" menu option of selected from menu 850 and so there is a lower display area 860 that provides the user with energy related information in a calendar format. The individual days of the month are shown below the month banners as shown. The user can gesture on the touch screen to scroll up and down through different days. Also shown is a leaf logo, such as logo 868 for Wednesday February 29$^{th}$, in cases where a leaf logo has been awarded for that day. Further details of awarding the leaf logo are provided herein. For each day, a horizontal bar, such as bar 866, is used to graphically indicate to the user the amount of energy used on that day for heating and/or cooling. In the case of FIG. 8A, heating was the only HVAC function used. The bars are colored to match the HVAC function such as orange for heating and blue for cooling. In cases where there is multi-stage heating different shades or hues such as salmon and orange can be used. The shading indications follow those such as shown in FIG. 7H. Also shown next to each bar is the number hours, rounded to nearest quarter of an hour during which the HVAC function, in this case heating, was activated. Also shown on the far right side of each day is a responsibility symbol 864 which indicates the determined primary cause for either over or under average energy usage for that day. According to some embodiment, a running average is used for the past seven days for purposes of calculating whether the energy usage was above or below average. According to some embodiments, three different responsibility symbols are used: weather (such as shown in symbol 864), users (people manually making changes to thermostat's set point or other settings), and away time (either due to auto-away or manually activated away modes).

Figure 8B:
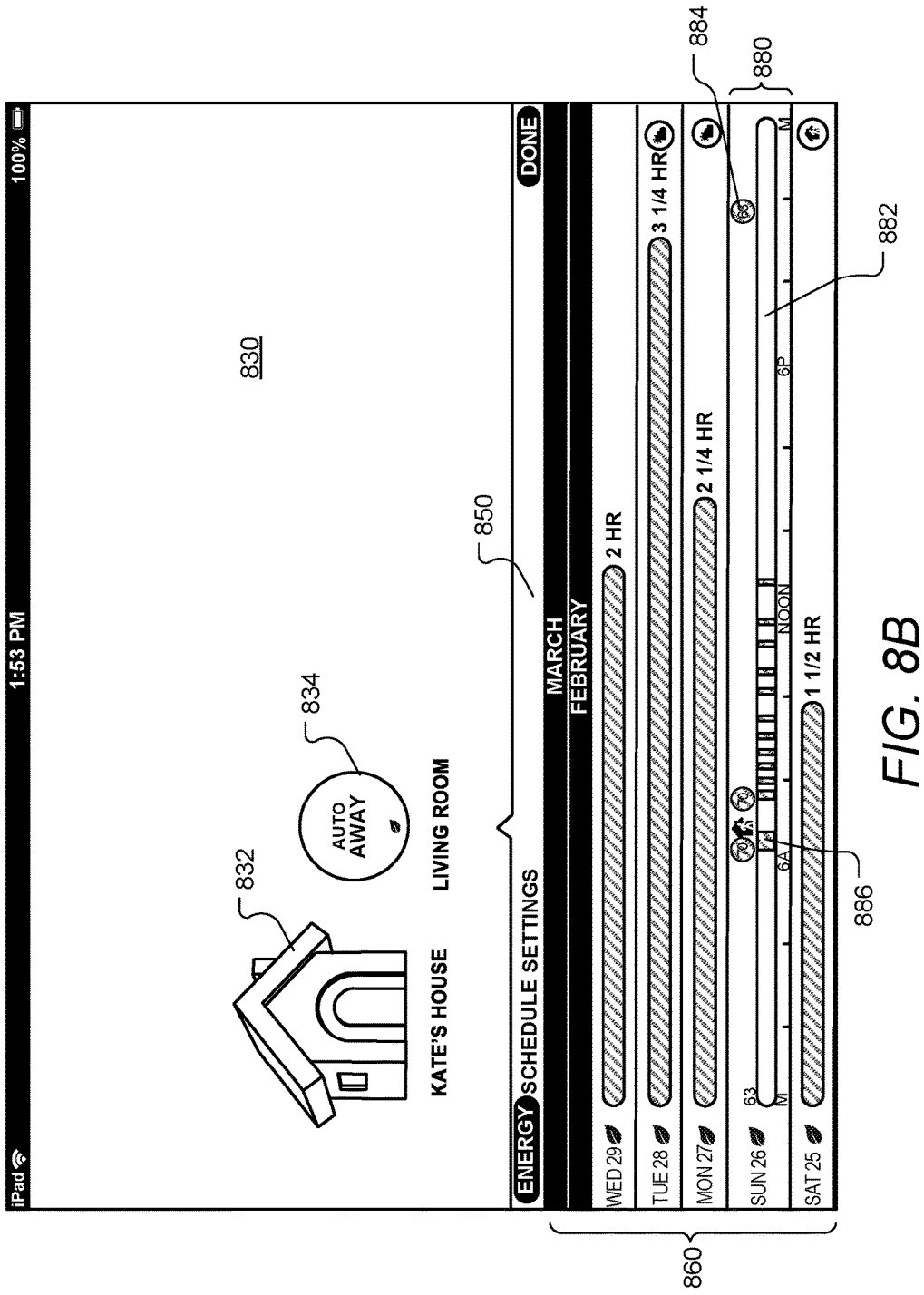

Further detail for the energy usage throughout any given day is displayed when the user requests it. When the user touches on the row for a day, a detailed energy usage display for that day is activated. In FIG. 8B the detailed energy information 880 for February 26$^{th}$ is displayed in response to the user tapping on that day's area. If the user taps on the detailed information 880 again the display will toggle back to the simple daily display. The detailed display information 880 includes a main time line bar 882 for the entire day with hash marks or symbols for each two hours. The main bar 882 is used to indicate the times during the day and duration of each time the HVAC function was active (in this case single stage heating). The color of the horizontal activity bar, such as bar 886 matches the HVAC function being used, and the width of the activity bar corresponds to the time of day during which the function was active. Above the main timeline bar are indicators such as the set temperature and any modes becoming active such as an away mode (e.g. being manually set by a user or automatically set by auto-away). The small number on the far upper left of the timeline indicates the starting set point temperature (i.e. from the previous day). The circle symbols such as symbol 884 indicate the time of day and the temperature of a set point change. The symbols are used to indicate both scheduled setpoints and manually change setpoints.

Figure 8C:
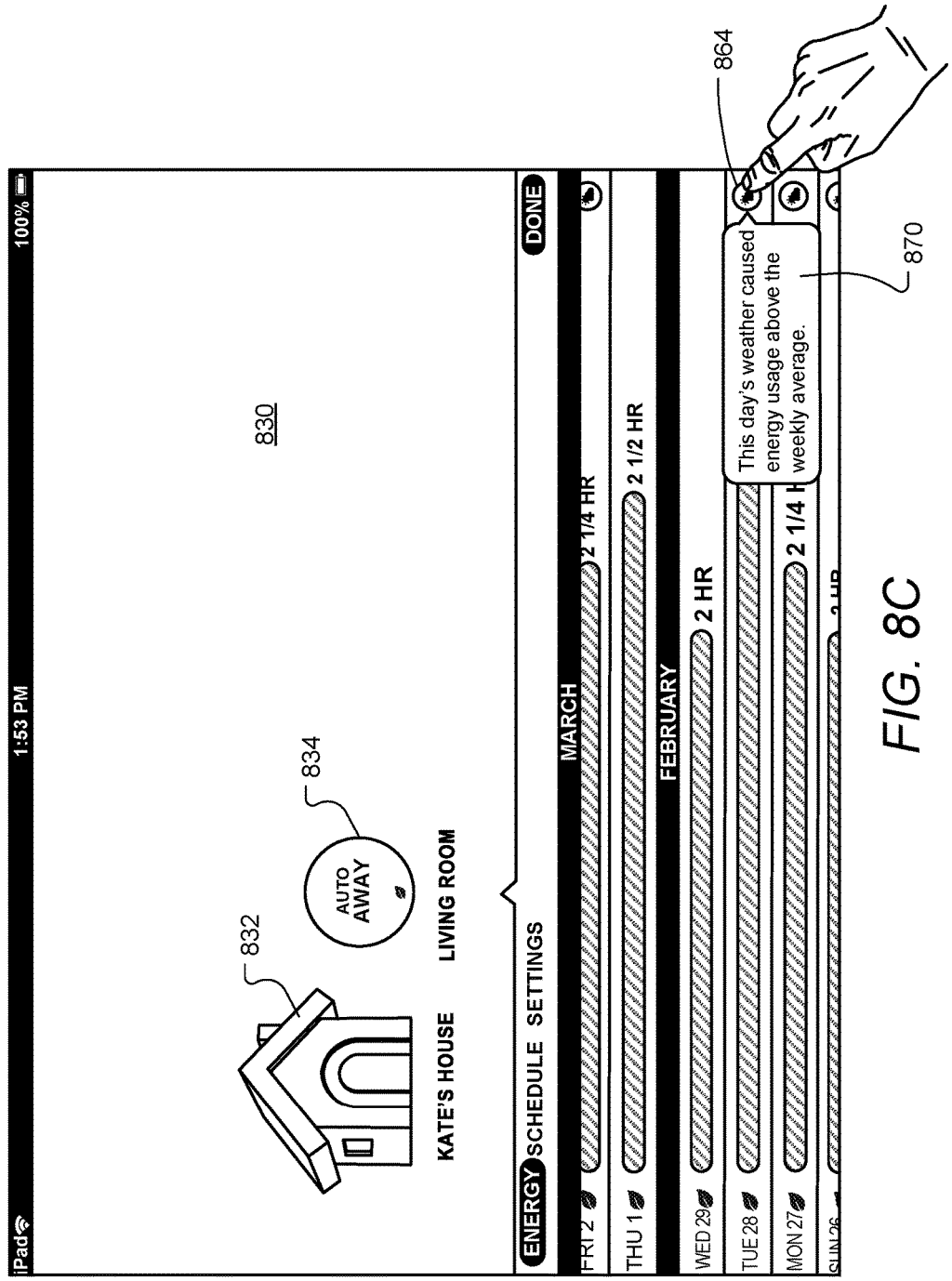

FIG. 8C shows a screen where the user is asking for more information regarding the responsibility symbol 864. The user can simply touch the responsibility symbol to get more information. In the case shown in FIG. 8C the pop up message 870 indicates to the user that the weather was believed to be primarily responsible for causing energy usage below the weekly average.

Figure 8D:
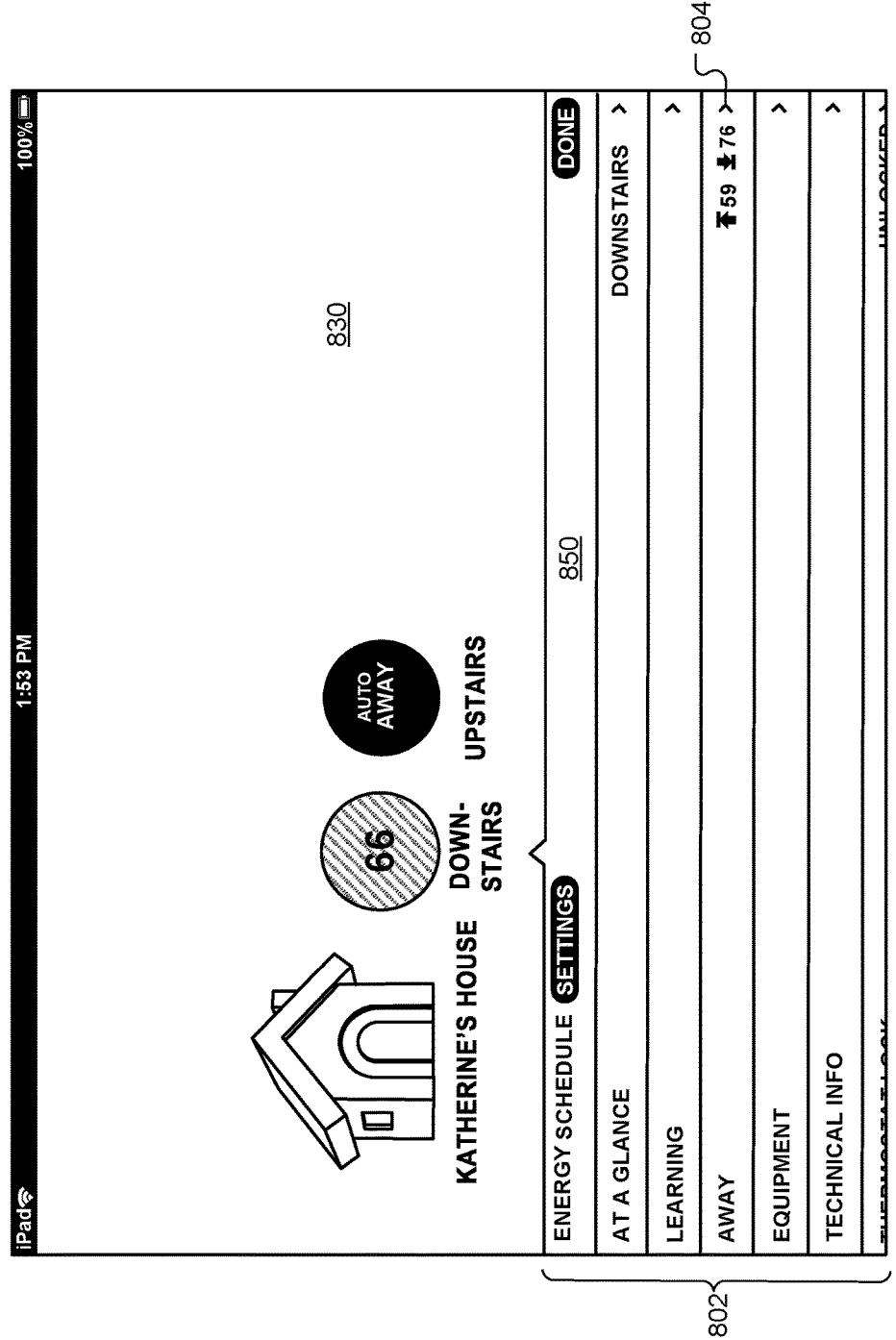
Figure 8E:
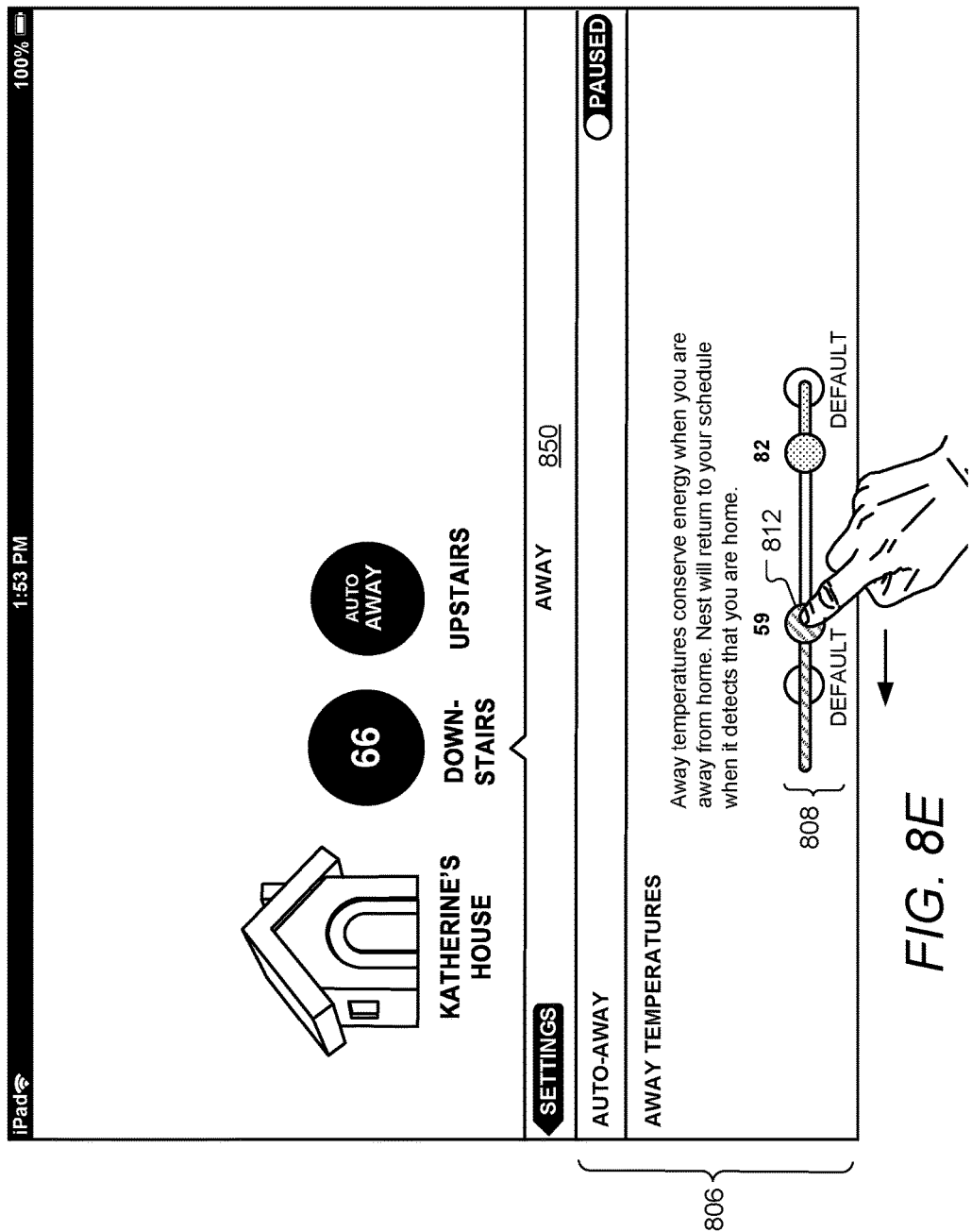

FIGS. 8D-8J show various settings screens on the tablet 510, according to some embodiments. The setting menu for a thermostat is accessed by selecting the option "Settings" from menu 850 such as shown in FIG. 8A. FIG. 8D shows the settings main menu for the downstairs thermostat. Various settings categories are shown in area 802 and the user can scroll up and down through the list using a touch screen gesture according to the particular operating system of the tablet 510. Each of the settings options shown in the rows in area 802 have a right arrow marker such as marker 804. If the marker is selected by the user one or more detailed screens are displayed for that option. If marker 804 is selected, for example, more detailed information for the away settings are displayed, which is shown in FIG. 8E. In FIG. 8E the menu area 850 indicates to the user that a detailed view of the "away" settings are being shown. Also, the user can easily navigate back to the main settings menu by selecting the "Settings" option in menu area 850. The detailed away settings information area 806 includes an auto-away feature toggle (currently the feature is paused, as indicated), and a lower area for showing and setting the away temperatures. A message explains information regarding the away temperature settings to the user. In settings slider 808 the user can view the current away temperature settings, as well as the default. Also, the user can easily set the away temperature by touching and dragging the circular symbol as shown in the case of away heating temperature symbol 812.

Figure 8F:
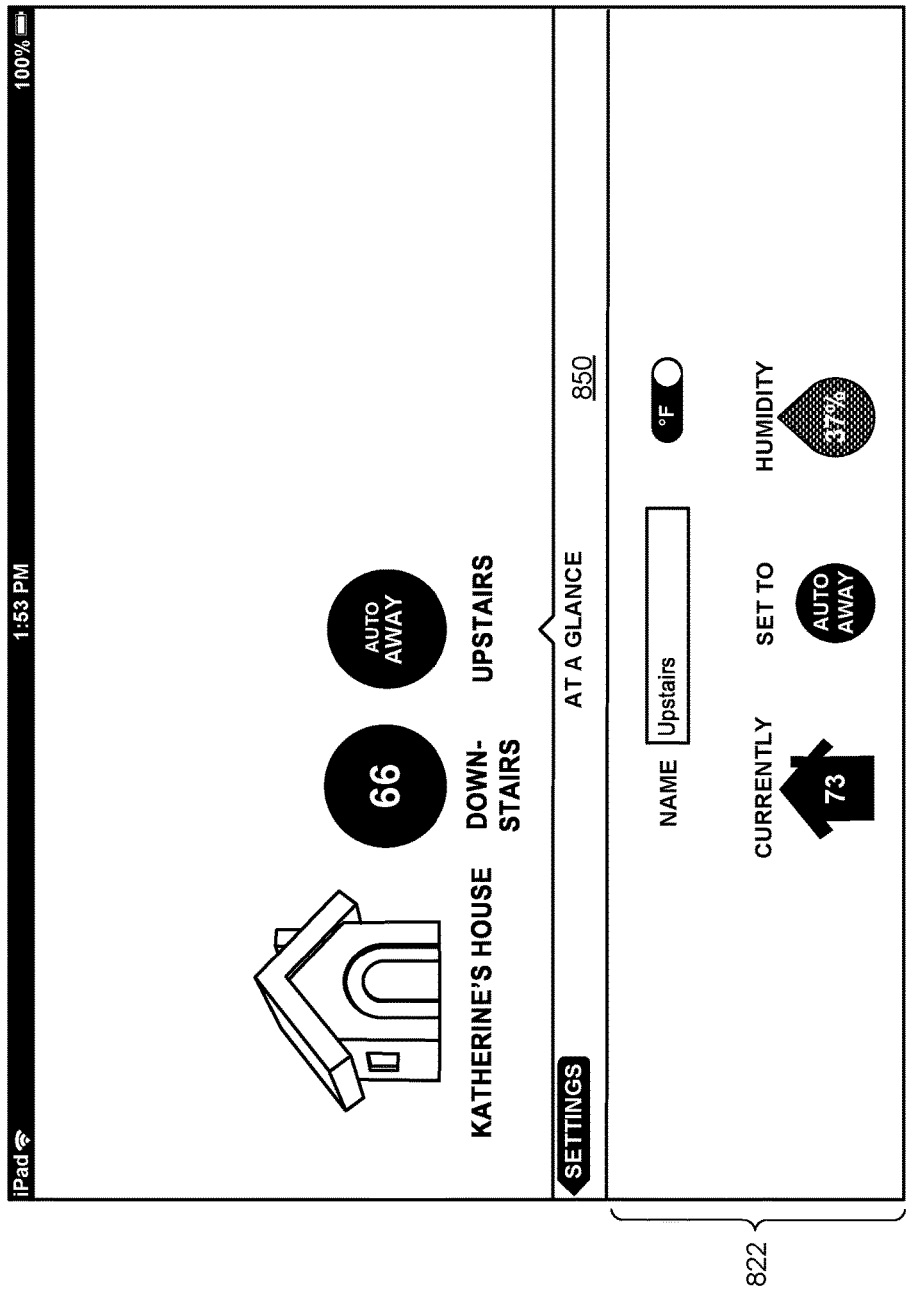

FIG. 8F shows further detail of the "at a glance" information in the settings menu. The area 822 shows the current name of the thermostat which can be changed by the user in the box shown. The current setting for Fahrenheit or Celsius is shown which the user can also change. Also displayed is the current temperature. The current setpoint (in this case the thermostat "upstairs" is set to auto-away, so the auto away temperature will be used as the set point), and the relative humidity.

Figure 8G:
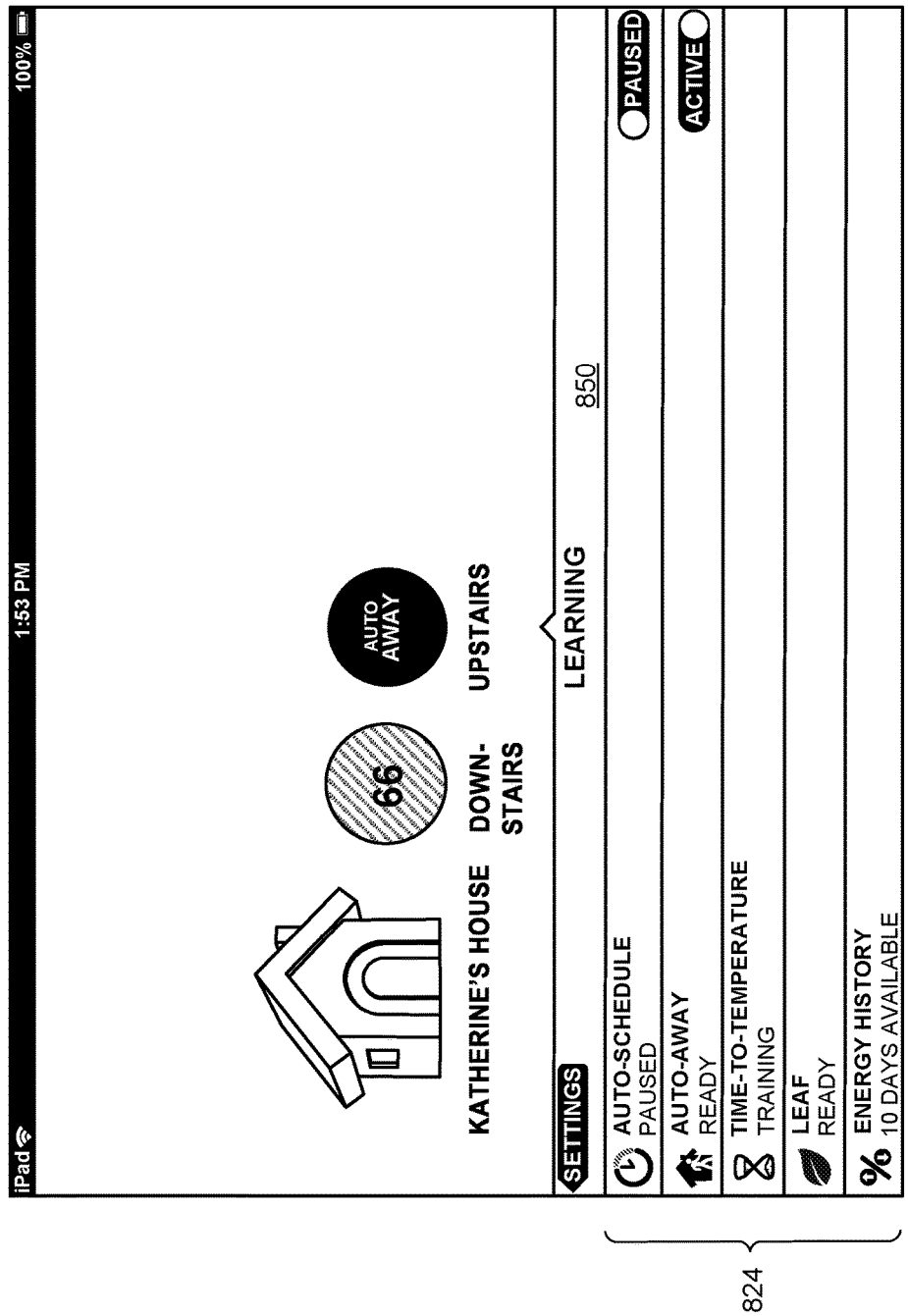

FIG. 8G. shows further detail of the "learning" information are 824 which is accessed from the settings menu shown in FIG. 8D. The learning information area 824 shows the status of various learning algorithms and features such as Auto-schedule (which can be paused or activated); Auto-away (which can also be paused or activated); Time-to-temperature; Leaf and Energy history available.

Figure 8H:
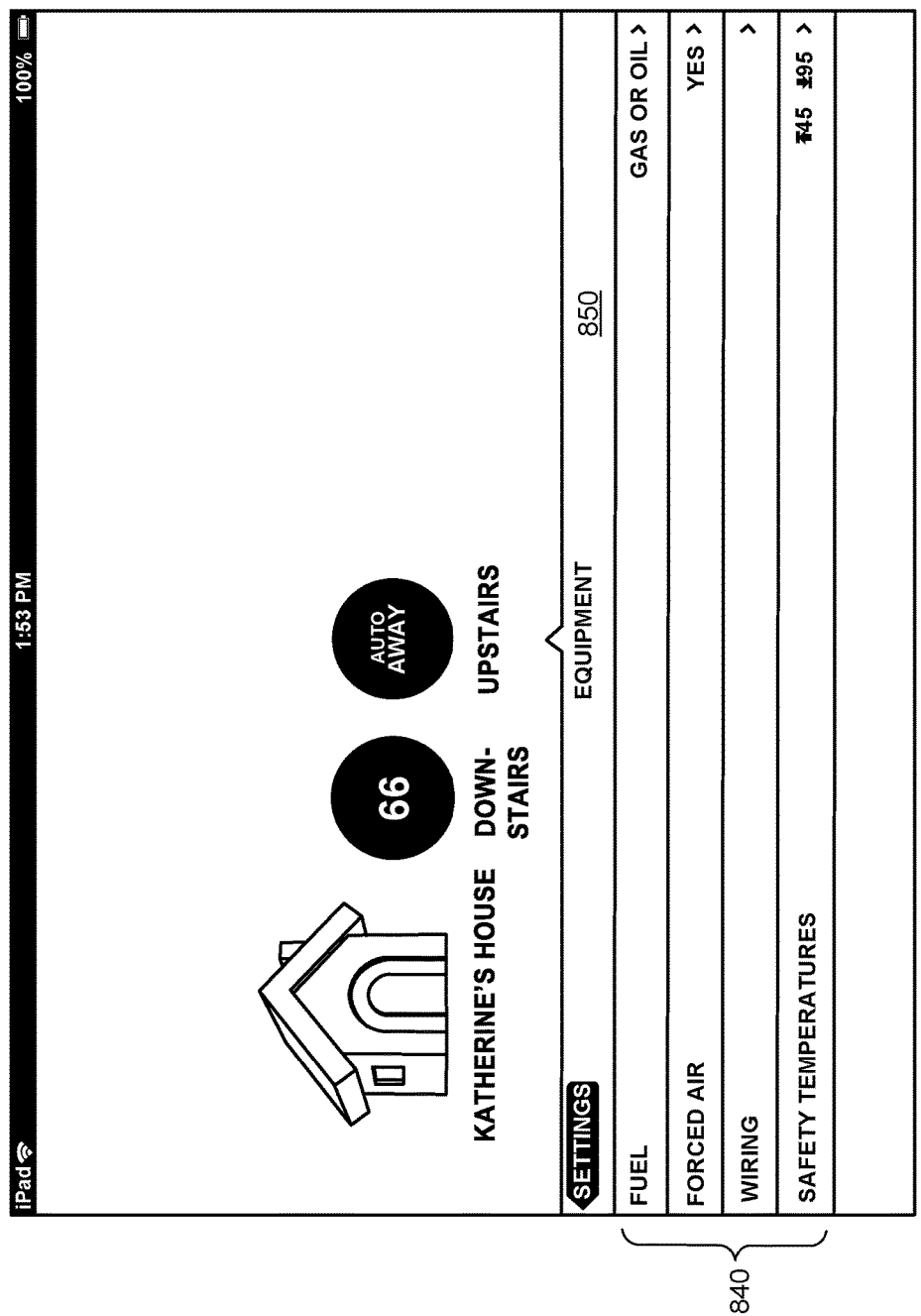

FIG. 8H shows further detail of the "equipment" sub menu which is accessed from the settings menu shown in FIG. 8D. The equipment submenu 840 includes selections for Fuel type, Forced Air, Wiring and Safety Temperatures.

Figure 8I:
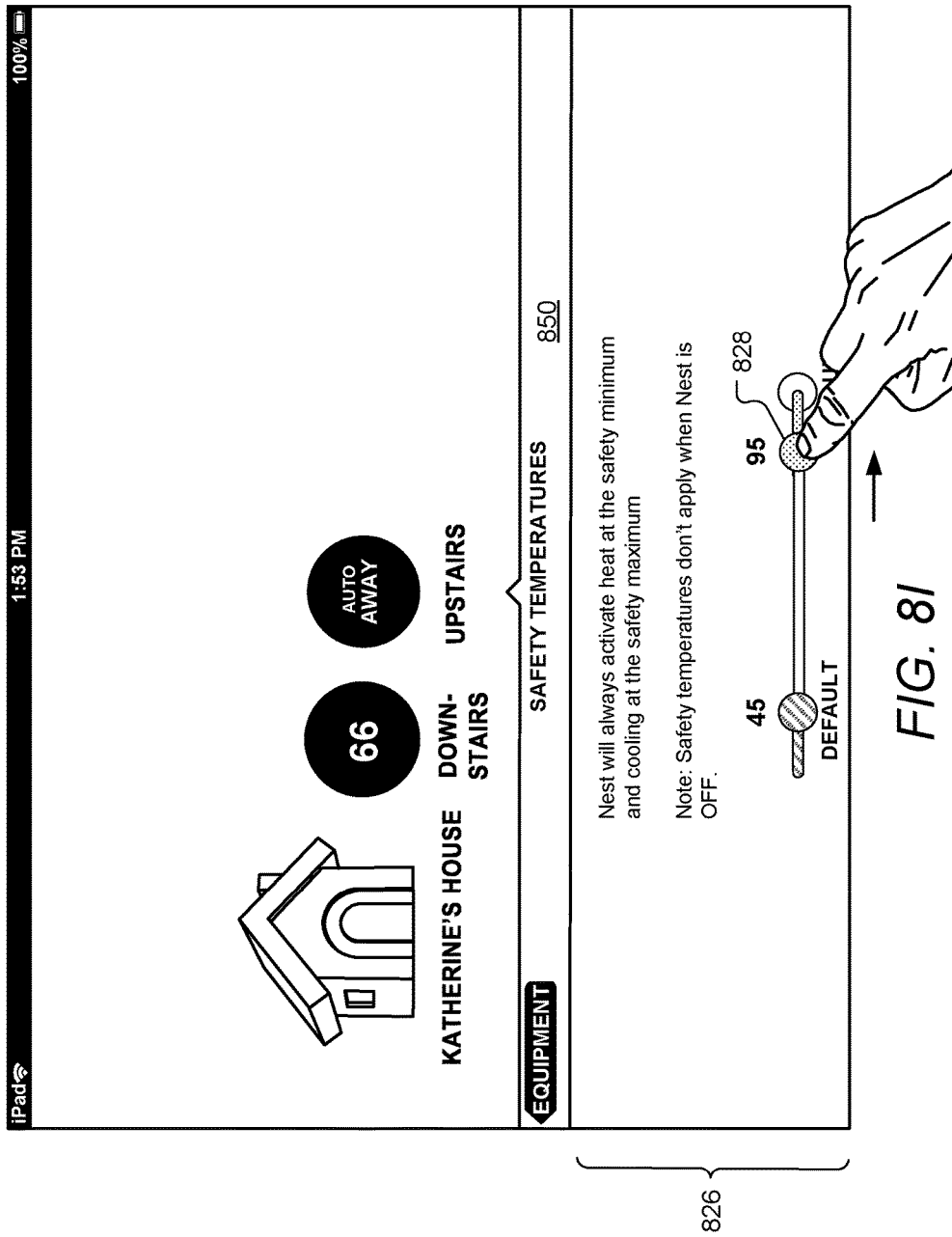

FIG. 8I shows further detail of the safety temperatures, which accessed from the equipment submenu shown in FIG. 8H. The safety temperatures are the minimum (or heating) and maximum (for cooling) temperatures that the thermostat will always attempt to maintain so long as it is switched on. The safety temperature information area 826 includes a message explaining the safety temperature settings. In settings slider the user can view the current safety temperature settings, as well as the default. Also, the user can easily set the safety temperatures by touching and dragging the circular symbol as shown in the case of cooling safety temperature symbol 828. The user is also reminded of the default safety temperature settings as shown.

Figure 8J:
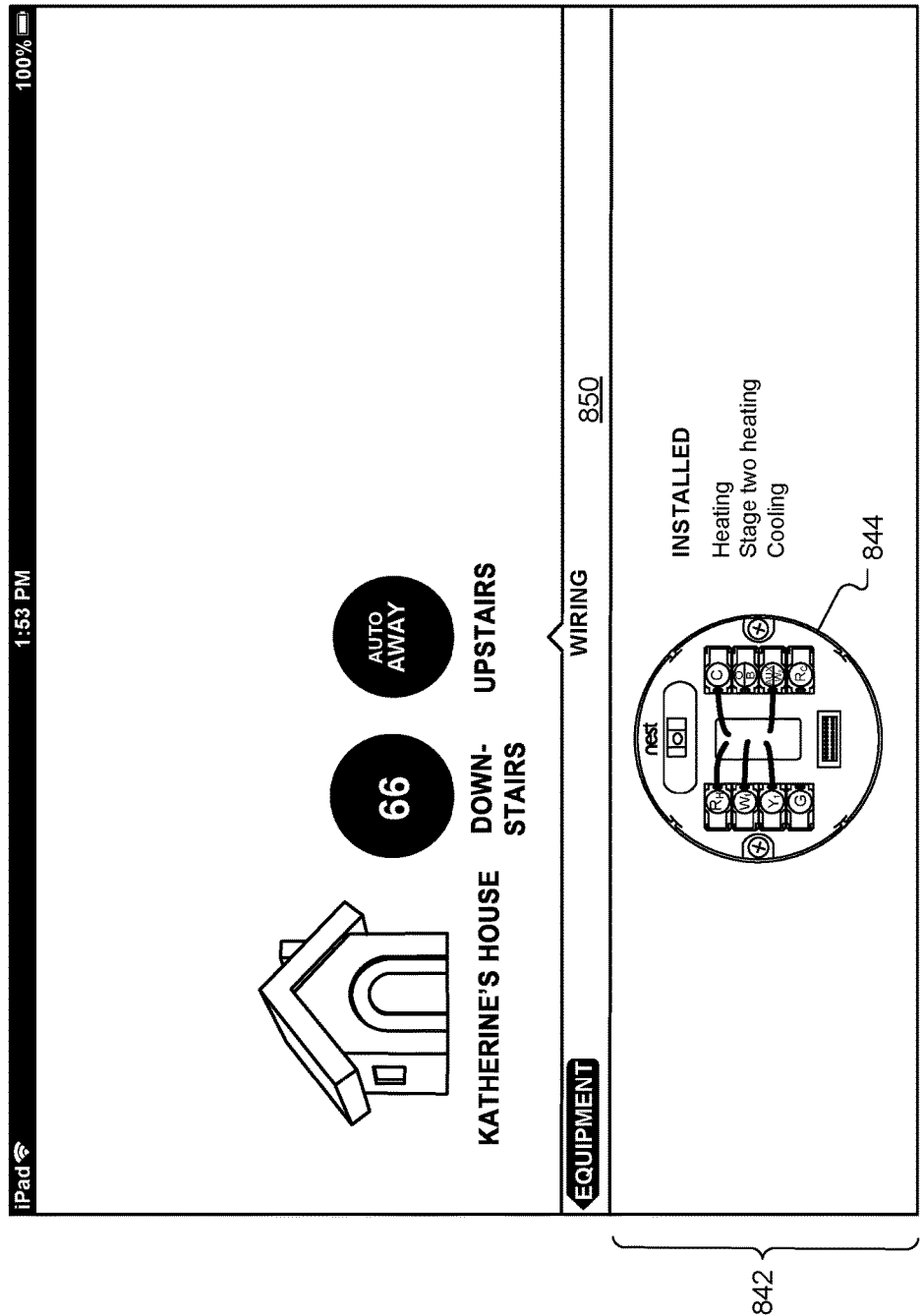
Figure 8K:
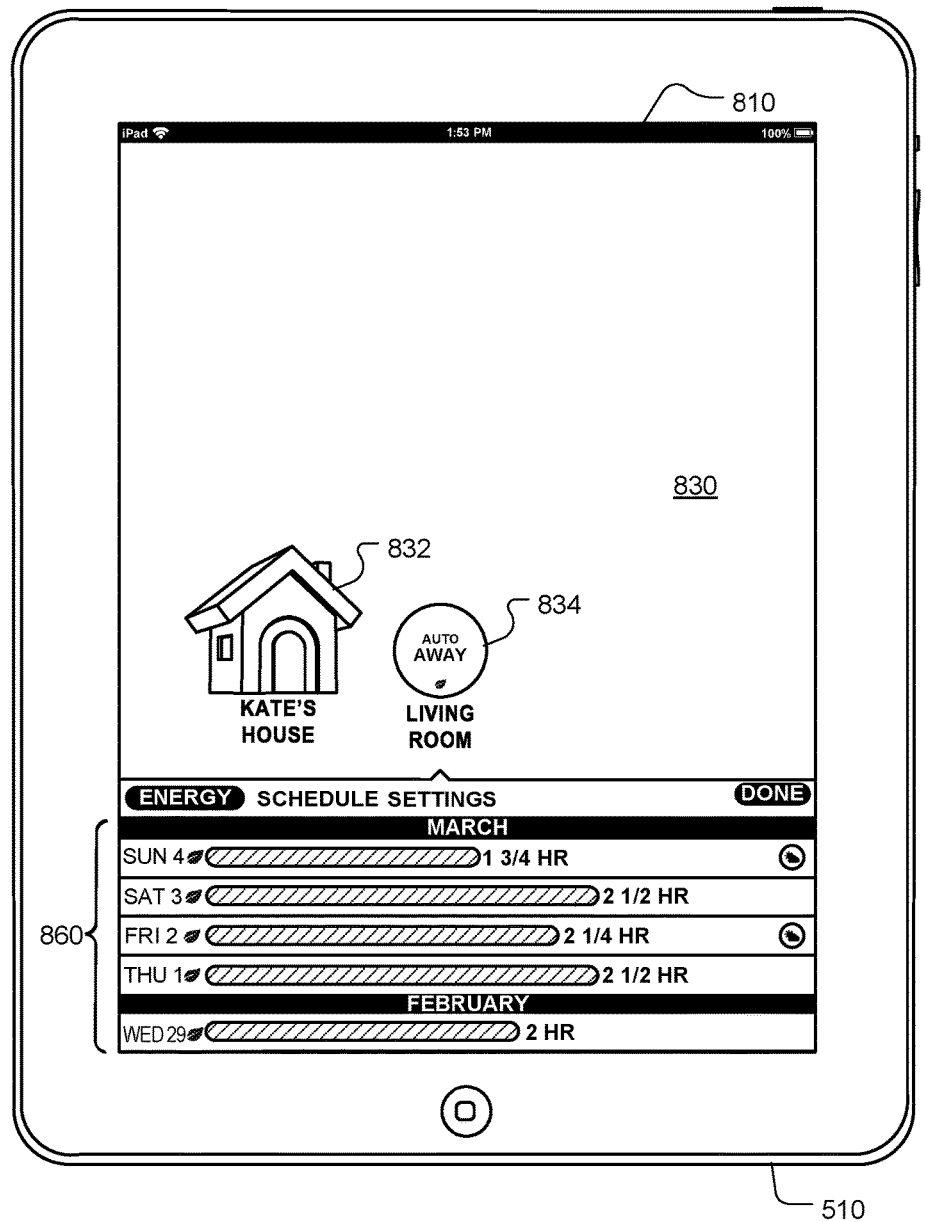

FIG. 8J shows further detail of the wiring information which accessed from the equipment submenu shown in FIG. 8H. The wiring information area 824 shows an image 844 of the thermostat backplate, which indicates which wires are connected to the various wiring connector terminals. According to some embodiments, the wires are shown in colors that match the conventional standard colors used for thermostat wiring. Also shown in area 824 are the HVAC functions that are installed. In the case shown in FIG. 8J, the HVAC installed functions are: Heating, Stage two heating, and Cooling.

FIG. 8J an example of the tablet 510 in a portrait orientation. The information displayed is similar to the information displayed in FIG. 8A.

Figure 9A:
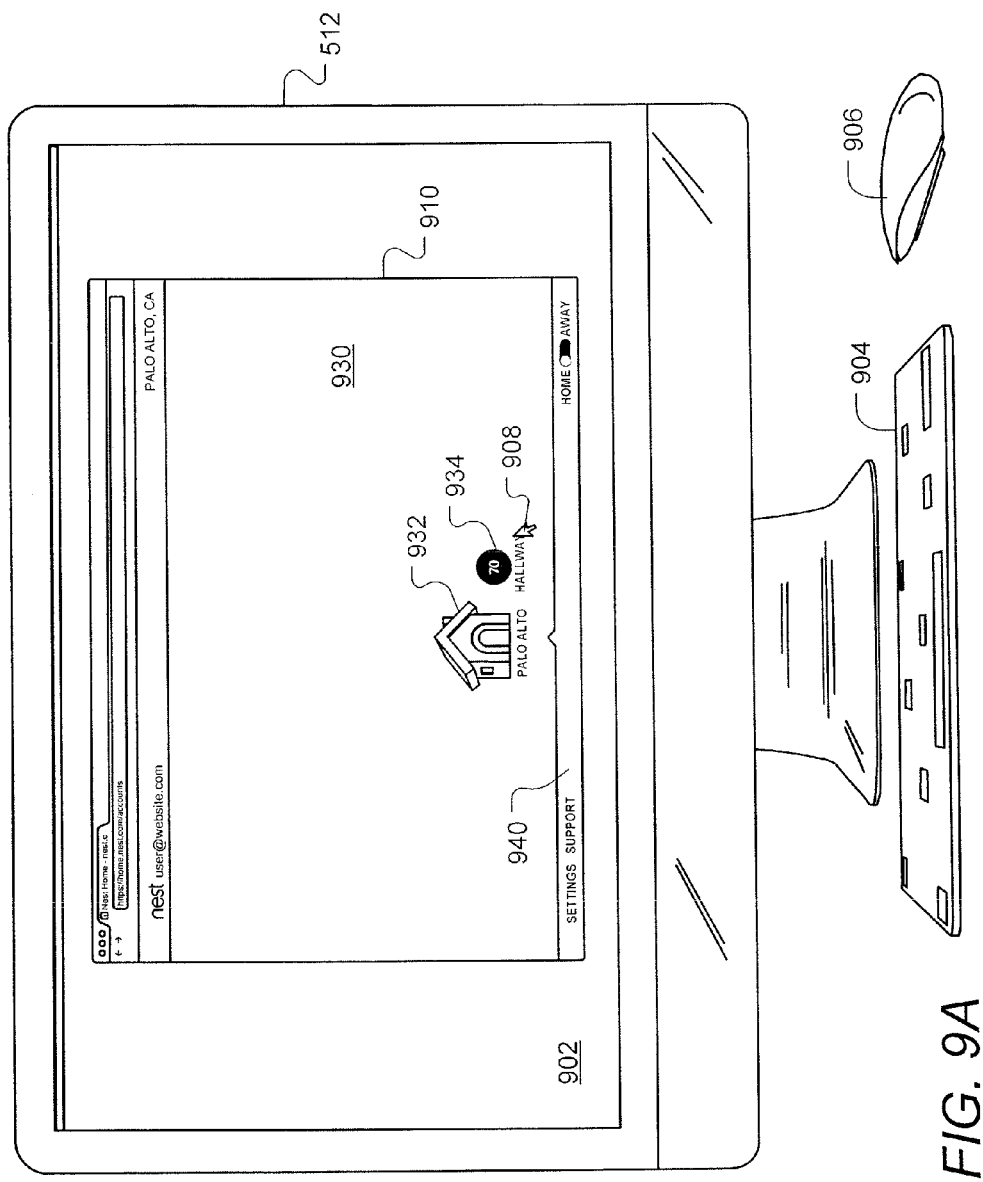
FIGS. 9A-G illustrate aspects of a graphical user interface on a personal computer for performance and other information for an HVAC system controlled by a self-programming network-connected thermostat, according to some embodiments.

FIGS. 9A-G illustrate aspects of a graphical user interface on a personal computer for performance and other information for an HVAC system controlled by a self-programming network-connected thermostat, according to some embodiments. In FIG. 9A, computer 512 is shown as an iMac desktop computer running an Apple OS operating system, although according to other embodiments the computer 512 could be a different type of computer (such as laptop) and/or running a different operating system such as a Windows operating system. Computer 512 has a display 902 on which various types of information can be shown, including window 910. The computer 512 includes a keyboard 904 and pointing device, such as mouse 906 that is used to direct the on-screen pointer 908. The window 910 includes shows an url address area near the top of the window 910 as well as an upper banner area includes information such as the thermostat manufacture's logo, the user's on-line account name, as well as the city name and current outdoor temperature for the location where the user's thermostat is installed. A main window area 930 shows a house symbol 932 with the name assigned in which thermostat is installed. A thermostat symbol 934 is also displayed along with the name assigned to the thermostat. For further details of user interfaces for computing devices relating to thermostats, see co-pending U.S. patent application Ser. No. 13/317,423, which is incorporated herein by reference. The lower menu bar 740 has an arrow shape that points to the symbol to which the displayed menu applies. In the example shown in FIG. 9A, the arrow shape of menu 740 is pointed at the house symbol 932, so the menu items, namely: Settings and Support, pertain to the structure named "Palo Alto." Menu 740 also includes an on/off toggle button on the far right side from which the user can change the status of the structure between "home" and "away."

Figure 9B:
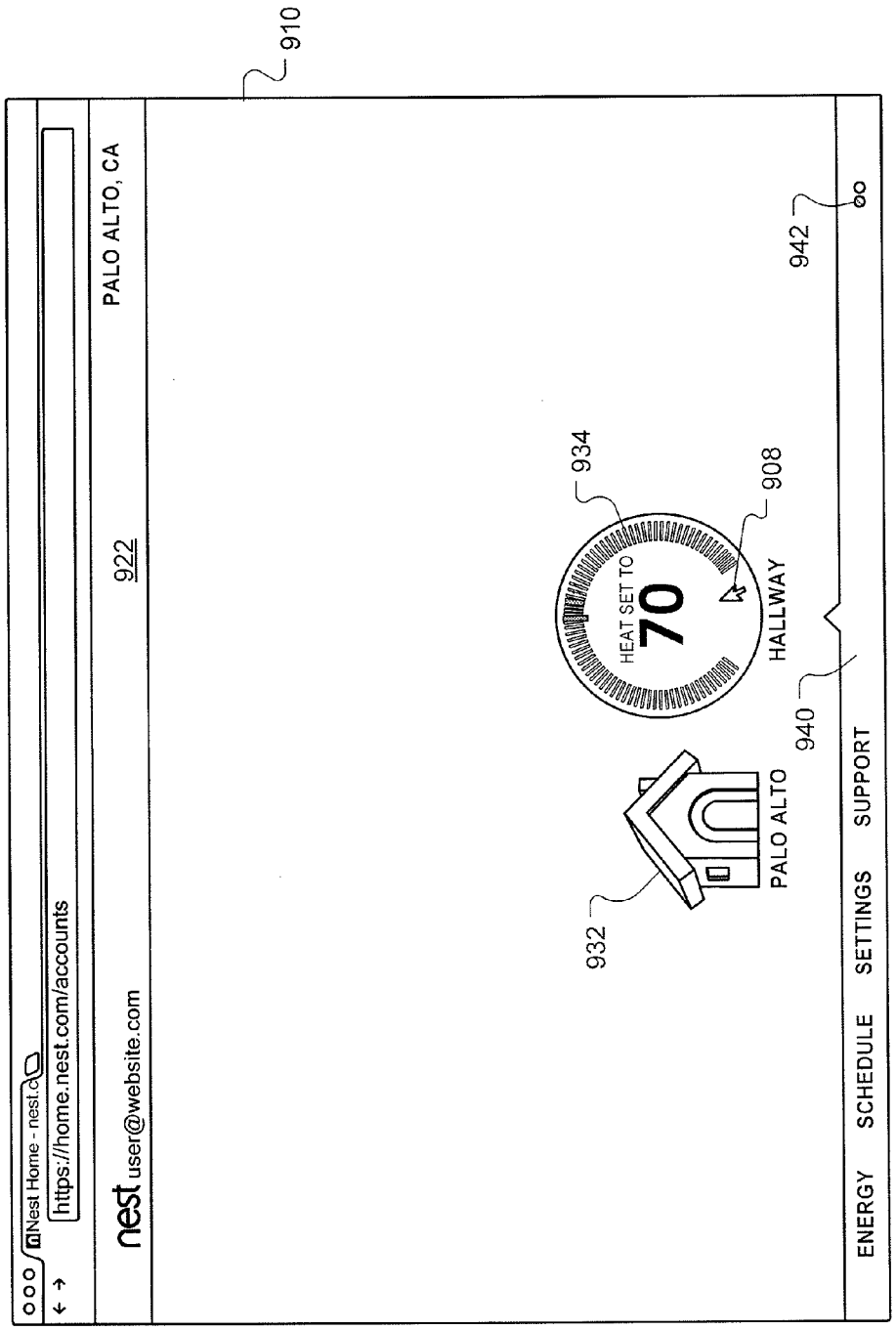

FIG. 9B shows an example of window 910 when the user has selected the thermostat symbol 934 using the pointing device 908. Thermostat symbol 934 enlarges so as to be similar or identical to the thermostat's own display, such that it shows more information such as the current temperature on the tick marks. The menu 940 now displays options that apply to the thermostat named "Hallway." The menu 940 also shows two circle symbols to indicate the currently active HVAC function. In this case the right circle 942 is shaded orange which indicates that the heating HVAC function is currently active. The user can also use the circular symbols to select which function is active or turn the thermostat off, according to some embodiments.

Figure 9C:
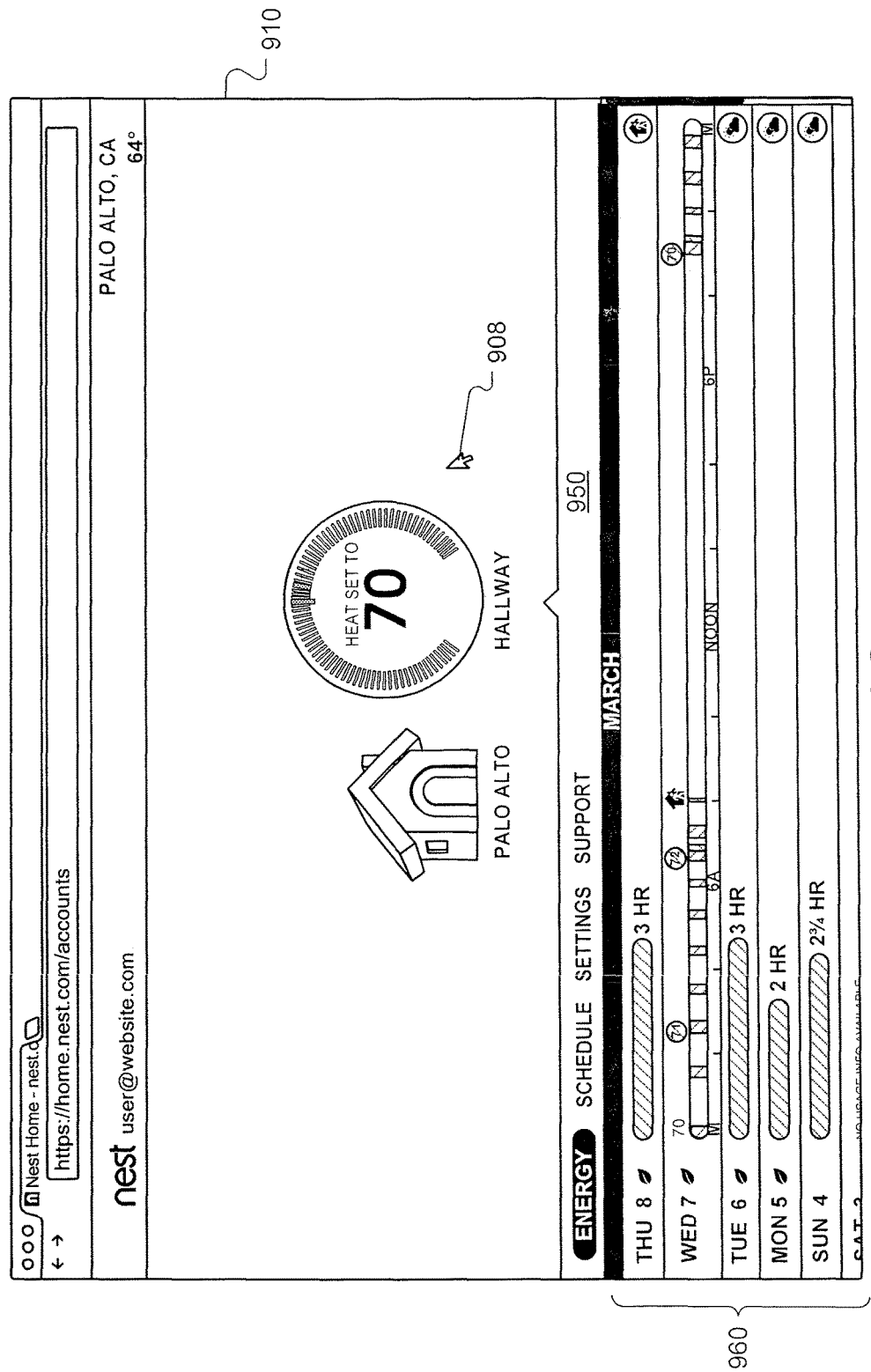
Figure 9D:
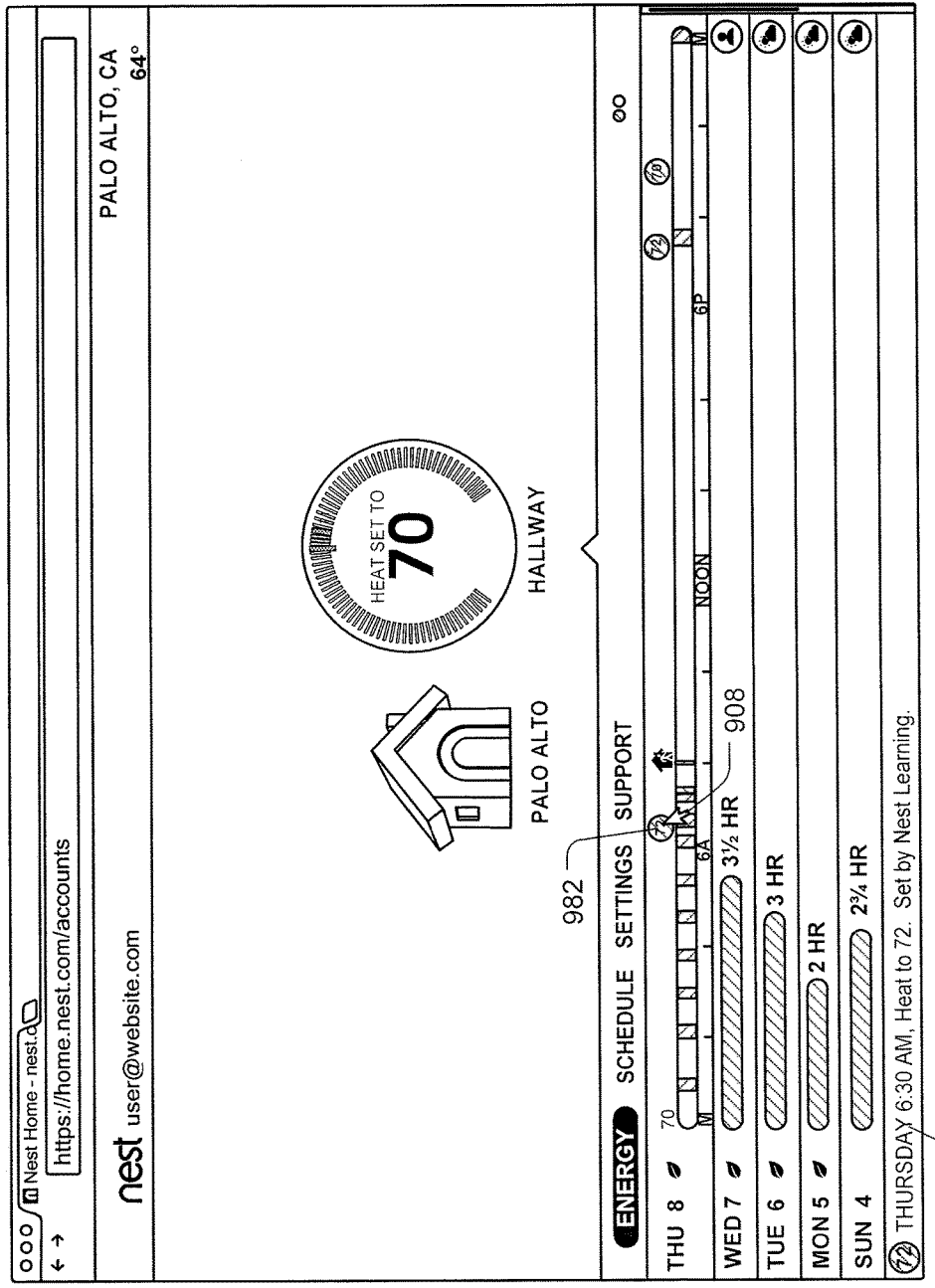
Figure 9E:
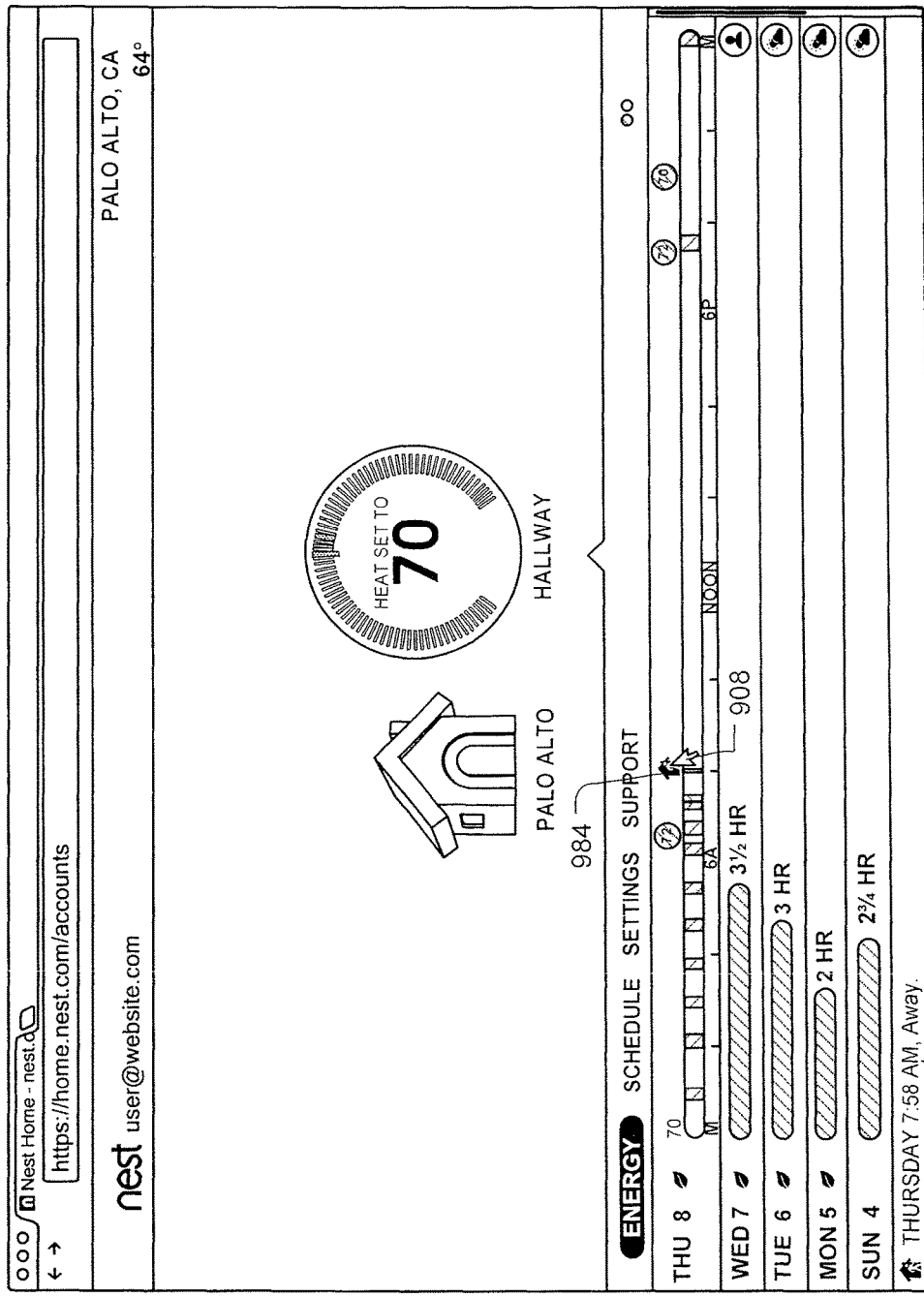
Figure 9F:
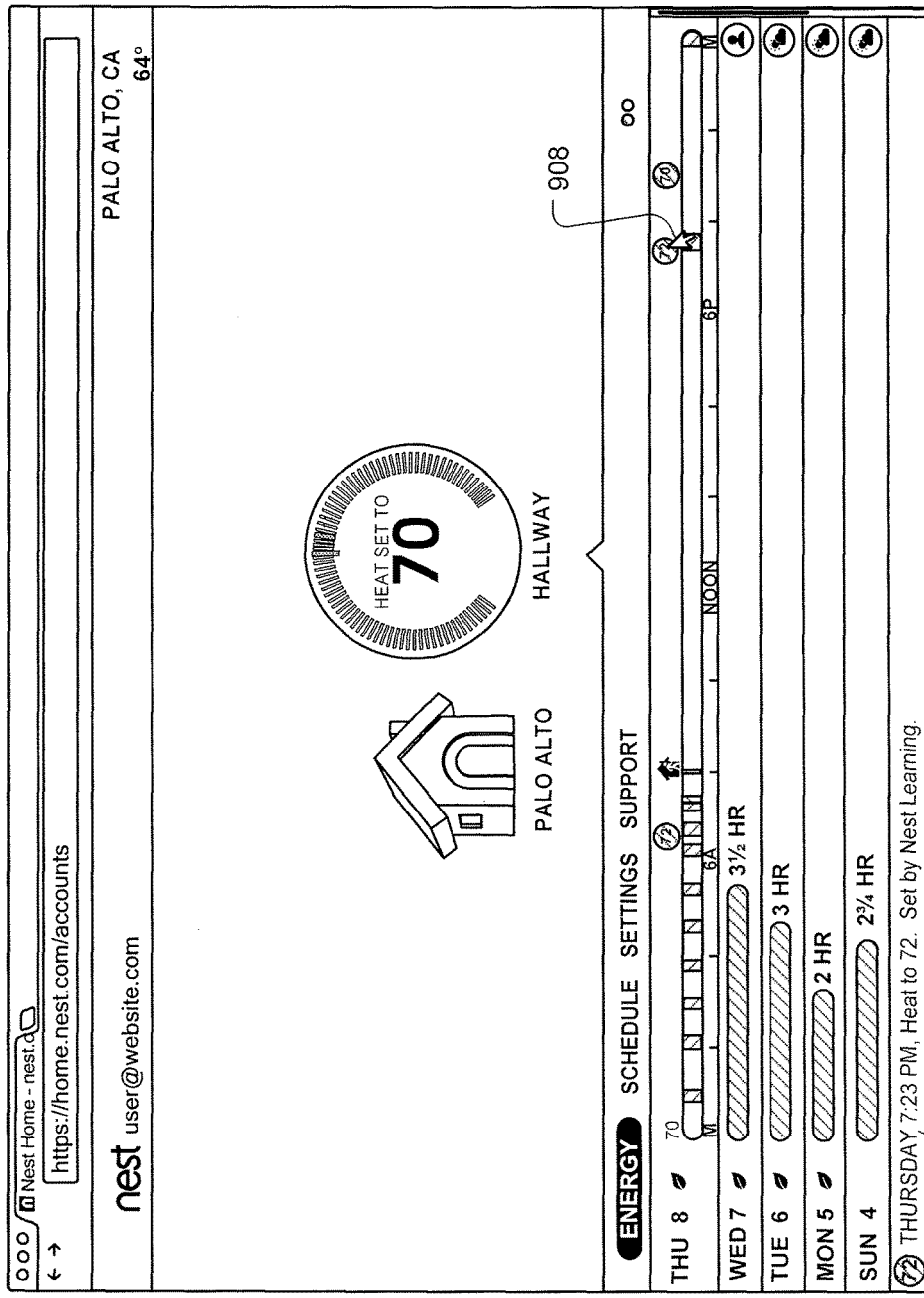
Figure 9G:
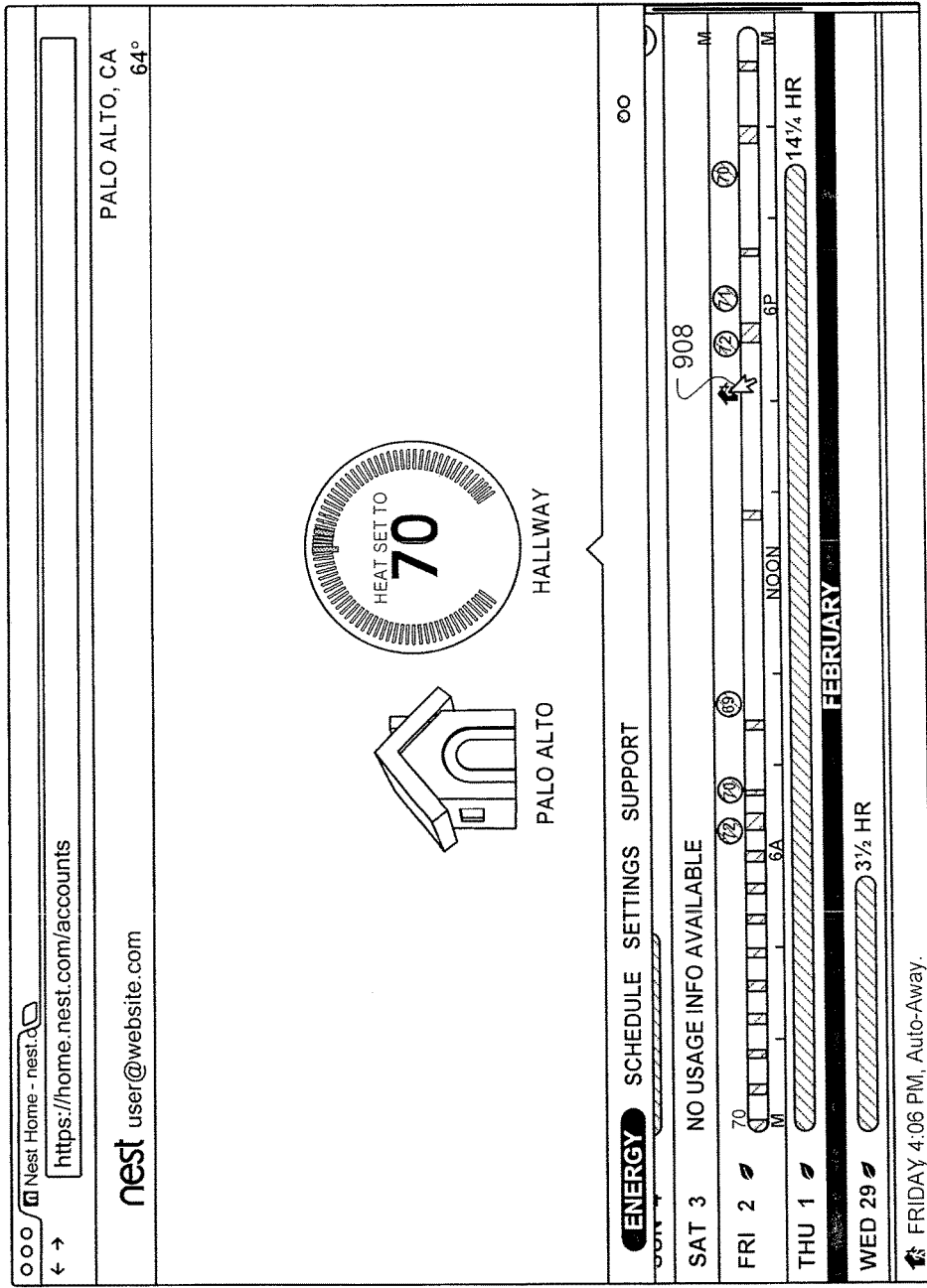

When the "Energy" menu option of selected from menu 740 in FIG. 9B by the user, the window 910 transitions to that shown in FIG. 9C. An upper menu area 750 mimics the menu 940 in FIG. 9B and provides the user location information within the menu structure as well as provides a convenient means for the user to navigate within the menu structure. The lower window area 960 shows energy related information to the user in a calendar format. The individual days of the month are shown below the month banners as shown. The user can use the pointer and the scrolling control area on right side of area 960 to scroll up and down through different days. If a scrolling control and/or gestures are provided on the pointing device (such as a scroll wheel) and other input device (such as a track pad) then it can also be used by the user to scroll through energy data for different days. A leaf logo is displayed in cases where a leaf logo has been awarded for that day. Further details of awarding the leaf logo are provided herein. For each day, a horizontal bar is used to graphically indicate to the user the amount of energy used on that day for heating and/or cooling. In the case of FIG. 9C, multi stage heating was used, and the same shading patterns are used to indicate colors as shown in FIG. 7H. The other aspects of the energy display, including the detailed daily information such as shown for Wednesday, March 7$^{th}$ are similar or identical to those shown and described in the forgoing smartphone and tablet computer examples. One difference, however, is that on a computer interface information can be displayed by a user hovering the pointer in certain locations. FIGS. 9D-9G show various example of displaying such information. In FIG. 9D, the user is hovering (but not clicking) the pointer 908 over the setpoint symbol 982. In response, an information banner 980 is displayed which indicates to the user that the symbol represents a setpoint for heating to 72 degrees on Thursday at 6:30 AM. Also indicated is how the setpoint originated—in this case set by Nest Learning, an automatic-learning feature. FIG. 9E shows an example of the user hovering pointer 908 over the away symbol 984, which caused the information banner 986 to display. In this case at 7:58 AM the thermostat was manually (i.e. by a user either directly on the thermostat or remotely) set to an away mode. FIG. 9F shows another example of hovering pointer 908 over a setpoint symbol. Banner 988 indicates that the setpoint at 7:23 PM was set by Nest Learning. FIG. 9G shows another example of hovering pointer 908 over an away symbol. In this case, banner 990 shows that the away mode was triggered by the auto-away feature.

Further description will now be provided for determining primary responsibility for either over or under average energy usage. Such responsibility information can be used, for example to display the responsibility symbols on the energy user interface screens, such as "weather" symbol 764 in FIG. 7C, "away" symbol 774 in FIG. 7D, and "user" symbol 798 in FIG. 7I. By determining and displaying the primary responsibility to the user, the user can learn to make better choices in order to conserve both energy and costs.

Figure 10:
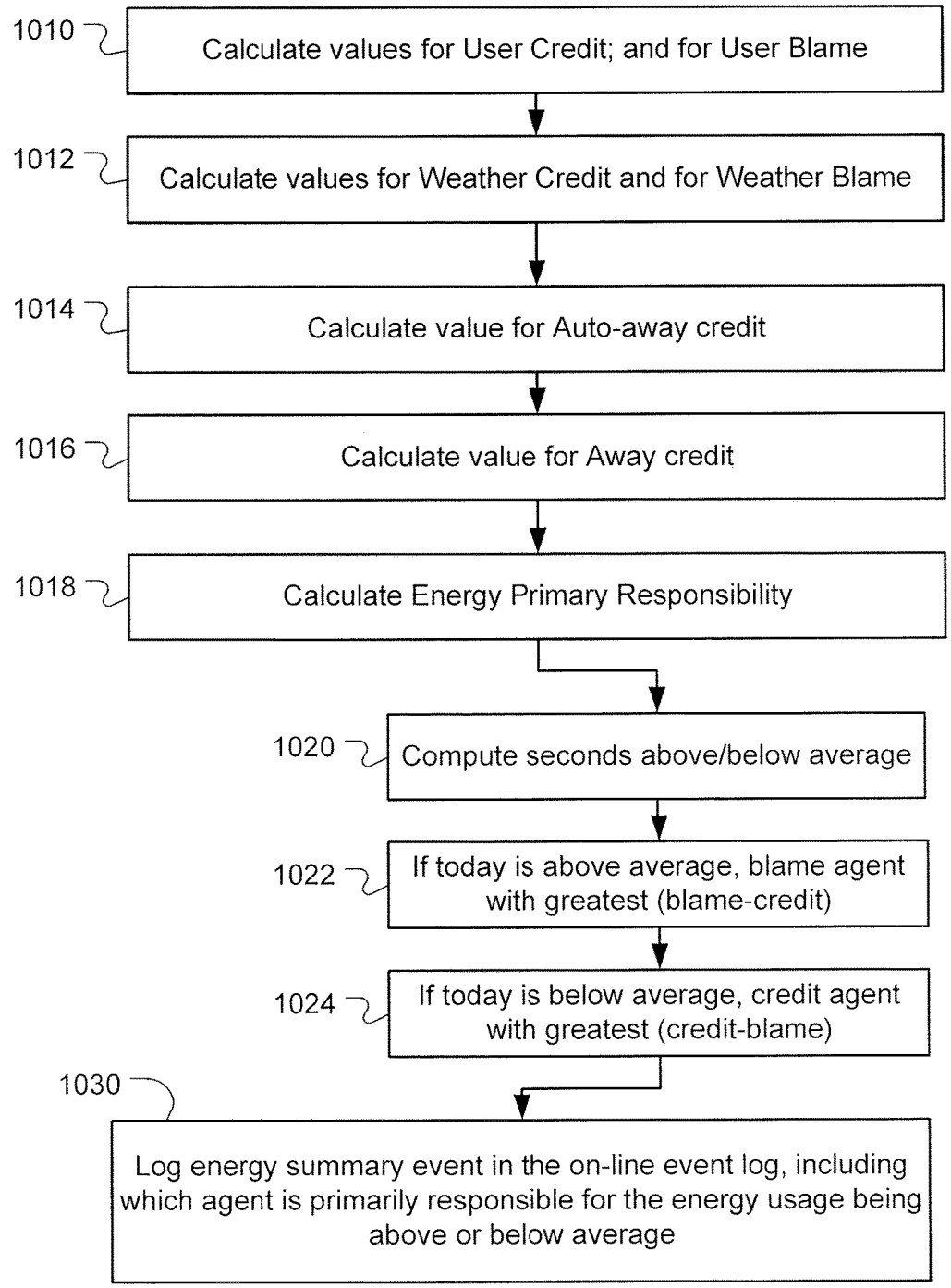
FIG. 10 is a flowchart illustrating a method for determining primary responsibility for above and below average energy usage, according to some embodiments.

FIG. 10 is a flowchart illustrating a method for determining primary responsibility for above and below average energy usage, according to some embodiments. According to these embodiments energy usage is assigned to the User, Weather, Auto-Away, or Away, which are referred to herein as "agents." The term blame will refer to a time that a particular agent causes an increase in energy usage. The term credit refers to a decrease in energy usage. The terms blame and credit are equal and opposite, so when determining the overall effect an agent has on energy usage, the affect on energy usage is equal to credit minus blame. If this effect is positive, the agent is responsible for saving energy and if the affect is negative, the agent is responsible for wasting energy. In determining primary responsibility among the various agents, the agent that has the largest overall affect on energy usage is considered to be the primary responsible agent. It is assumed that if the usage is above average, that this agent will have a net negative affect on usage, and vice versa. The method shown in FIG. 10, according to some embodiments, is carried out every midnight (local time). According to some embodiments, calculations are made in degree-seconds so that the magnitude of temperature changes as well as the duration is preserved. According to some alternate embodiments the calculations can be made in degree-hours to avoid overflow of fixed point numbers.

In step 1010, values for user credit and user blame are calculated. Note that in this example the user only gets credited or blamed for times when the thermostat is not in Away or Auto-Away mode. For heating, for every 30-second bucket the target temperature and the scheduled temperature at that time are compared. If the system is in OFF mode and ambient temperature is less than the scheduled temperature, the user avoided an inefficient setpoint, so the user is credited 30 seconds times difference between the scheduled temperature and the ambient temperature. If the target and scheduled temperatures are the same, the difference is zero, meaning that the device is running the scheduled setpoint, so the user is neither credited nor blamed. If the target temperature is less than the ambient temperature, and the ambient temperature is less than the scheduled temperature, then the user conserved energy, and the user is credited for 30 seconds times the difference between the ambient temperature and target temperature. If the scheduled temperature is less than the ambient temperature, and the ambient temperature is less than the target temperature, then the user wasted energy, so we blame the user for 30 seconds times the difference between the ambient temperature and the scheduled temperature.

For cooling, for every 30-second bucket, the target temperature and the scheduled temperature at that time are compared. If the system is in OFF mode and the scheduled temperature is less than the ambient temperature, then the user avoided an inefficient setpoint, so user is credited 30 seconds time the difference between the ambient temperature and the scheduled temperature. If the temperatures are the same, the difference is zero, meaning that the device is running the scheduled setpoint, so the user is neither credited nor blamed. If the scheduled temperature is less than the ambient temperature, and the ambient temperature is less than the target temperature, the user conserved energy, so the user is credited for 30 seconds times the difference between the target temperature and the ambient temperature. If the target temperature is less than the ambient temperature, and the ambient temperature is less than the scheduled temperature, the user wasted energy, so the user is blamed for 30 seconds times the difference between the ambient temperature and the target temperature.

In step 1012, the values for the weather credit and weather blame are calculated. Note that according to some embodiments, this weather values are averaged when finding the primary responsible agent, so that constant weather patterns are ignored. For every 30-second bucket, a calculation is made for the difference between the outside temperature and the scheduled temperature times 30 seconds (the size of bucket). If weather is in the more energetic direction in temperature (e.g. colder in the case of heating or warmer in the case of cooling), the weather is blamed by this amount. If weather is in the less energetic direction in temperature, the weather credited by this amount.

In step 1014, the values for auto-away credit are calculated. Note according to these embodiment Away or Auto-Away are not blamed in any case; they can only be credited. In heating mode, if the heating away temperature is less than the ambient temperature, and the ambient temperature is less than the scheduled target temperature, than away is credited for 30 seconds times the difference between the target temperature and the ambient temperature. In cooling mode, if the cooling away temperature high is greater than the ambient temperature, and the ambient temperature is greater than the scheduled target temperature, then away is credited 30 seconds times the difference between the ambient temperature the target temperature.

In step 1016, the values for away credit are calculated which is the same as described above for step 1014 except for manually initiated away times.

In step 1018 the primary responsible agent is calculated using the method of steps 1020, 1022 and 1024. In step 1020, the seconds above/below average is calculated by summing total activity (heating, cooling, aux) over days in the past week that have enough data (e.g. missing no more than 2 hours) and divide that by the number of valid days. Then the seconds above weekly average is equal to the total activity today minus the average activity. In step 1022, if today is above average, then blame the agent with the greatest (blame−credit). If all values are less than zero, then set the blame to unknown. In step 1024, if today is below average, then credit the agent with the greatest (credit−blame). If all values are less than zero, then set the credit to unknown. Note that according to some embodiments, the weather can only be blamed/credited when at least 18 hours of weather data is available. In step 1030, the energy summary is logged with an event including which agent (user, weather, auto-away, or manual-away) is deemed to be primarily responsible for the above or below average energy usage.

Figure 11A:
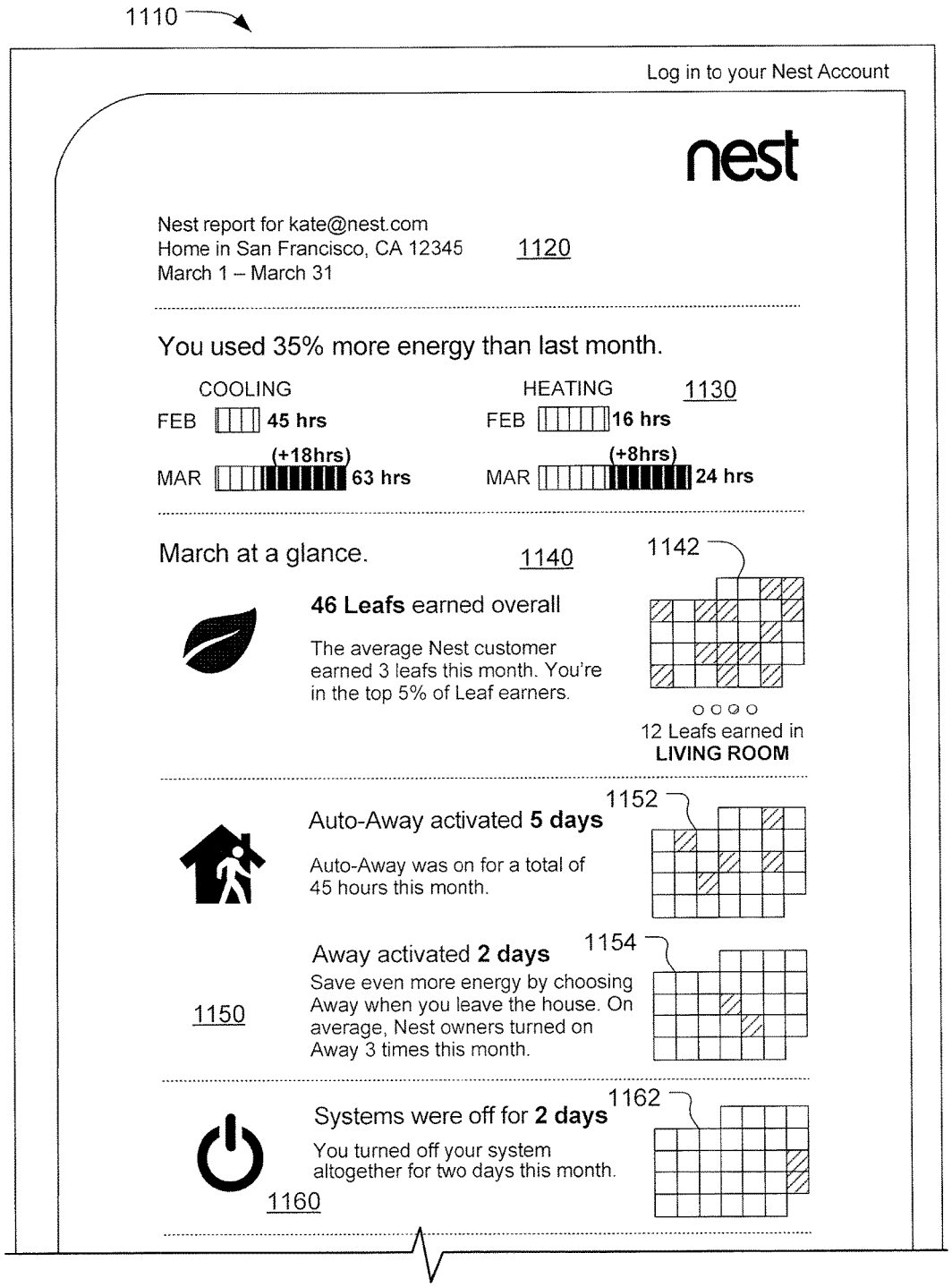
FIGS. 11A-B show an example of an email that is automatically generated and sent to users to report energy performance-related information, according to some embodiments.
Figure 11B:
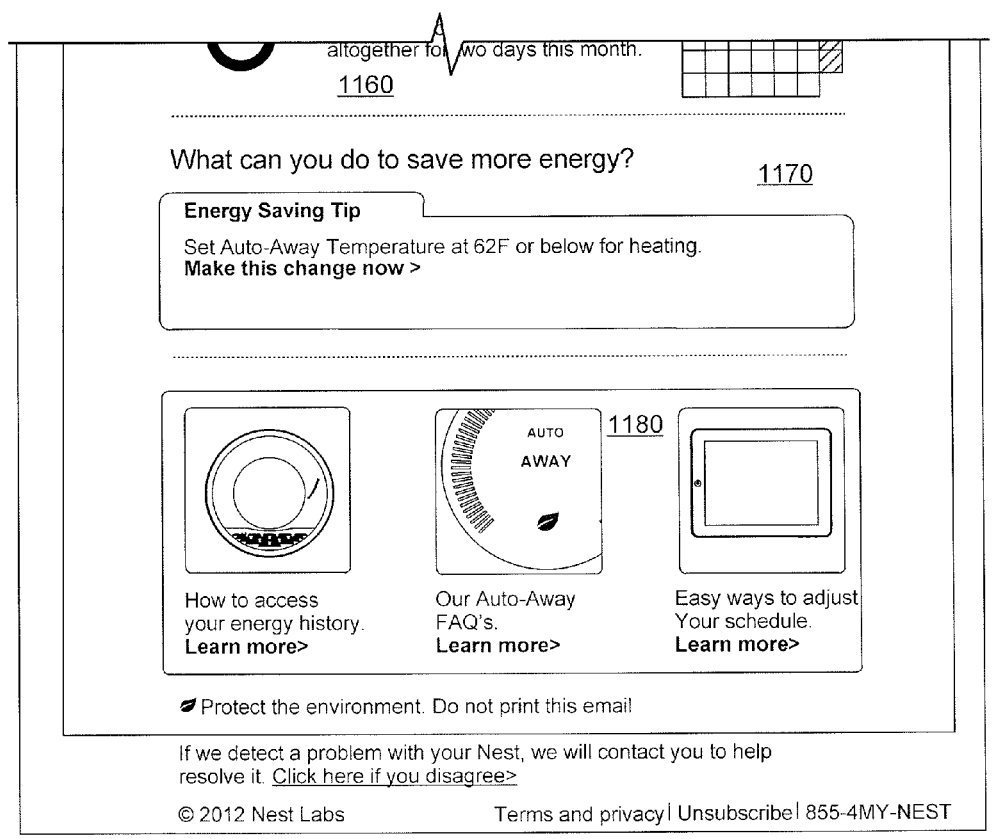

FIGS. 11A-B show an example of an email that is automatically generated and sent to users to report energy performance-related information, according to some embodiments. FIGS. 11A and 11B show the upper part and lower part of the example email 1110 respectively. According to some embodiments the a monthly energy summary email is sent to the user to inform the user of various energy-related data and also provide the user with recommendations so as to enable the user to make better choices in terms of improving comfort and/or conserving energy and costs.

Area 1120 of email 1110 includes the manufacturer's logo, along with the user's account name, location and the dates for which the information pertains. Area 1130 gives the user an energy usage summary for the month. In this calculations indicate that 35% more energy was used this month versus last month. Bar symbols are included for both cooling and heating for the current month versus the past month. The bars give the user a graphical representation of the energy, including different shading for the over (or under) user versus the previous month.

Area 1140 indicates leaf award information. In this case the user has earned a total of 46 leafs overall (since the initial installation). A message indicates how the user compares to the average user. A calendar graphic 1142 shows the days (by shading) in which a leaf was earned. In this case leafs were earned on 12 days in the current month. Details of the leaf algorithm are given in FIGS. 12-15. According to some embodiments, a leaf is awarded for the day, if the leaf is displayed (or would be displayed) for at least one hour during that day.

Area 1150 shows information relating to the auto-away and manual-away features. The calendar symbols 1152 and 1154 show the days that auto-away and/or manual-away was triggered. Also provided in area 1150 is information about the number of hours auto-away was used, recommendations for saving energy and cost, as well as information about averages among other users.

Area 1160 shows information during which the thermostat was switched to "off," and includes a month calendar symbol 1162. Area 1170 provides tips the aid the user in saving more energy. The tips can be customized for the particular user. For example, if the user has set the away temperature for heating to greater than the default 62 degrees, a message can be displayed suggesting a change. A link is also provided to further aid the user in conveniently making the suggested settings change.

Area 1180 provides further assistance such as how to use certain features and obtain further information, along with links for further information and assistance.

Figure 12:
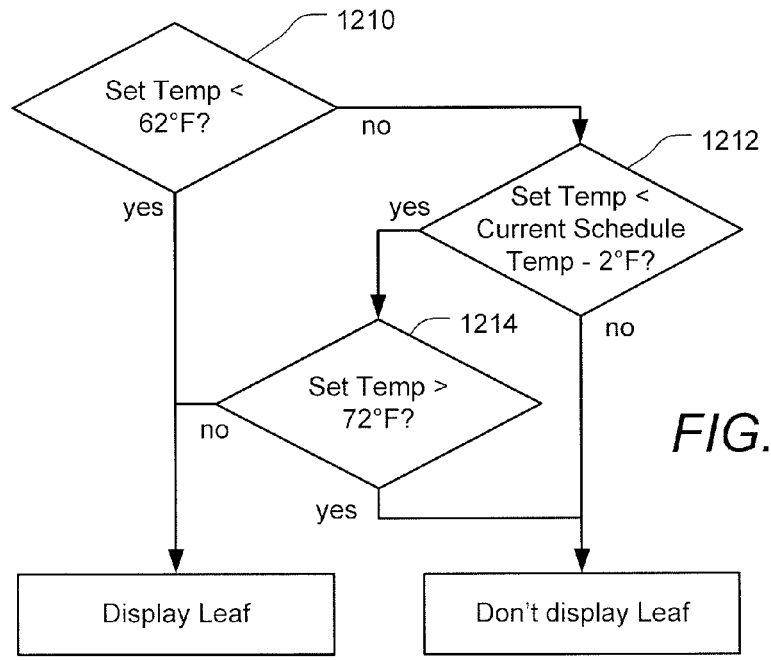
FIGS. 12-15 are flow charts showing steps in determining when a leaf will be displayed, according to some embodiments.

FIGS. 12-15 are flow charts showing steps in determining when a leaf will be displayed, according to some embodiments. FIG. 12 shows the algorithm for displaying the leaf when heating is active. In step 1210, the leaf always shows when the setpoint is below 62° F. In step 1212, if the setpoint is manually changed to 2° F. or more below the current schedule setpoint then the leaf is displayed, except that a leaf is not displayed if the setpoint is above 72° F., according to step 1214.

Figure 13:
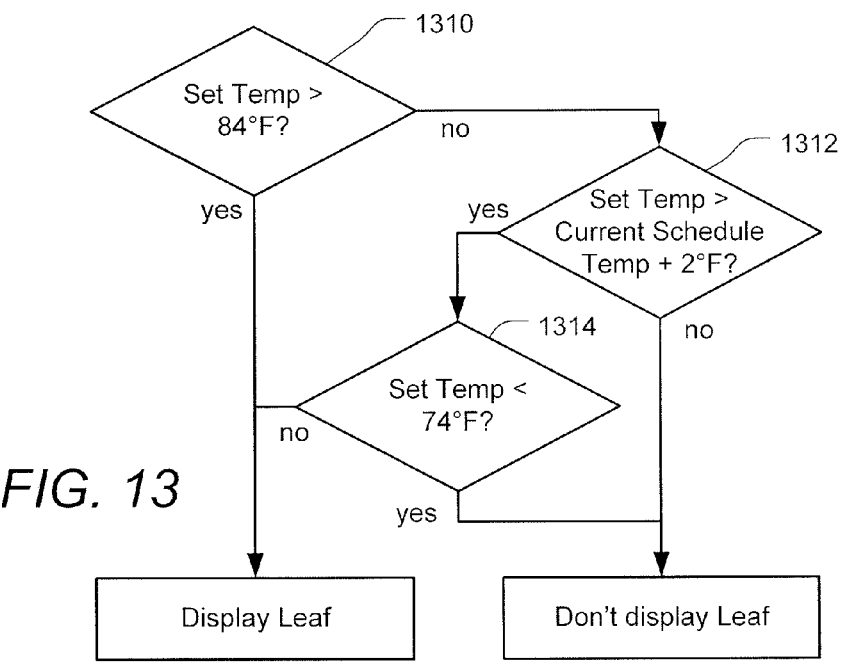

FIG. 13 shows the algorithm for displaying the leaf when cooling is active. In step 1310, a leaf is always displayed if the setpoint is above 84° F. In stop 1312 the leaf is displayed if the setpoint is manually set to 2° F. or more above the current schedule setpoint, except that according to step 1314 *t* the leaf is not displayed if the setpoint is below 74° F. For purposes of earning a leaf to the day, which is used for example in the energy displays and the energy email shown herein, a leaf is awarded when the leaf has displayed for at least one hour during that day.

Figure 14:
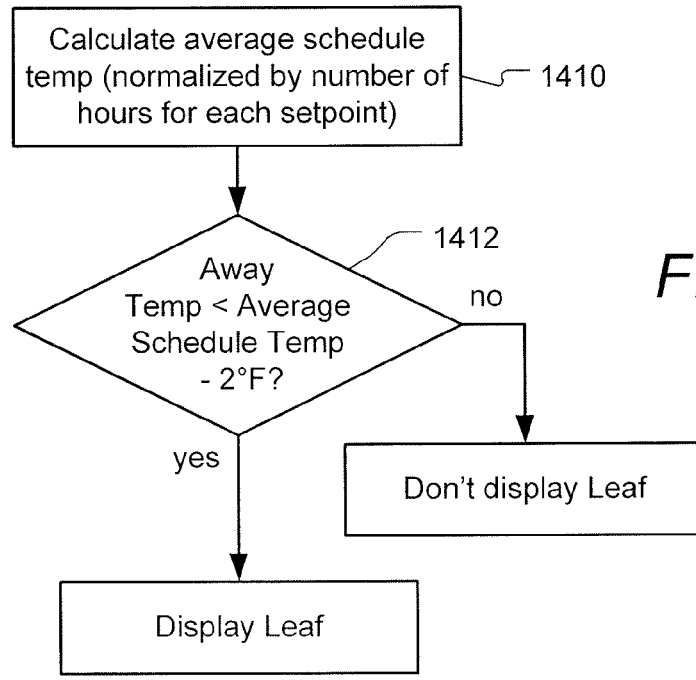
Figure 15:
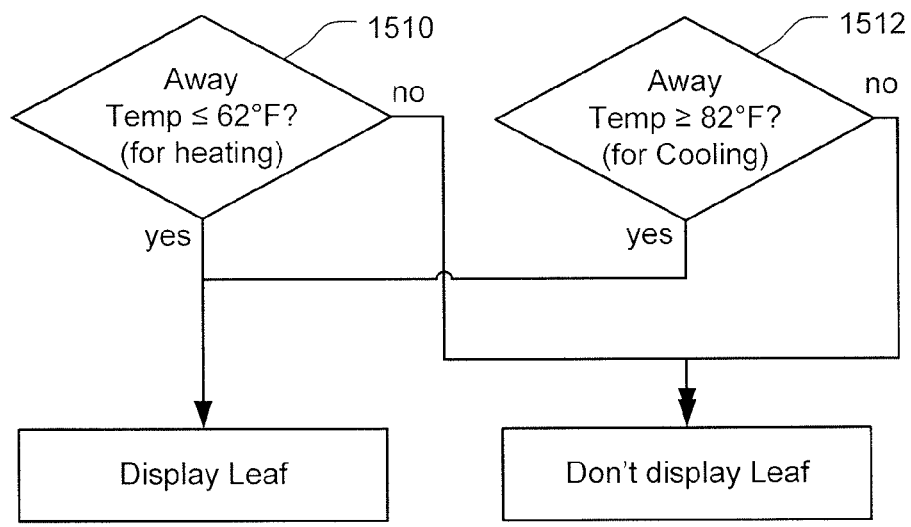

FIGS. 14 and 15 show the algorithms for displaying the leaf when selecting the away temperatures. FIG. 14 shows the general algorithm. In step 1410 an average schedule temperature is calculated by normalizing the setpoints by the number hours for each setpoint. In step 1412, the leaf is displayed if the away temperature is set to 2° F. or more below the average schedule temperature, in the case of heating. The same algorithm can be used for cooling displaying a leaf if the away temperature was 2° F. or more above the average schedule temperature. Furthermore, absolute thresholds for displaying and/or not displaying the leaf such as in FIGS. 12 and 13 can also be implemented in the away temperature algorithm, according to some embodiments. If there is no schedule, e.g. if the thermostat has just been installed, then the algorithm in FIG. 15 is used. In step 1510, the leaf is displayed if the away temperature is set at or below 62° F. for heating. In step 1512, the leaf is displayed if the away temperature is set at or above 82° F. for cooling.

Figure 16:
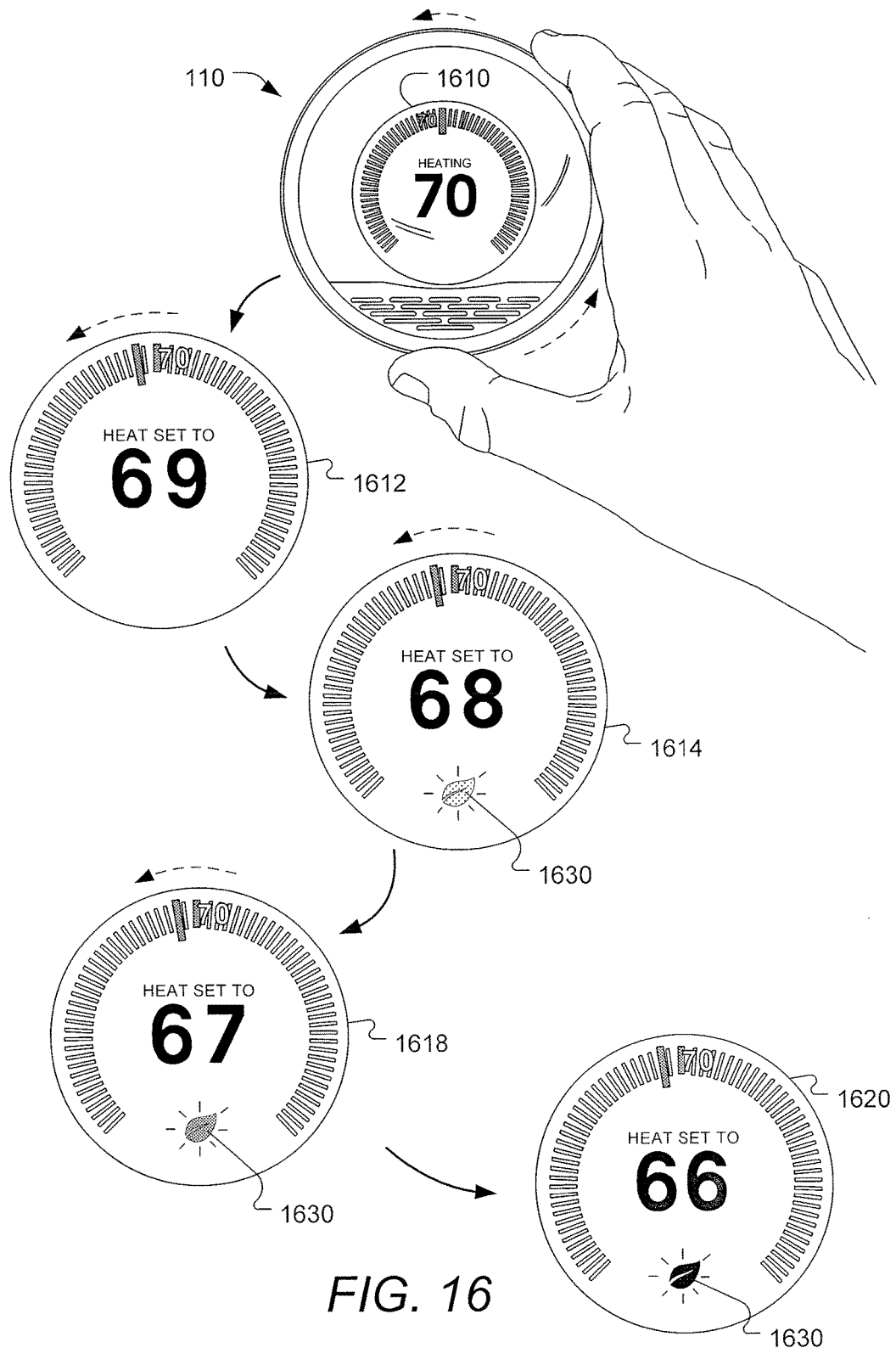
FIG. 16 is a series of display screens on a thermostat in which a leaf icon is slowly faded to on or off, according to some embodiments.

FIG. 16 is a series of display screens on a thermostat in which a leaf icon is slowly faded to on or off, according to some embodiments. Thermostat 110 is shown with at a current setpoint of 70 degrees and a current ambient temperature of 70 degrees in screen 1610. The user begins to rotate the outer ring counter clockwise to lower the setpoint. In screen 1612, the user has lowered the setpoint to 69 degrees. Note that the leaf is not yet displayed. In screen 1614 the user has lowered the setpoint to 68 degrees and according to the algorithm (for example as shown in FIG. 12), the leaf symbol 1630 is displayed. According to these embodiments, however, the leaf is first shown in a faint color (i.e. so as to blend with the background color). In screen 1618, the user continues to turn down the setpoint, now to 67 degrees. Now the leaf symbol 1630 is shown in a brighter more contrasting color (of green, for example). Finally, if the user continues to turn set the setpoint to a lower temperature (so as to save even more energy), in the case of screen 1620 the setpoint is now 66 degrees, the leaf symbol 1630 is displayed in full saturated and contrasting color. In this way the user is given useful and intuitive feedback information that further lowering of the heating setpoint temperature provides greater energy savings.

Thermostat management servers 520, supra have the capability to communicate with thermostat 101 paired with the servers, and in particular have the ability to transmit, receive and process information (e.g., data, firmware, instructions and the like) to or from thermostat 101. One exemplary non-limiting example of such information relates to the functioning of the thermostat and the HVAC system controlled by it (e.g., scheduled temperatures, away states and temperatures, manual temperature changes, and the amount of time in a particular mode (e.g., heating mode, off mode, cooling mode) or in a particular state (Auto-Away, or Manual-Away). FIGS. 17A-D illustrate time plots of a normal setpoint temperature schedule versus an actual operating setpoint plot corresponding to an exemplary operation of an Auto-Away/Auto-Arrival algorithm according to some embodiments. For purposes of this discussion, Auto-Arrival simply puts the thermostat back into its schedule mode, where the setpoint temperature returns back to the schedule temperature, unless otherwise manually modified by the user. Shown in FIG. 17A, for purposes of clarity of disclosure, is a relatively simple exemplary thermostat temperature schedule 1702 for a particular weekday, such as a Tuesday, for a user (perhaps a retiree, or a stay-at-home parent with young children). The schedule 1702 consists of a simple schedule (for example when the occupant is normally awake) between 7:00 AM and 9:00 PM for which the desired and scheduled temperature is 76 degrees, and a schedule between 9:00 PM and 7:00 AM (for example when the occupant may normally be asleep) for which the desired and scheduled temperature is 66 degrees. For purposes of the instant description, the schedule 1702 can be termed a "normal" setpoint schedule or just schedule. A schedule is a set of one or more setpoint temperatures at different times of the day (e.g., 76 deg. at 7 am and 66 deg. at 9 pm), when scheduled time is reached the thermostat will control the HVAC system to achieve the scheduled setpoint temperature. The thermostat will control the HVAC system to achieve the scheduled temperature unless over ridden, for example by a user manually setting the temperature set point, which temperature would be maintained until the next scheduled time indicating a different scheduled temperature, and the thermostat would return to controlling the HVAC system to achieve the schedule. The normal setpoint schedule 1702 could have been established by any of a variety of methods described previously in one or more of the commonly assigned incorporated applications, or by some other method.

In accordance with a preferred Auto-Away algorithm, an enclosure occupancy state is continuously and automatically sensed using thermostat 111's multiple sensor technology, such as a passive infrared proximity sensor within thermostat 110. According to some embodiments the occupancy sensor makes measurements at fairly high frequencies—such as 1-2 Hz. The measurements are then collected into "buckets" of time, such as 5 minutes. A simple algorithm is used to determine, for each "bucket", whether occupancy is detected or not. For example, if more than two sensor readings in a bucket show detected movement, then the 5 minute "bucket" is regarded as "occupancy detected." Thus, each "bucket" is classified into one of two states: "occupancy detected" or "no occupancy detected." According to some embodiments a certain threshold percentage of readings must indicate movement in order for the bucket to be classified as "occupancy detected." For example, it may be found that even with relatively poor placement, around 10 percent of the readings indicate movement when the conditioned enclosure is occupied. In this example, a threshold of 5 percent may be used to classify the bucket as "occupancy detected."

According to some embodiments, based at least in part on the currently sensed states of the buckets, the thermostat may classify the enclosure or conditioned space into any of several states, for example and not by way of limitation "Home" (also known as "occupied") and "Away" (Auto- or Manual-). According to some preferred embodiments, when the currently sensed occupancy has been "no occupancy detected" for a predetermined minimum interval, termed herein an away-state confidence window (ASCW), then the Auto-Away feature triggers a change of the state of the enclosure from "Home" to Away, Auto-Away in particular. Manual-Away is when a user manually sets the thermostat into the Away state, referred to as Manual-Away. As a result of a state change to Away (Auto- or Manual-) the actual operating setpoint temperature is changed to a predetermined energy-saving away-state temperature (AST), regardless of the setpoint temperature indicated by the normal thermostat schedule, where AST is preferably well below any scheduled temperature setpoints.

The purpose of the Auto-Away and Manual-Away features is to avoid unnecessary heating or cooling when there are no occupants present to actually experience or enjoy the comfort settings of the schedule 1702, thereby reducing HVAC usage and saving energy. The AST may be set, by way of example, to a default predetermined value of 62 degrees for winter periods (or outside temperatures that would call for heating) and 84 degrees for summer periods (or outside temperatures that would call for cooling). Optionally, the AST temperatures for heating and cooling can be user-settable.

The away-state confidence window (ASCW) corresponds to a time interval of sensed non-occupancy after which a reasonably reliable operating assumption can be made, with a reasonable degree of statistical accuracy, that there are indeed no occupants in the enclosure. For most typical enclosures, it has been found that a predetermined period in the range of 90-180 minutes is a suitable period for the ASCW, to accommodate for common situations such as quiet book reading, stepping out to the corner mailbox, short naps, etc. in which there is no sensed movement or related indication for the occupancy sensors to sense. Further details of the away state features (e.g. and not by way of limitation, establishing ASCW, and adjusting ASCW) are provided in one or more of the commonly assigned patent applications, including PCT/US11/61457, supra.

Figure 17A:
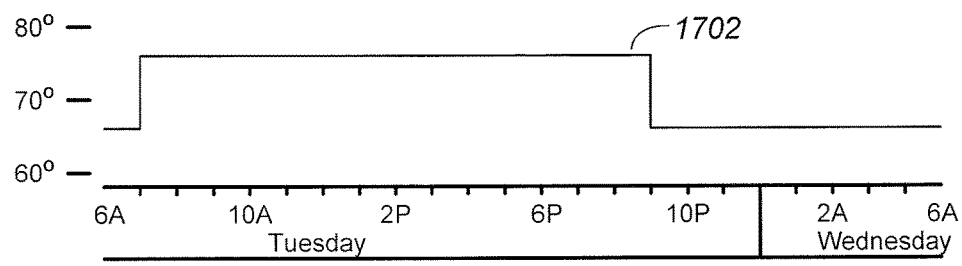
FIGS. 17A-D illustrate temperature schedules and activation of the Auto-Away state over a 24 h period for illustration of the temperature schedule in conjunction with Auto-Away.
Figure 17B:
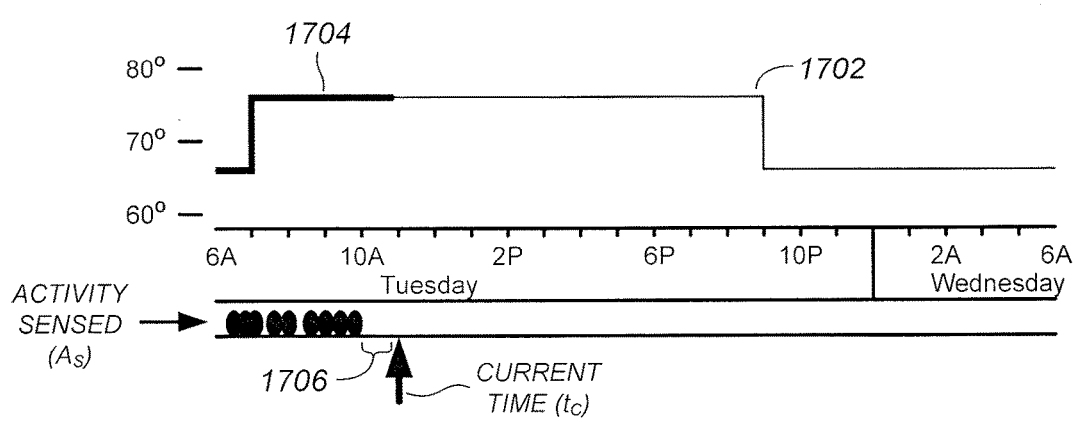
Figure 17C:
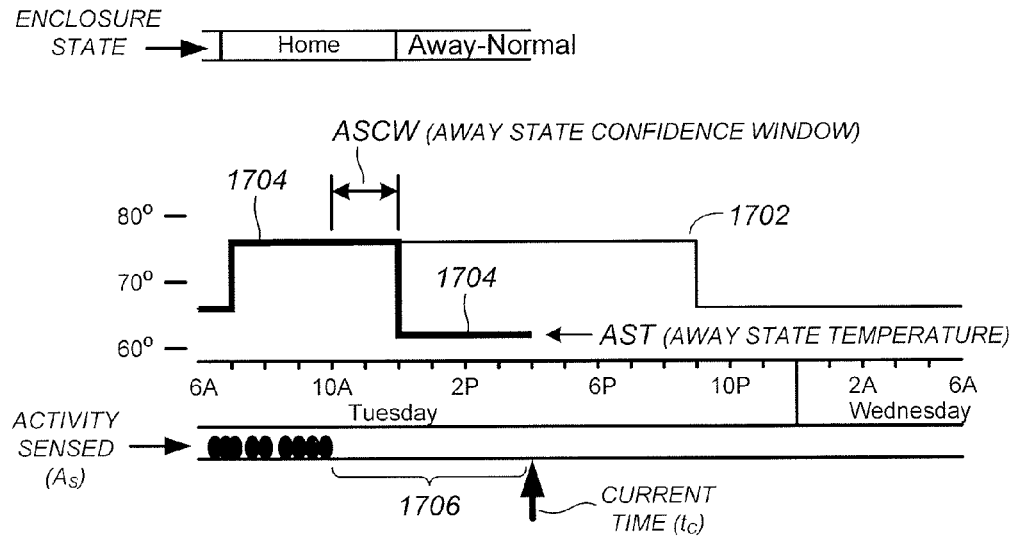
Figure 17D:
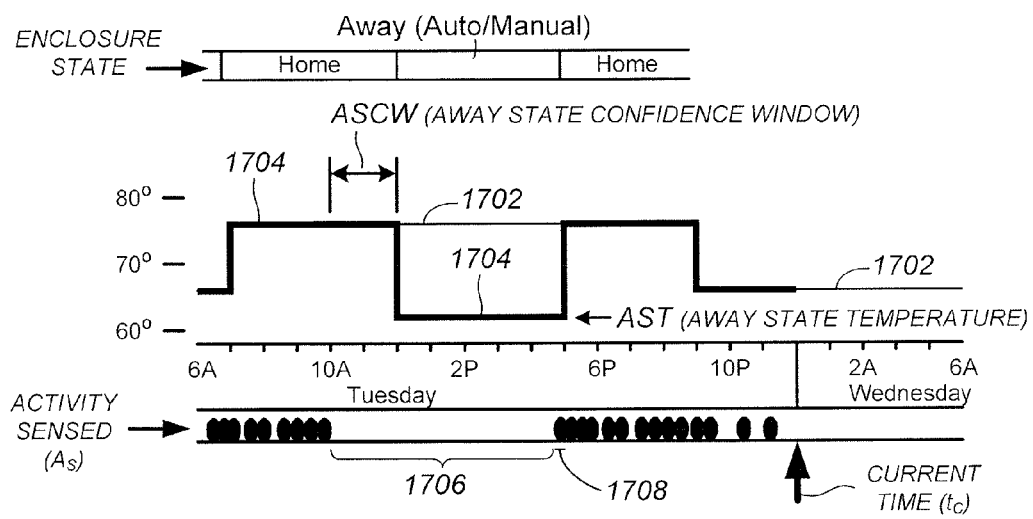

In the example of FIGS. 17B-D, exemplary description of Auto- and Manual-Away operation is provided in the context of a heating scenario with an ASCW of 120 minutes, and an AST of 62 degrees, with it to be understood that counterpart examples for cooling and for other ASCW/AST value selection would be apparent to skilled artisan in view of the present description and are within the scope of the embodiments described herein. Shown for purposes of illustration in FIG. 17B is the scheduled setpoint plot 1702 and actual operating setpoint plot 1704, along with a sensed activity timeline ($A_S$) showing small black oval markers corresponding to sensed activity (i.e. the "buckets" of time where occupancy is sensed), that is current as of 11:00 AM. Notably, as of 11:00 AM, there was significant user activity sensed up until 10:00 AM, followed by a one-hour interval 1706 of inactivity (or buckets classified as "no occupancy detected"). Since the interval of inactivity in FIG. 17B is only about 1 hour, which is less than the ASCW, the Auto-Away feature does not yet trigger a change of state to the Away state.

Shown in FIG. 17C are the scheduled and actual setpoint plots as of 4:00 PM. As illustrated in FIG. 17C, an Away state was automatically triggered (Auto-Away) at 12:00 PM after 120 minutes of inactivity (120 minutes since the last "occupancy detected" bucket), the actual operating setpoint 1704 changes from the scheduled setpoint 1702 to the AST temperature of 62 degrees. As of 4:00 PM, no activity has yet been sensed subsequent to the triggering Auto-Away, and therefore Auto-Away remains in effect and thermostat 110 will control the HVAC system to maintain ASW.

Referring to FIG. 17D the scheduled and actual setpoint plots as of 12:00 AM are shown following the example shown in and described with respect to FIGS. 17A-C. As illustrated in FIG. 17, occupancy activity started to be sensed for a brief time interval 1708 at about 5 PM, which triggered the "auto-return" or "auto-arrival" switching the enclosure to "Home" state, at which point the operating setpoint 1704 was returned to the normal setpoint schedule 1702. Alternatively, if Manual-Away had been set, occupancy activity would trigger the "auto-return" or "auto-arrival" switching the thermostat to the Home or Normal state from the Away State, returning the operating set point 404 to the normal or Scheduled set point 1702.

For some embodiments, the Away state maintains the setpoint temperature at the energy-saving AST temperature until one of the following non-limiting scenarios occurs: (i) a manual input is received from the user that changes the state back to the Home state returning control back to the schedule temperature setpoint; (ii) a manual input is received from the user which changes the setpoint temperature, which temperature will control until the next time for a scheduled temperature setpoint or (iii) an "auto-arrival" mode of operation is triggered based on sensed occupancy activity, which changes the state back to the Home state, thereby returning control back to the schedule temperature. Other scenarios (e.g. Vacation-Away and Sleep State) will be apparent to the skilled artisan, many of which are more thoroughly described in one or more of the commonly assigned applications, including PCT/US11/61457, supra.

FIGS. 18-37 depict an alternative embodiment for determining when a contributor or agent causes usage or non-usage of the HVAC system, and for reporting such usage or non-usage. As will be appreciated there may be many contributors that cause activation or inactivation of the HVAC system, which may include by way of example and not limitation Away (Auto or Manual), weather, manually setting a temperature setpoint, a difference in temperature schedules between time periods, a difference in time between time periods being compared (e.g., different days in months), and Airwave® (shutting an air conditioning compressor off in advance of reaching setpoint temperature).

Figure 18:
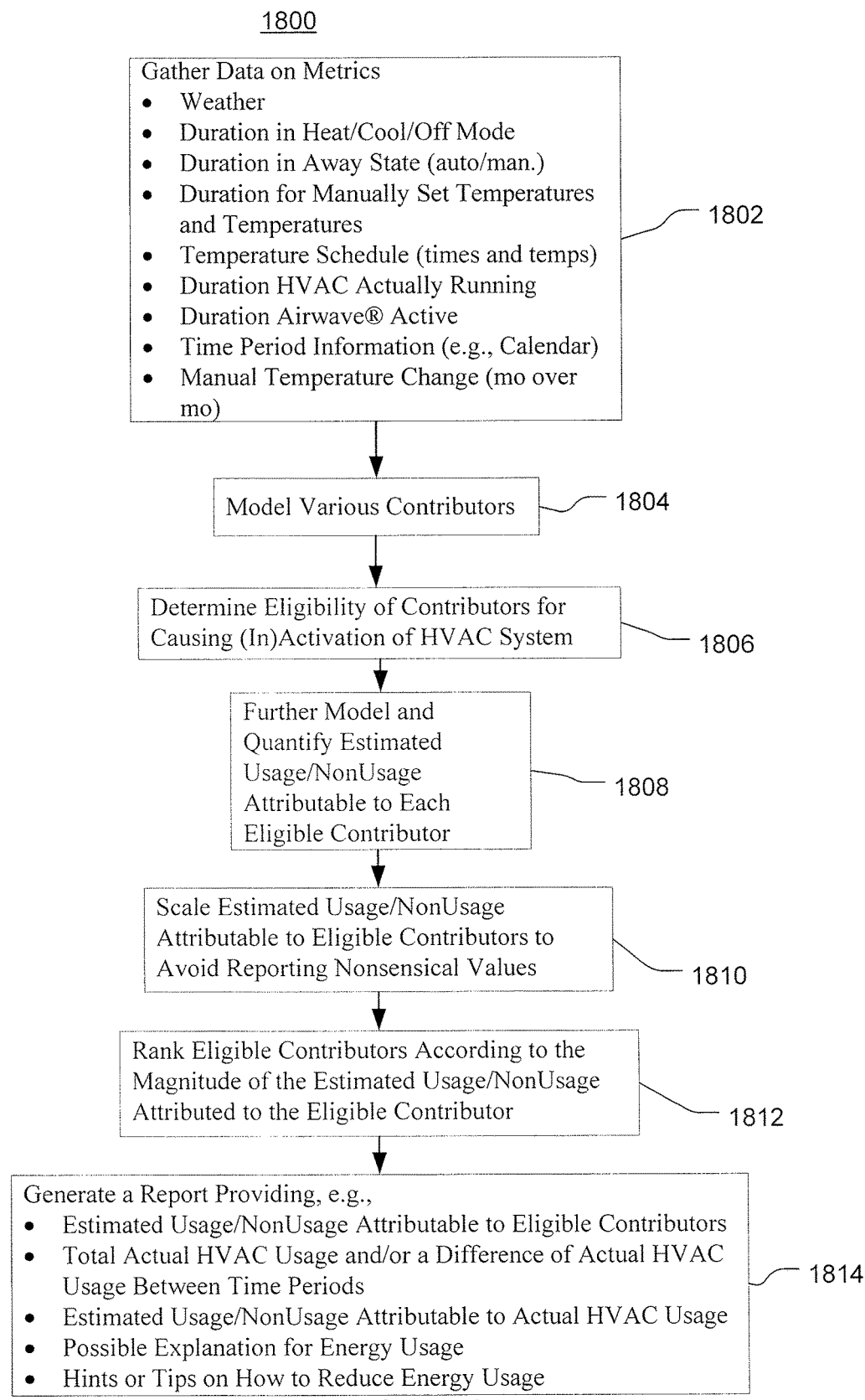
FIG. 18 shows a flow chart for a method in accordance with an embodiment for determining estimated HVAC system usage attributed to one or more contributors or causative agents, and reporting the estimated HVAC usage for the causal agents along with the actual HVAC system usage.

FIG. 18 depicts an alternative method 1800 for determining and reporting when a contributor or agent causes usage/non-usage of the HVAC system, or alternatively stated when an estimated usage/non-usage of the HVAC system is attributable to a contributor or an agent. In step 1802 data on metrics used in embodiments of the inventive method are acquired. This may be done by the processor on the thermostat itself, but more preferably by thermostat management servers 520 or alternatively any other processing device communicating with the thermostat, or any combination thereof. Data on the metrics may include, for example and not by way of limitation, weather (e.g., outside temp), time in Away state ($t_{away.man.heat}$, $t_{away.man.cool}$ or $t_{away.auto.heat}$, $t_{away.auto.cool}$), time in heating/cooling/off mode ($t_{heat}$, $t_{cool}$, $t_{off}$), time a temperature is manually set ($t_{man.heat}$, $t_{man.cool}$) time the HVAC system is actually running, or usage time or run-time ($t_{usage.heat}$, $t_{usage.cool}$) and the amount of time Airwave® was active. It will be appreciated that the subscript "heat" and "cool" refer to when the system is heating or cooling respectively. In step 1804 a model is built for each contributor. Alternatively this step may also be considered as characterizing each contributor or agent in preparation for the eligibility determination step 1806. For a preferred embodiment, the model or characterization mathematically represents the contributor using one or more metrics preferably as a function of time. Embodiments of the models or characterizations are more fully explained below. In step 1806 the eligibility of each of the contributors for causing activation or inactivation of the HVAC system is determined. Alternatively stated, step 1806 determines whether usage/nonusage (alternatively activation/inactivation) of the HVAC system may be attributable to a particular contributor or agent. Step 1806 considers the model or characterization from step 1804, if the model or characterization does not make sense that a contributor actually or likely caused activation/inactivation of the HVAC system then that particular contributor is eliminated from consideration as a cause or potential cause. For example, and as further explained below, if the mean outside temperature over a time period increases and usage of the HVAC system in the heating mode goes up, then it is likely that weather is not a contributor causing HVAC activation, but if cooling usage goes up while in cooling mode in this scenario, then weather may be a contributor and would be considered eligible for causing the change in energy use over the time period. Step 1808 calculates or quantifies the estimated amount of HVAC usage/non-usage attributable to each eligible contributor. In an exemplary embodiment and as further explained below, step 1808 uses an empirically determined heat slope or cool slope to mathematically quantify the amount of usage or non-usage, preferably in units of time, of the HVAC system attributable to some eligible contributors. The embodiments described herein are described in the context of comparing actual HVAC usage time or run time between one calendar-month and a second calendar month time period, and estimated HVAC usage/nonusage time for any particular eligible contributor over the time period, where time is the indicator or measure of energy usage. The skilled artisan will appreciate that other time periods and other measures of energy and estimated energy usage may be employed within the scope of the present disclosure and claimed invention.

It will be appreciated that data for the metrics may not be available on any given day or time for a variety of reasons. For example and not by way of limitation, the user may have recently installed thermostat 110, the data was deleted or otherwise corrupted or for any of a host of reasons known and appreciated by the skilled artisan. The skilled artisan will appreciate she can interpolate or approximate missing data by using data from nearby times, and, if necessary mathematically manipulating the data (averaging near by data for example). Interpolating the nearby data to fill in the missing data is frequently much better than doing the analysis with missing data; in some cases it's impossible or at least extremely difficult to perform the analysis without the missing data.

Figures 19A, 19B, 19C, 19D:
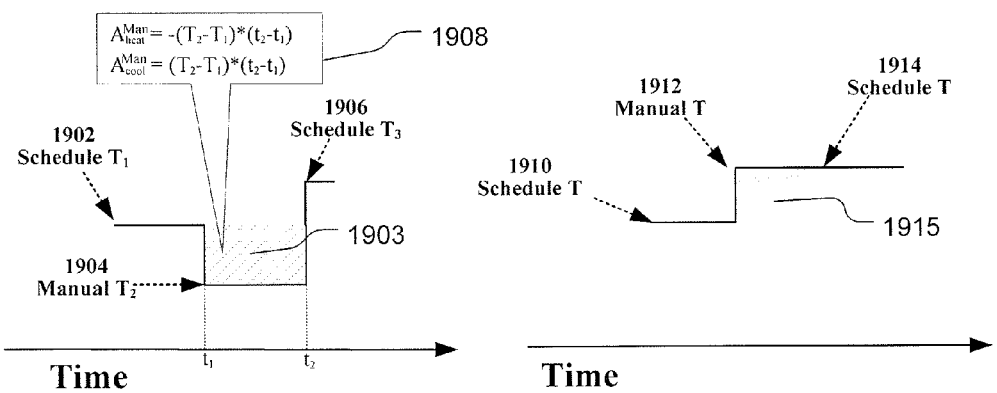
FIGS. 19A-D illustrate characterizing an effort needed by the HVAC system to maintain a setpoint temperature schedule when the schedule is changed either manually, or by the system entering into an Away state.

FIGS. 19A-D depict embodiments of models or characterizations of the Away state contributor (FIGS. 19C-D) and the manual change to a scheduled temperature setpoint contributor (FIGS. 19A-B). FIG. 19A shows scheduled temperature setpoint $T_1$ 1902, where at time $t_1$ the user manually reduced the scheduled setpoint to temperature $T_2$ (1904), which temperature the thermostat maintains until time $t_2$ where the temperature changes to the next scheduled temperature $T_3$, which may or may not be the same as the previous scheduled temperature $T_1$. The cross-hatched area 1903, calculated using equations 1908, represents the amount of "effort" required to maintain the temperature setpoint at $T_1$ over the period $t_1$ to $t_2$. Equations 1908 and resulting cross-hatched area 1904 is a model or characterization of the amount of energy saved by virtue of manually reducing the setpoint below the scheduled temperature. This description is for when the thermostat is in a heating mode, if in a cooling mode, equations 1908 and the resulting cross-hatched area 1903 would model or characterize the amount of effort needed to maintain the new setpoint temperature over $t_1$ to $t_2$ by virtue of reducing the setpoint temperature below the scheduled setpoint. It will be appreciated, and further described below, that a manual change to the setpoint may be viewed as a localized change that may happen occasionally due to user preference, but would not be tantamount to manually altering the schedule, which if such manual setpoint adjustment were frequent it may defeat the purpose of having the programmable learning thermostat at all. The skilled artisan will appreciate that area 1903 would have negative sign for an energy savings (in heat mode), and further that sign convention as to what represents savings versus usage is a matter of choice. For the embodiments described herein a positive area will represent savings or nonusage and negative area will represent usage. Thus, a negative sign appears in equation 1908 to make area 1903 positive (by convention) in the heating mode representing potential energy savings or HVAC nonusage over $t_1$ to $t_2$. FIG. 19B is simply the opposite scenario as FIG. 19A, where the user raised the temperature to $T_2$ at 1912 from the initial schedule temperature $T_1$ at 1910 and lined area 1915 represents energy usage or savings (nonusage) depending whether in heating or cooling mode. In heating mode, the scenario of FIG. 19B would result in net energy usage from the schedule (a negative area by convention), and in cooling mode a net energy savings from the schedule (a positive area by convention).

FIGS. 19C-D shows analogous models or characterizations for the Away state. Referring to FIG. 19C, Away state (Auto or Manual) is activated at $t_1$ and the thermostat controls the HVAC system to reduces the scheduled temperature $T_1$ (1916) to the Away-State-Temperature $T_2$ (1918) until time $t_2$ when the thermostat controls the HVAC system to raise the temperature to the new scheduled setpoint or a user manually input a setpoint temperature $T_2$ (1920). Like the previous scenario of FIGS. 19A-B, the crosshatched and lined areas (1923 and 1924 respectively) of FIGS. 19C-D, as calculated by equations 1922, represent a model or characterization of the Away state contributor or agent. It will be appreciated that virtually never will the Away state result in net energy use, although it is possible if a user sets the AST to values that do not make much sense from an energy savings perspective.

Figure 20:
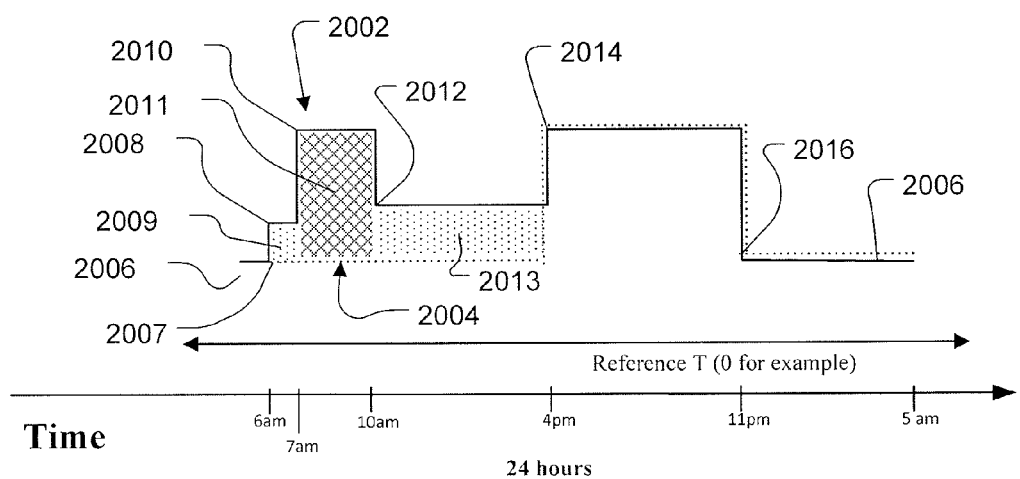
FIG. 20 illustrates characterizing an effort needed by the HVAC system to maintain the difference between two different schedules over a period of time.

FIG. 20 depicts embodiments of models or characterizations of changes-to-the-schedule contributor and frequent manual-changes-to-the-setpoint contributor as a potential sources of energy usage or nonusage. User manual changes to the schedule may take place frequently where the user essentially overrides the schedule, thereby making the schedule essentially superfluous. For the purpose of this discussion, differences between schedule 2002 (solid line) and schedule 2004 (dashed line) reflects a permanent schedule change for the time period, in this case 24 hours, or this could be the daily schedule for a calendar month. There will be energy usage consequences by virtue of the changes, if any, in set point temperatures between the schedules. For the purpose of this discussion solid line 2002 will be considered the schedule for every calendar day in a calendar day month period, and dashed line 2004 will be considered the schedule for every calendar day in a subsequent calendar schedule with the same number of days in the calendar month. This implies that the user has changed the schedule on the thermostat or on a device in communication with the thermostat for the daily schedule between months.

Referring again to FIG. 20, at 5 am the schedule temperature 2006 for both curves is the same, and therefore there is no difference between the schedules for the effort by the HVAC needed to achieve and maintain this temperature. At 6 am the schedule temperature 2007 for schedule 2004 remains the same, while that for schedule 2002 increases to temperature 2008 (schedule temp increase in preparation for family wake up, for example) until 7 am. This results in an increase of effort needed by the HVAC to maintain the new schedule temperature, represented by the shaded area 2009. At 7 am schedule temperature 2007 remains the same for schedule 2004, while that for schedule 2002 increases to temperature 2010 until 10 am (schedule temp increase as family prepares in the morning and ultimately leaves the house at 10 am, for example). The temperature increase for schedule 2012 results in an effort needed for that scheduled temperature as compared to itself for that hour (discussed previously with reference to FIG. 18), but would still require an HVAC effort, represented by cross-hatched area 2011, as compared to schedule 2004. At 10 am the temperature remains the same for schedule 2004 (at temp. 2007), while that for schedule 2002 decreases to temperature 2012 (temperature is decreased because the family has left the house, for example). This temperature decrease for schedule 2012 results in less HVAC effort needed to maintain schedule 2002, but would still require HVAC effort, represented by shaded area 2013, as compared to schedule 2004. At 4 pm both the schedules 2002 and 2004 increase the temperature to the same temperature 2014, where it remains the same until 11 pm at which time both schedules decrease to temperature 2016. Thus, from 4 pm until 6 am each schedule will have the same HVAC effort requirements to maintain the scheduled temperature. It will be appreciated that the sum of the of the areas 2009, 2011 and 2013 will represent reduced HVAC effort needed by schedule 2004 as compared to heat needed for schedule 2002, or conversely HVAC effort needed for schedule 2002 over schedule 2004.

As described above, the area under the temperature schedule represents the amount of effort required to maintain the temperature schedule over a particular time period, in this case 24 hours, or within sub-periods within the given 24 hour period as depicted by the differently shaded areas. The areas, in some embodiments, may be calculated relevant to some arbitrarily chosen reference temperature over the relevant time, which time period is the same for each schedule. As further explained below, this permits comparing the areas (i.e., efforts), and ultimately HVAC usage or nonusage over the time period as the reference temperature will simply subtract out from the comparison. The shaded areas in FIG. 20 represent such a comparison as well. In FIG. 20 the difference in the areas of schedule 2002 and schedule 2004 with respect to some arbitrarily chose reference temperature (zero degrees for example) is simply the sum of areas 2009, 2011, and 2013.

Once the desired contributors are modeled or characterized, a preferred embodiment for determining the estimated amount of HVAC usage or nonusage attributable to any particular contributor first determines whether a contributor is eligible for causing such estimated HVAC usage or nonusage. Whether a contributor is eligible is not an absolute in many situations, but rather it is determined if any particular contributor likely, under the given factual circumstances or inferred circumstances, contributed to HVAC energy usage or non-usage, or likely did not make such contribution. FIGS. 21-26 depict preferred embodiments for determining whether a contributor or agent is eligible for causing energy usage or nonusage is provided.

Figure 21:
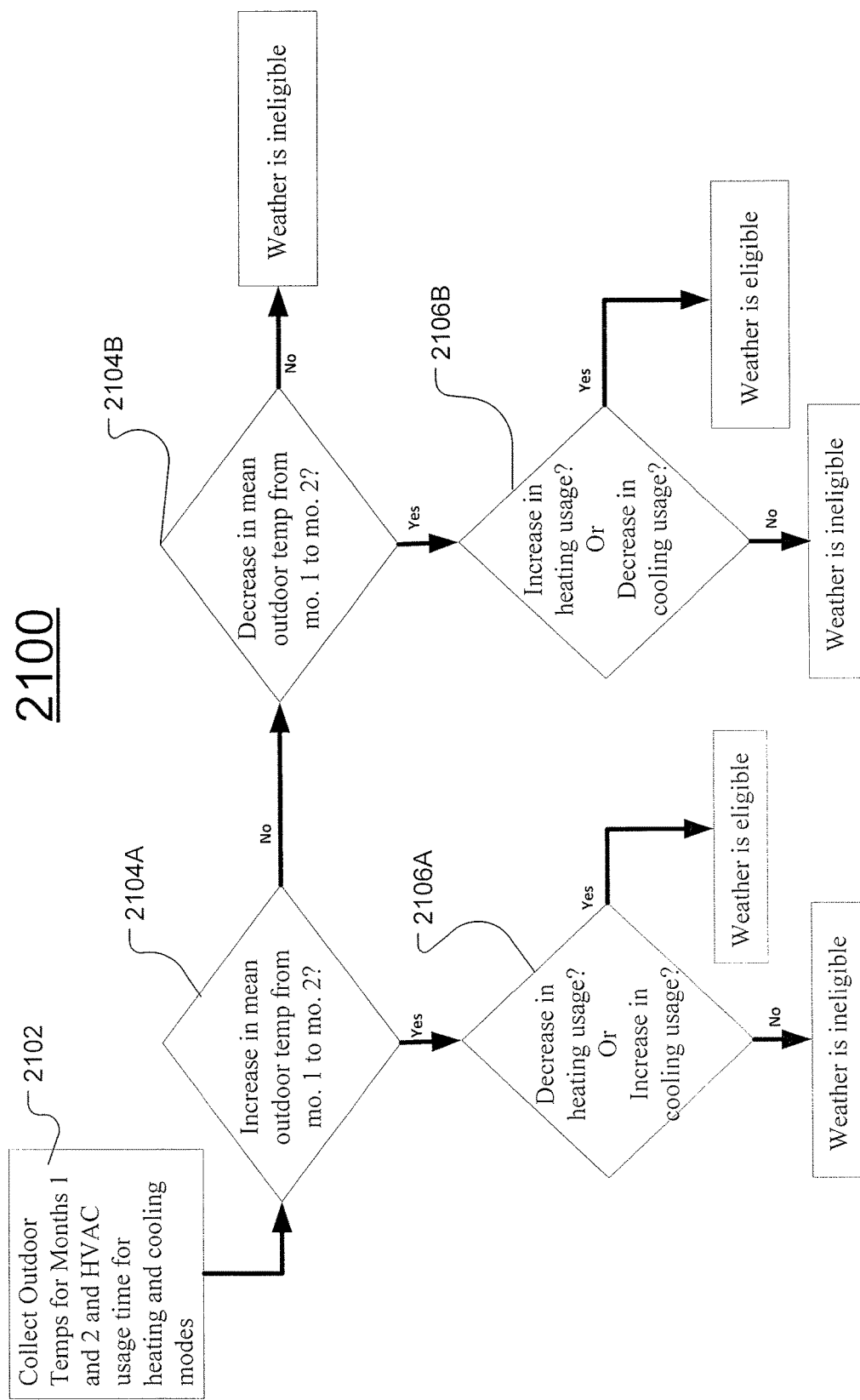
FIG. 21 illustrates an embodiment for determining if weather is eligible for causing HVAC usage or non-usage over a relevant time period.

FIG. 21 illustrates embodiment 2100 for determining if weather (e.g., changes in outdoor temperature or humidity, for example) is eligible for causing HVAC usage or nonusage over a relevant time period, a calendar or two calendar months for example. In step 2102 outside temperature data is collected, preferably by thermostat management servers 520 accessing weather data online for the zip code of a paired thermostat 110, for months 1 and 2. Also in step 2102 HVAC usage time for months 1 and 2 (or other selected time period) is collected for heating and cooling modes, either by the thermostat 110, the thermostat management servers 520 or other processor in communication with the thermostat. The actual usage time represents the amount of time the HVAC system was actually running during the relevant time periods, and whether it was heating or cooling (i.e., in the heat mode or cooling mode). Reference is made back to paragraph 0, where it discusses how the skilled artisan will fill in missing data for an analysis. At steps 2104A and 2104B it is determined if the mean outdoor temperature increased or decreased from month 1 to month 2, or over the chosen time period. If the answer is yes to either steps 2104A or 2104B, then in it is respectively determined in step 2106A (i.e., yes to 2104A) if there was a decrease in actual HVAC usage (heating) or increase in actual HVAC usage (cooling), or in step 2106B (i.e., yes to 2014B) if there was an increase in actual HVAC usage or decrease in actual HVAC usage (cooling). If the answer is yes to either steps 2106A or 2106B, as applicable, then weather will be considered eligible for causing such usage/nonusage. If the answer is no to either step 2106A or 2106B, as applicable, then weather will be considered ineligible and not considered as attributing to the HVAC usage/non-usage. If there is no change in mean temperatures (answer is no to steps 2104A and 2104B), then the weather is also ineligible. The rationale behind the weather eligibility determination is that if the mean outdoor temperature increases from month 1 to month 2, and there is a decrease in the HVAC heating usage or an increase in the HVAC cooling usage, then it makes sense that weather may be eligible as a cause for this known decrease or increase. Conversely, if there is a decrease in mean outdoor temperature from month 1 to month 2, and there is an increase in HVAC heating usage or a decrease in HVAC cooling usage, then it makes sense that the weather may be eligible as a cause of the known increase or decrease.

Figure 22:
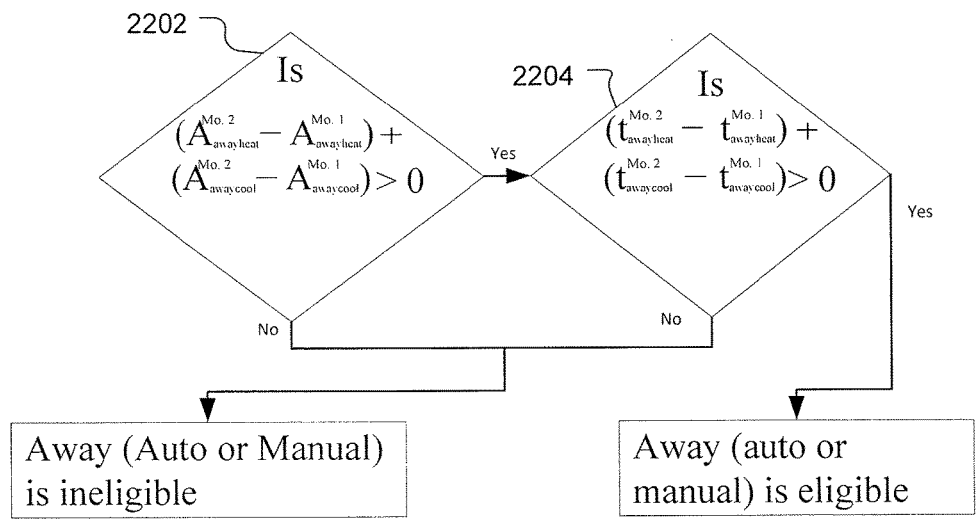
FIG. 22 illustrates a exemplary process for determining the eligibility of the Away state causal agents towards energy usage by the HVAC system over a period of time.

FIG. 22 illustrates an embodiment 2200 for determining if the Away state (e.g., Auto-Away or Manual-Away) is eligible for causing HVAC usage or nonusage (typical outcome for Away state) over a relevant time period. Step 2202 sums the HVAC efforts (area 1923 of FIG. 19) needed to maintain a setpoint temperature over a period of time for an Away state for both the heating and cooling modes. The relevant areas representing the relevant efforts are calculated using equation 1922 of FIG. 19. The left side of the equation takes the difference between area representing reduced effort (as discussed with reference to FIG. 19) for month 2 and that for month 1. It will be appreciated that the area $A_{awayheat}^{Mo.2}$ represents the sum of all areas 1922 (FIG. 19) for month 2 and $A_{awayheat}^{Mo.1}$ represents the sum of all areas 1922 (FIG. 19) for month 2, and that the difference between the two characterizes the difference in effort needed by the HVAC in month 2 as compared to month 1 by virtue of the Away state when in heating mode, whether it be Manual Away or Auto-Away. The analogous areas are used to characterize the HVAC efforts for month 2 as compared to month 1 when the thermostat is in cooling mode. In step 2202, if the sum of the difference in areas for the Away state (either Manual or Auto) is greater than zero, then step 2204 determines if the sum of the difference between the time in heat mode and cooling mode between month 2 and month 1 is larger than zero. If both steps 2202 (decrease in HVAC effort required) and 2204 (increase of time in away mode) are true, then the Away State (Auto or Manual) contributor is eligible as a cause for attributing nonusage of the HVAC system to the total actual usage of the HVAC system in month 2 as compared to month 1. It will be noted that step 2202 does not even consider whether the Away State would result in a net energy usage, as this situation would be an anomaly. As will be discussed later, savings from Manual-Away are distinguished from savings from Auto-Away, though this distinction is a matter of choice.

Figure 23:
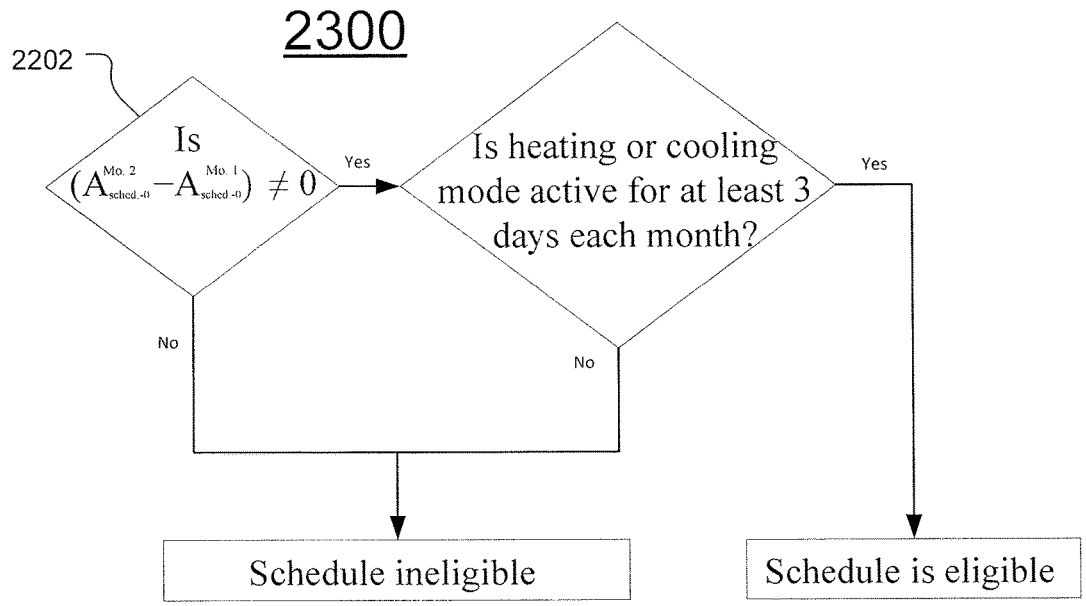
FIG. 23 illustrates an exemplary process for determining the eligibility of the temperature schedule causal agent towards energy usage by the HVAC system over a period of time.

FIG. 23 illustrates an embodiment 2300 for determining if the change-in-schedule contributor is eligible for causing HVAC usage or non-usage for the second time period as compared to the actual usage difference between the time periods. $A_{sched-0}$ represents the area under a schedule-temperature versus time curve, where the first temperature ($T_1$) in the difference $T_2-T_1$ is a reference temperature conveniently selected as zero, as described in reference to FIG. 20 herein. Therefore, the difference in the areas ($A_{sched-0}^{Mo.2} - A_{sched-0}^{Mo.1}$) will provide the difference in areas or needed HVAC effort between month 2 and month 1 for the respective schedules. If this difference is not equal to zero (step 2302) and there are at least 3 days in each month in either the heating or cooling mode (step 2304), then the change-in-schedule contributor will be eligible as a cause for attributing usage or non-usage of the HVAC system to the total actual usage or non-usage of the HVAC system in month 2 as compared to month 1, otherwise the schedule-contributor is ineligible. The rationale for requiring only 3 days in heating or cooling mode in either month is indicative that people are actually using the system (e.g., at home not on vacation), and there is a difference in the schedules resulting in eligibility of the schedule as causing usage or non-usage.

Figure 24:
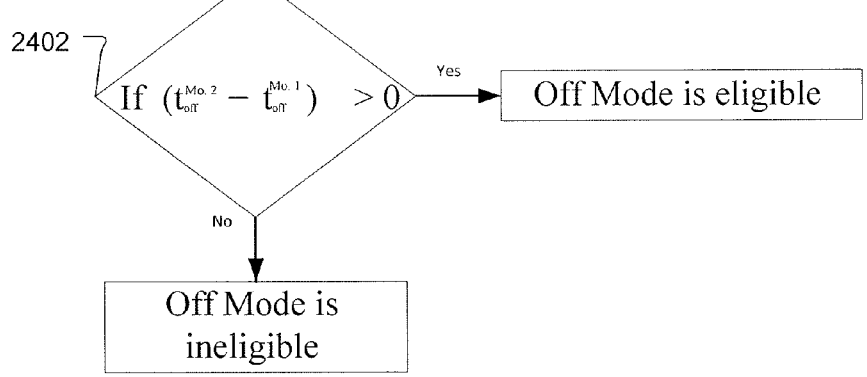
FIG. 24 illustrates an exemplary process for determining the eligibility of the off-mode causal agent towards energy usage by the HVAC system over a period of time.

FIG. 24 illustrates an embodiment 2400 for determining if the change in off-mode contributor is eligible for causing HVAC usage or non-usage for the second time period as compared to the actual HVAC usage difference between the time periods. The eligibility requirement in this embodiment 2402 simply determines if the difference between time in off mode from month 2 to month 1 is greater than zero. If step 2402 is true, it means that more time was spent in the off mode in the second time period, and thus the off mode would be eligible, and likely for causing non-usage of the HVAC system. If the difference is equal to or less than zero, then off mode is ineligible.

Figure 25:
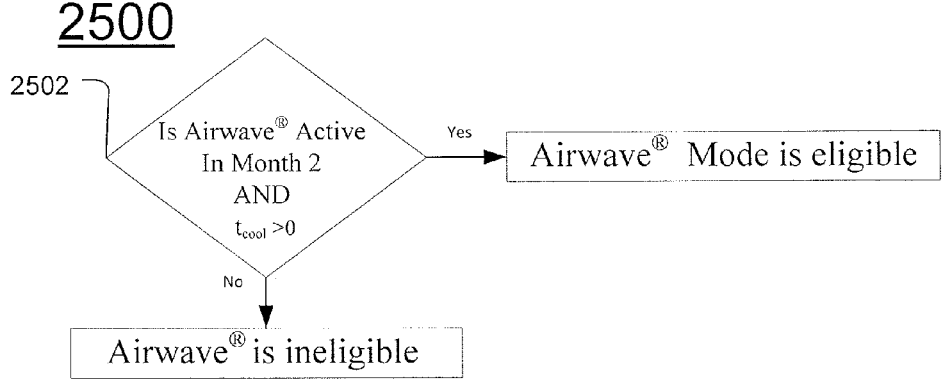
FIG. 25 illustrates an exemplary process for determining the eligibility of the calendar causal agent towards energy usage by the HVAC system over a period of time.

FIG. 25 illustrates an embodiment 2500 for determining if shutting down the air conditioning compressor in advance of reaching the setpoint temperature, an embodiment of which is known to the assignee of the present application as Airwave®, is eligible for causing non-usage of the HVAC system during a second time period as compared to the actual usage difference between the first and second time periods. An air-conditioning unit works on the principal of blowing unconditioned or warm air over cool coils where heat exchanges between the cool coils and unconditioned air, with heat flowing from the air to the coils. A compressor compresses gas inside the coils so that heat exchange may take place. Heat exchange occurs, at least in part, by evaporation of condensation on the coils. The concept of Airwave® is that the thermostat will shut the compressor off in advance of the ambient temperature reaching the setpoint temperature, but will continue to blow unconditioned air over the coils, which still have condensation on them. Continued evaporation of the remaining condensation will condition the air even after shutting down the compressor. Airwave is described with further detail in commonly assigned U.S. patent application Ser. No. 13/434,573 filed on Mar. 29, 2012, which is hereby incorporated herein by reference. Referring to step 2502, if Airwave® is active during the second time period (month 2) and the thermostat is in cooling mode during the second time period ($t_{cool}>0$) then Airwave® is eligible for causing HVAC non-usage for the second time period as compared to the actual HVAC usage difference between the time periods.

Figure 26:
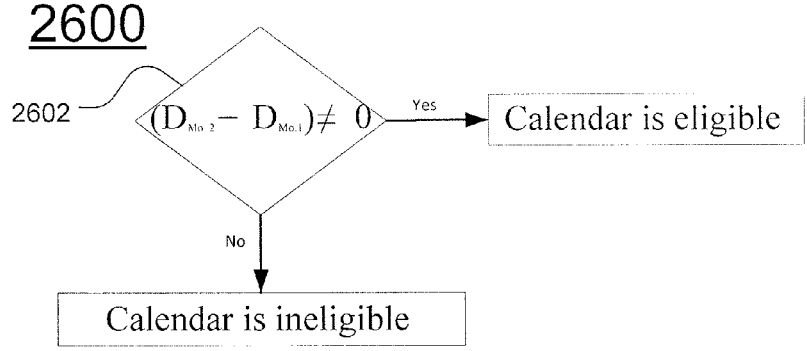
FIG. 26 illustrates an embodiment for determining if the time period is eligible for causing usage or non-usage of the HVAC system for the second time period as compared to the actual usage difference between the time periods.

FIG. 26 illustrates an embodiment 2600 for determining if the time period, e.g., the calendar, is eligible for causing usage or non-usage of the HVAC system for the second time period as compared to the actual usage difference between the time periods. Eligibility is determined by simply calculating if there is any difference between the time periods (e.g., January to February), and if so then the calendar is eligible and if not the calendar is ineligible.

The skilled artisan will appreciate there are other contributors that may result in more or less usage of the HVAC system to achieve a desired comfort level within an enclosure. Those provided above are merely exemplary and provided by way of example not limitation. Following determination of whether a contributor or agent is eligible as causing usage or non-usage, embodiments in accordance with the present invention determine or quantitate an estimated amount of HVAC usage or non-usage attributable to the contributor or agent as compared to the actual HVAC usage during a time period. In a preferred embodiment, run time and estimated run time are used as surrogates for energy or estimated energy usage, although other units of measure could be used such as and without limitation calories, joules or watts. Further, in this preferred embodiment a comparison of the estimated run-time and actual run time is done over two time periods, preferably calendar months.

Figure 27A:
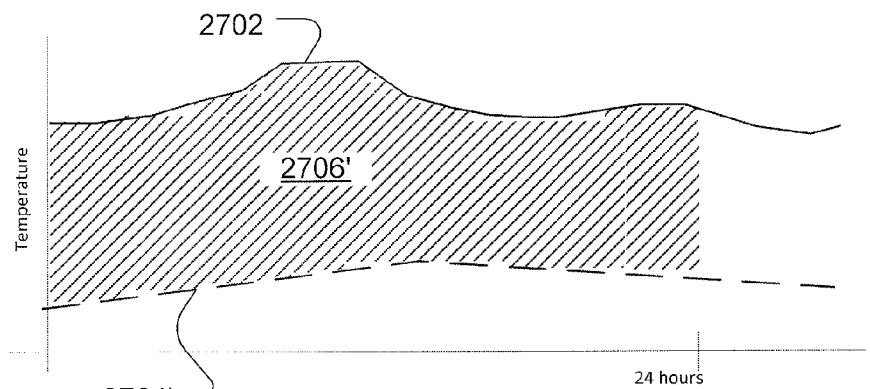
FIGS. 27A-B illustrate the empirical process for determining the heat and cool slopes.
Figure 27B:
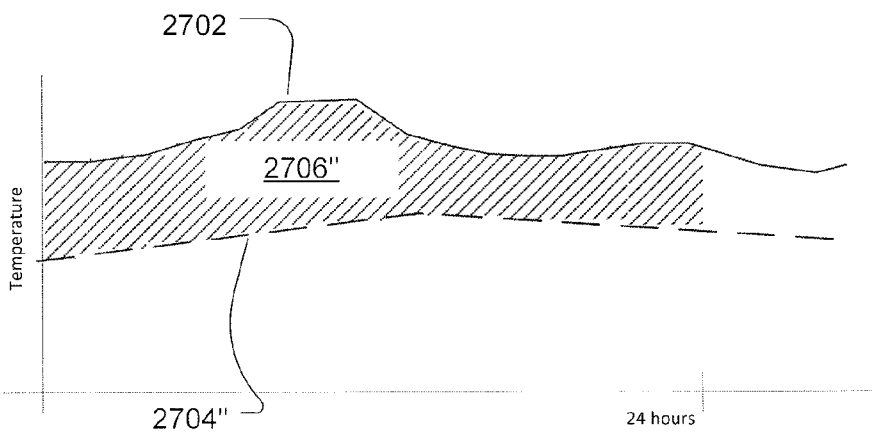

In order to convert models of the contributors to estimated energy usage or non-usage attributed to the contributors or agents, a preferred embodiment uses empirically determined factors referred to herein as heat-slope and cool-slope. A description of the heat-slope will be provided, where the skilled artisan will readily appreciate how to determine the cool-slope from the description of heat-slope. Heat-slope is, generally speaking, a measure of how much heat leaks out of an enclosure over time. Referring to FIGS. 27A-B, plot 2702 represents a plot of setpoint indoor temperatures (e.g., a schedule) for an enclosure having an HVAC controlled by a programmable thermostat 110. Although plot 2702 is not a plot of ambient indoor temperatures, over the depicted 24 hour period it is a reasonable approximation of the ambient temperature of the enclosure (at least in the vicinity of the temperature sensor used by the thermostat). For the purpose of this discussion it will be assumed that plot 2702 is a schedule of setpoint temperatures, which will remain unchanged from day to day over many months. It will be appreciated that this assumption is being made for purposes of explanation and not by way of limiting how heat slope is empirically determined. Plot 2704' represents the outdoor temperature over a 24 hour period for the first day of the month (FIG. 27A), which information may be gained by access to weather information over the internet for the zip code of the thermostat paired with the thermostat management servers 520, as described above. Plot 2704" (FIG. 27B) represent the outdoor temperature over a 24 hour period for the second day, where plots for other days are not provided. It is noted that outdoor temperature profiles are not provided for each day of the month, and that the same profile is provided with varying high and low temperatures for ease of explanation and preparation.

It will be appreciated that a certain amount of HVAC effort or, alternatively stated, an amount of HVAC actual run-time or usage time will be required to maintain the enclosure at the desired or scheduled ambient indoor temperatures (2702), and that the amount of effort or run-time will depend on the magnitude of the difference between outdoor temperatures and desired setpoint temperatures. The larger the difference between the outdoor and scheduled indoor temperatures will require larger efforts or more HVAC system run-time to achieve the scheduled indoor temperatures, represented by the area 2706' and 2706" for the two different days depicted. It has been empirically determined that plotting actual HVAC run-time in a 24 hour period needed to achieve the desired setpoint temperature schedule as a function of the area between the setpoint schedule and the outdoor temperature profile over time (referenced as area 2706' and 2706") results in a data distribution that is adequately approximated by a linear fit of the data.

Figure 28:
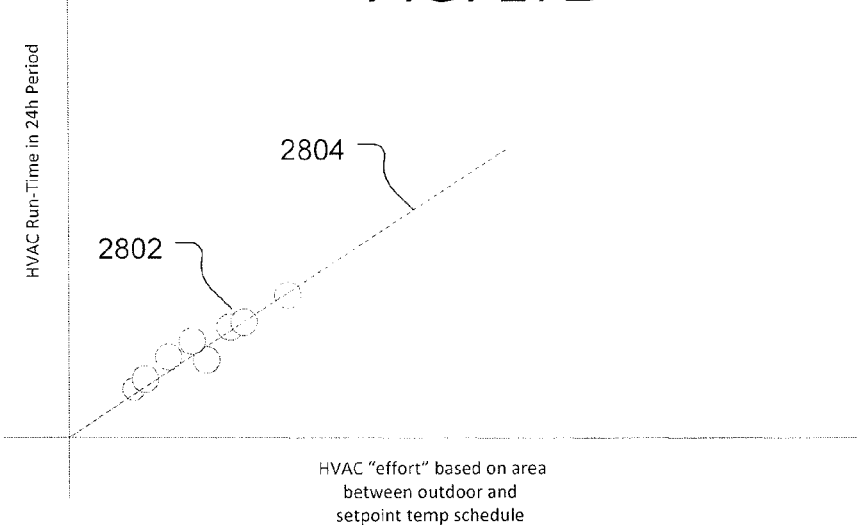
FIG. 28 illustrates the empirical process for determining the heat and cool slopes.

FIG. 28 depicts hypothetical data points 2802, each point representing run-time for a 24 hour period (vertical axis) and the area between indoor and outdoor temperatures over time or the effort needed to maintain the desired setpoint temperature (horizontal axis). This empirical data is fit to a linear curve 2804, which has a slope referred to herein as the heat-slope. The units of the heat-slope (or cool-slope) are best described as $$\frac{\text{HVAC Usage Time (time)}}{\text{Effort or Area (deg.} \cdot \text{time)}}.$$

It should now be appreciated that multiplying an estimated effort needed or saved with units of (deg.·time) by the heat-slope will result in an estimated HVAC usage time to satisfy that estimated effort. The heat-slope can generally be considered as a measure of how 'leaky' an enclosure is with respect to heat. Because it is empirically determined and likely changes over time, it is preferred to obtain new data points and update the heat-slope determination over time, as will be appreciated by the skilled artisan. If a thermostat has recently been installed and insufficient data are available to calculate the heat-slope for the enclosure, an analysis of the average heat-slopes of many different enclosures has been calculated as $$1800 \frac{\text{usage sec.}}{\text{deg. C.-day}} \text{ and}$$

$$-1800 \frac{\text{usage sec.}}{\text{deg. C.-day}}$$

for the cool-slope, which can be used as a default until sufficient data exist to calculate the heat-slope and cool-slope.

Referring to FIGS. 29-35, heat-slope (and cool-slope) is used in combination with all or part of the models of the eligible contributors to quantify the estimated HVAC usage or estimated HVAC run time for each eligible contributor (step 1808 of FIG. 18), which is attributable to the actual HVAC usage or decrease in usage (also referred to herein as non-usage). The model of the contributor results in an approximate effort needed or conserved to accommodate or accomplish some change to the system (e.g., Away State activated, user manually adjusts the temperature setpoint, outside temperature fluctuations etc.).

Figure 29:
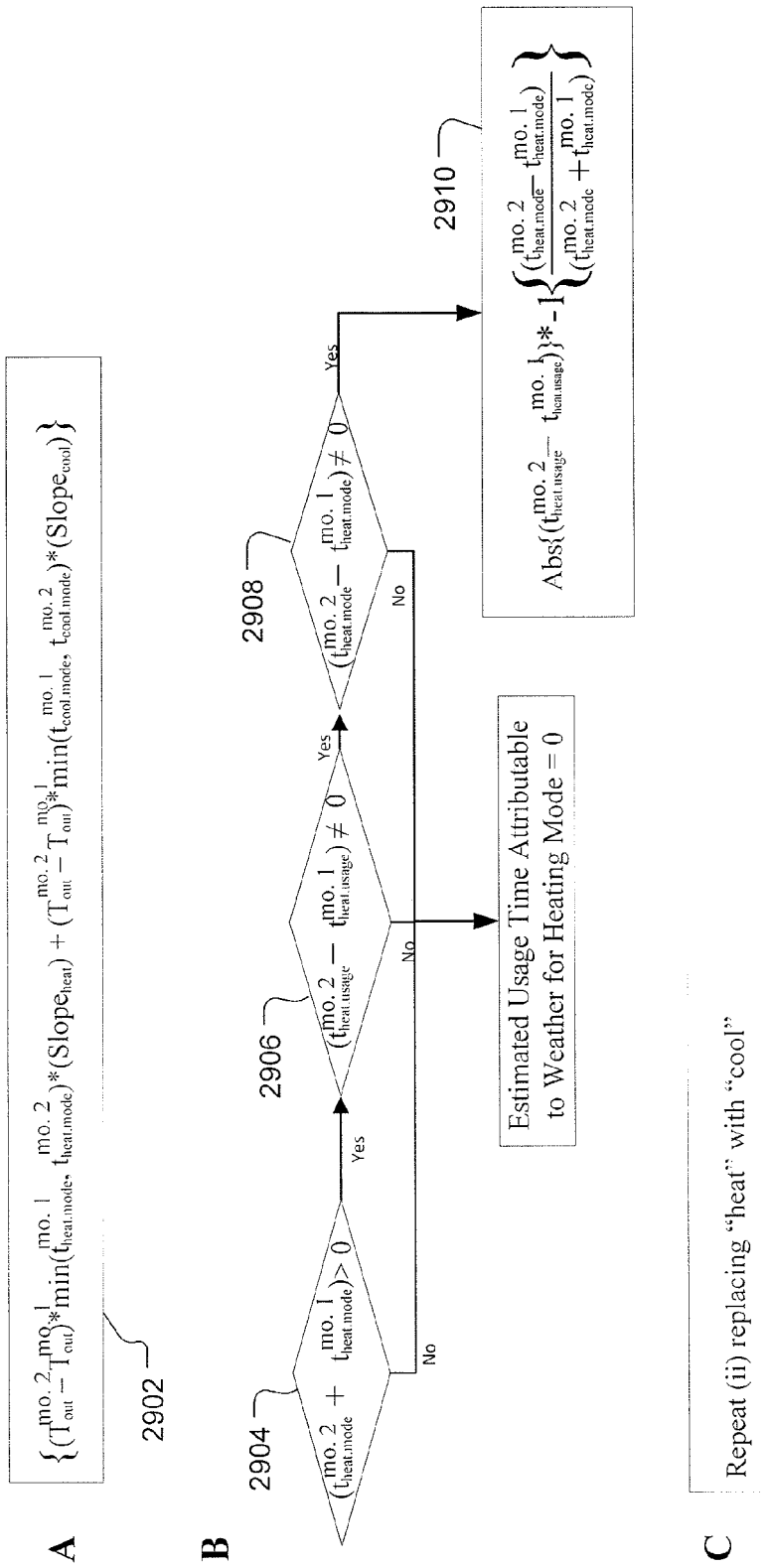
FIG. 29 is a flow diagram for an exemplary process to determine the estimated HVAC run time attributable to weather over a period of time.

FIG. 29 depicts a preferred embodiment to quantify the estimated HVAC usage or non-usage time as a result of weather, if eligible. In this preferred embodiment estimated usages from A, B and C are summed together to determine an estimated usage or non-usage of the HVAC system attributable to weather for a second month of two months. It will be appreciated that any convenient period of time may be selected for the analysis. For step 2902 (FIG. 29) the difference of the mean outside temperature between months 1 and 2 is multiplied by the minimum of either the amount of time the thermostat was in heating mode for month 1 or month 2. If the thermostat was in heating mode for 500 hours in month 2 and 450 hours in month 1, the temperature difference would be multiplied by 450 hours, where the product is an estimated effort needed to account for the temperature difference between months for those 450 hours.

This estimated effort is then multiplied by the heat-slope to get an estimated usage or non-usage time attributable to the change in the outdoor temperature. An analogous calculation is done for cooling using the cool-slope, and the results are summed together.

Step 2902 accounts for the impact of weather for 450 hours, which amount of time is common between both months. There is an additional 50 hours in the heating mode, in the given example, which may also have impacted the HVAC usage during the time periods of concern. The method depicted in FIG. 28B and the cooling analog of FIG. 28C is used to address additional non-overlapping time in a particular mode (heating/cooling), although only FIG. 28B will be discussed as the same analysis will apply for FIG. 28C.

Step 2904 is a threshold determination, i.e., whether the sum of the time in heat mode from both months is greater than zero. As long as the thermostat was in heat mode for either month this condition would be true, and if not true then the weather could not account for any HVAC usage or nonusage for heating. The same would be the case for cooling, and if both are zero, then weather will contribute zero estimated HVAC usage time, which makes sense, and step 2902 would result in zero as well. In step 2906, the difference in actual HVAC run- or usage-time in the heating mode from month 2 to month 1 is determined, and if not equal to zero step 2908 is executed; if it is zero then weather will account for zero estimated HVAC usage time for heating mode. In step 2908 a difference of time in the heat mode between months 1 and 2 is determined, and if not zero then step 2910 is executed, and if zero the then there is no overlap time in the heating mode and the usage or non-usage attributable to the heating mode would be zero for the non-overlapping time. In step 2910 an additional estimated usage or non-usage time for the heating mode attributable to weather is determined. The absolute value of the difference in the actual HVAC usage time in heat mode between the two months is calculated. This value is multiplied by the ratio of the difference in time in the heat mode over the sum of the time in the heat mode for the two months. This has the affect of accounting for the time beyond the overlap in the heat mode between the two months by averaging that difference over the total time in heat mode in the two months and multiplying this ratio by the magnitude of the difference between actual usage in the heat mode over the two months. If the time in heat mode for month 2 is larger than month 1 it would indicate that more heat was used in month two and the resulting product should be negative under the adopted sign convention (positive is savings, negative is usage), thus the product is multiplied by negative one. The same determination is done for the cooling mode and the results from A, B, and C are summed together to provide an estimated usage (negative time) or non-usage (positive time) attributed to the actual usage or decrease in usage (also referred to herein as non-usage) by the HVAC system between months 1 and 2.

FIGS. 30 and 31 depict equations for quantifying the estimated usage or non-usage of the HVAC system for month 2 as compared to month. Calculation of the areas, e.g., $A_{autoawayheat}^{Mo.2}$, for the equation in FIGS. 30 and 31 are discussed above with reference to FIG. 19. It will be appreciated that the area 1923 in FIG. 19 represents an estimated effort saved as a result of the thermostat going into the Away state, which area has units of deg.·time and is the same area or estimated effort used in these equations, except that all the individual areas as discussed with reference to FIG. 19 are summed together over the applicable time period to proved the areas shown in FIGS. 30-31. The equations of FIGS. 30 and 31 determine the difference between the areas for Auto-Away and Manual-Away for month 1 and month 2, which difference is multiplied by the applicable slope (heat or cool) resulting in an estimated HVAC usage or non-usage resulting from the change in the Away states (Auto and Manual) between months 1 and 2.

FIG. 32 depicts an equation for quantifying the estimated usage or non-usage of the HVAC system as a result of a user changing the schedule of setpoint temperatures. An analogous equation for quantifying the estimated usage or non-usage of the HVAC system as a result of a user manually changing the setpoint temperatures is provided in FIG. 33. As will be appreciated, and in light of the eligibility discussion above, the equation of FIG. 33 will be used only when a user manually adjusts the setpoint temperatures on a frequent basis as though no schedule had been entered. As described with reference to FIG. 20, the areas for these equations are calculated relevant to a reference temperature (e.g., 0 degrees). The ratio of the area (an integration of the schedule temperature over the time period) divided by the time in the mode (heating or cooling) is a weighted average schedule temperature for the time period. For the equation of FIG. 33, the area is divided by the time the system is in heating mode under a manually directed setpoint. The equation of FIGS. 32 and 33 take the difference between the weighted average schedule temperatures (manually set temperatures in FIG. 33) of months 1 and 2 and multiplies it by the time in heat (or cool) mode (manually controlled heat mode in FIG. 33) for the time period. The result will estimate the amount of effort needed or saved as a result of the change in schedule, which is then multiplied by the applicable slope to arrive at an estimated HVAC usage or non-usage needed to achieve the estimated effort.

FIG. 34 depicts an equation for quantifying the estimated usage or non-usage of the HVAC system as a result of the user setting the thermostat to the off mode. The equation takes the difference of times in the off-mode between time periods, and divides the difference by the sum of all the time in the other two modes for both time periods. This operation effectively normalizes the difference in off mode over the two time periods. This ratio is then multiplied by the sum of all the time the HVAC is actually running for both time periods, whether in cooling or heating mode. The affect is multiplying the normalized time difference in the off mode by the actual usage.

FIG. 35 depicts an equation for quantifying the estimated usage or nonusage of the HVAC system resulting from a difference in time between the time periods, a difference in the days between calendar months for this discussion. Similar to the equation of FIG. 34, the equation of FIG. 35 takes the difference of days between the months, and divides the difference by the sum of all the time in both time periods. This operation normalizes the difference in days over the two months. This normalized time difference is then multiplied by the sum of all the time the HVAC is actually running for both time periods, whether in cooling or heating mode, resulting in an estimated usage or non-usage of the HVAC system as a result in a change in days between the two months.

Quantifying the estimated non-usage resulting from Airwave® will be the time Airwave® is actually in use for any given month. This time, as will be appreciated, is not really an estimate as the time the HVAC system did not run as a result of Airwave® is directly attributable to the amount of time that Airwave® was active for any given time period. It will be appreciated that processes other than Airwave® may be used to achieve this purpose and the amount of estimated time attributable to use of these other processes will be known to the skilled artisan.

In a preferred embodiment, a so-called 'sanity' check will be performed on the quantified estimated HVAC usage and non-usage values to ensure the magnitude and sign (saving or using energy) of the numbers make sense when considering various factual circumstances. FIG. 36 depicts a process 3600 for scaling the estimated HVAC usage/nonusage estimates. If condition 3602 is true, all the estimated HVAC usage/nonusage values are scaled by the ratio of the actual HVAC usage difference (equation 3603) divided by the sum of all the eligible estimated HVAC usage and nonusage values. This scaling has the effect that the sum of all the scaled estimated usages and nonusages will equal the actual HVAC usage/nonusage difference, thereby avoiding reporting estimated HVAC usage/nonusage that exceeds the actual HVAC usage/nonusage. It is noted that not all estimated HVAC usage and nonusage values are scalable. For example estimated HVAC usage/nonusage attributable to weather is not scalable, and likewise those for Airwave® and calendar. If condition 3604 is false process 3600 sets the scaling factor to 1. If condition 3604 is false, it means that the sign of the sum of all the non-scaled estimated HVAC usage and nonusage values is different than the sign of the difference in actual usage (equation 3603). This situation would mean that one of the numbers indicates an energy savings in total, while the other indicates energy usage, not a tenable scenario from a macro perspective. In this latter situation the estimated HVAC usage and nonusage numbers are considered using other processes to determine if they individually make sense, and for those that do not that they are ignored and not reported, or alternatively aborting the process altogether because the numbers simply do not make sense.

Following the initial scaling of the estimated HVAC usage/nonusage values, additional scaling is performed using process 3650 of FIG. 36 in order to avoid reporting excessively large numbers for the estimated HVAC usage/nonusage values. In step 3651 Max_Usage is defined as the smallest value (negative values included) of all the scaled estimated HVAC usage/nonusage values, which will likely be a negative number because of the adopted sign convention. Max_NonUsage, also defined in step 3651, is the maximum value of all the scaled estimated HVAC usage/nonusage values, which will likely be a positive value because of the adopted sign convention. In step 3652, if the difference in actual usage ($\Delta_{Usage}$ from equation 3603) between the two months is greater than zero (a net energy usage in month 2 as compared to month 1) and the Max_Usage (lowest negative value is the largest estimated HVAC usage value) is less than $-1.9 \times \Delta_{Usage}$, then the second scaling factor is $-1.9$ times the ratio of $\Delta_{Usage}$ divided by the Max_Usage value. This ensures that the reported re-scaled estimated HVAC usage numbers, when there is an increase in actual usage ($\Delta_{Usage} > 0$), stay within a reasonable value when the direction of the actual usage difference (positive for energy use) and the largest estimated usage/nonusage value are going in the same direction (energy usage in this case). The same analysis applies to the scaling of process 3650 at step 3654, when $\Delta_{Usage} < 0$ (reflecting an actual net savings of energy or less usage in the second month) and the Max_NonUsage value is greater than $-1.9$ times $\Delta_{Usage}$ (product is positive). When actual energy usage or nonusage (savings) and estimated HVAC usage values trend in the same direction (usage or nonusage, as the case may be), steps 3652 and 3654 ensure that the largest (in magnitude) reported estimated HVAC usage or nonusage (step 3652 and step 3654 respectively) is no more than 1.9 times the increase or decrease (step 3652 and step 3654 respectively) in actual usage ($\Delta_{Usage}$) for the reporting period (month 2).

Steps 3656 and 3658 attempt to address the situation when the actual energy usage or nonusage and the estimated HVAC usage/nonusage values trend in opposite directions. In step 3656 (if the condition is true), the actual usage difference $\Delta_{Usage}$ is less than zero (decreased usage) and the Max_Usage is less than $\Delta_{Usage}$ (largest estimated HVAC use is larger in magnitude than the actual decreased usage) indicating the largest estimated HVAC usage trends opposite of the actual change in HVAC usage. The scale used if the condition of step 3656 is true, is the $\Delta_{Usage}$ divided by the largest estimated usage, ensuring that that scaling of the already scaled estimated HVAC usage/nonusage numbers does not exceed the actual change in usage in magnitude. Step 3658 is an analogous situation where $\Delta_{Usage}$ is greater than zero (increased actual HVAC usage) and the Max_NonUsage is smaller than $\Delta_{Usage}$ such that the magnitude of maximum estimated HVAC nonusage exceeds the magnitude of the actual change in usage, but indicating that estimated HVAC usage/nonusage and the actual change in usage trend in opposite directions, as was the situation above. In this case the scale is set as $\Delta_{Usage}$ divided by the Max_NonUsage usage/nonusage values, ensuring that scaling of the already scaled estimated HVAC usage/nonusage values does not exceed the actual change in usage in magnitude. Generally, the scaling process ensures the reported and scaled estimated HVAC usage/nonusage values stay within 1 to 2 times the actual HVAC usage for month 2. It is in this manner that reporting of absurdly large numbers is avoided. As discussed above, process 3650 rescales the already scaled estimated HVAC usage/nonusage values in order to avoid reporting values that make no sense with respect to the actual data, in particular the actual change in HVAC usage from month 1 to month 2.

Figure 37:
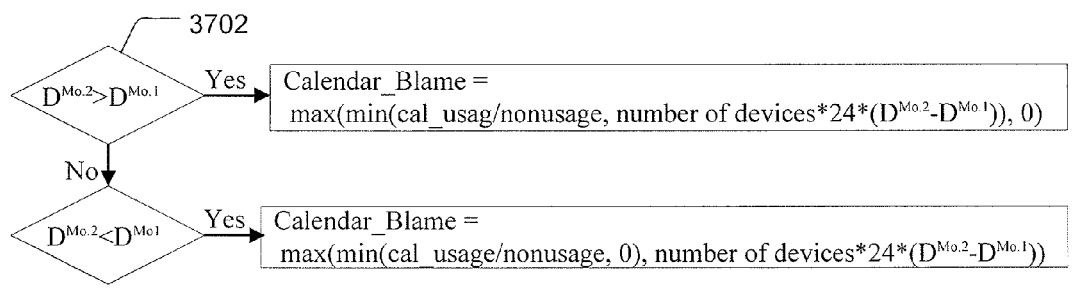
FIG. 37 is an exemplary process flow to cap the estimated HVAC run time for the calendar causal agent to have it make sense as compared to the actual HVAC run time.

Quantifying the estimated HVAC usage/nonusage attributable to a difference in days between month 1 and month 2 was discussed in reference to FIG. 35 above. This calendar attributable usage/nonusage is not amenable to scaling in the manner just describe. Referring to FIG. 37 a preferred process 3700 is provided to ensure the estimated usage/nonusage attributable to a difference in the days in month 1 and month 2 does not result in nonsensical numbers, and is capped at a maximum number to avoid such a situation. For example, if the two months differ by one day, then the estimated HVAC usage/nonusage attributable to the calendar difference may not be more than 24 hours. "Number of devices" refers to the number of programmable thermostats in the enclosure, and cal usage/nonusage is the value of the estimated usage/nonusage attributable to the difference in the days of in the month 1 and month 2.

Despite the efforts to avoid reporting numbers that don't make sense described above there may be residual estimated HVAC usage/nonusage amounts. That is the sum of the scaled HVAC usage/nonusage amounts likely do not equal $\Delta_{Usage}$. In some cases the two numbers may be way off, and in many, maybe most the numbers are reasonably close but the difference cannot or should not be ignored as a user reviewing the report would likely notice the discrepancies. One embodiment for addressing the residuals issue is to determine if the residuals are small enough to lump into the estimated HVAC usage/nonusage attributable to the weather. For example and not by way of limitation, if (presuming weather is eligible) the absolute value of the residual ($=\Delta_{Usage}$-sum of scaled estimated HVAC usage/nonusage values) is larger than the absolute value of $0.2*\Delta_{Usage}$, then the adjusted estimated HVAC usage/nonusage attributable to the weather will be $\Delta_{Usage}$-sum of all estimated HVAC usage/nonusage values except that attributable to weather. If the residual is larger than abs($0.2*\Delta_{Usage}$) this would be an invariant and would need to be investigated, and no report will be generated.

Referring back to FIG. 18, after scaling the quantified estimated HVAC usage/nonusage values at step 1810 and as just described above with reference to FIGS. 36-37, the estimated HVAC usage/nonusage values attributable to the eligible contributors or agents are ranked in order of their magnitude from largest to smallest. Values less than 5% of $\Delta_{Usage}$ are discarded as being insignificant. A report is generated at step 1814, which report may include the difference between month 1 and month 2 the HVAC actually ran ($\Delta_{Usage}$), which can be determined using data collected by the thermostat and communicated and/or transmitted to thermostat management server 520 paired with the thermostat. Additionally the report may include hints on how to reduce HVAC usage and therefore conserve energy, actual HVAC run time for the two time periods. The reports may be displayed on any computing device (e.g., computer, tablet, mobile phone etc.) with access to the web and/or in communication with the thermostat and the thermostat management servers 520. The reports may also be emailed as pdf or other image formats known to the skilled artisan.

Figure 38:
FIG. 38 depicts an exemplary report providing ranked estimated HVAC run time attributable to three causal agents.

FIG. 38 provide an example of an emailed Energy Report 3800 from Nest Labs Inc. of Palo Alto Calif. sent to users/owners of the Nest® programmable thermostat. In this example a company logo 3802 is provided, a report date, the owner of the Nest® and location of the Nest®, all referenced by 3804. 3805 references a total amount of used hours more this month than last (i.e., $\Delta_{Usage}$), a bar 3806 representing actual HVAC run-time in November and a bar 3808 representing actual HVAC run-time in December. The next section 3810 provides icons depicting a reason (weather 3812, Manual-Away 3814, and Auto-Away 3816. Below each icon is the estimated number of hours the HVAC used or ran as a result of the contributor or agent (weather, Manual-Away, and Auto-Away) in ranked order. The next section 3818 provides a tip to save energy, and below that the number of Leafs the user earned during the month.

As will be appreciated the embodiments described herein for generating a report from metrics and data used to characterize contributors or agents causing HVAC usage may use a single time period as opposed to the multiple time periods used to facilitate the description. An example of a single time period embodiment may use contributors, models, eligibility, estimated usage/non-usage for the eligible contributors or agents, determine the estimated HVAC energy (time or actual energy metrics) attributable to each of the contributors and compare this against the actual usage for the single time period, which estimates and actual usage can be reported as time units (a good metric for energy for the HVAC system) or any other appropriate units known to the skilled artisan (e.g., joules, calories, watts etc.).

According to some embodiments a method is described for encouraging a user to adopt energy saving thermostat settings. The method includes receiving user input indicating that the user wishes to change a temperature setting on the thermostat; interactively displaying graphical information, such as a symbol, to a user when the user has Various modifications may be made without departing from the spirit and scope of the invention. Accordingly, the invention is not limited to the above-described embodiments, but instead is defined by the appended claims in light of their full scope of equivalents.

What is claimed is:

1. A method for characterizing the operation of an HVAC system controlled by an HVAC controller, the method comprising:
   registering, using a registration server and the HVAC controller, the HVAC controller by pairing it with a management account;
   receiving, by a management account server from the HVAC controller, first historical data representative of actual HVAC usage by said HVAC system for each of a first historical time interval and a second historical time interval, wherein the HVAC controller is paired with the management account maintained by the management account server;
   processing said first historical data to determine an HVAC usage difference between said first historical time interval and said second historical time interval;
   receiving second historical data representative of at least two parameters characterizing a preselected plurality of causative agents over each of said first and second historical time intervals, each said causative agent being known to at least partially influence HVAC usage by said HVAC system, wherein:
      the plurality of causative agents is selected from the group consisting of weather, temperature schedule, occupancy, manual temperature settings, and time differences between said first historical time interval and said second historical time interval;
   processing said first and second historical data to generate, for each said causative agent, a causative agent model that characterizes a relationship between said one or more causative agent parameters and an associated HVAC usage estimate of said HVAC system;
   processing said second historical data in conjunction with said plurality of causative agent models to compute a relative contribution of each of said causative agents toward said HVAC usage difference between said first and second historical time intervals;
   generating an energy usage report that includes at least (i) said HVAC usage difference between said first and second historical time intervals, and (ii) an attribution of a primary causative agent from said plurality of causative agents as a primary reason for said HVAC usage difference, wherein said primary causative agent has the highest relative contribution from said plurality of causative agents toward said HVAC usage difference;
   accessing, by an access client executed by a remote computerized device, the management account paired with the HVAC controller; and
   providing, by the access client executed by the remote computerized device, the energy usage report that includes at least (i) said HVAC usage difference between said first and second historical time intervals, and (ii) the attribution of the primary causative agent from said plurality of causative agents as a primary reason for said HVAC usage difference.

2. The method according claim 1, wherein said processing said second historical data step further comprises:
   processing said second historical data in conjunction with said plurality of causative agent models, a heat slope and a cool slope to compute said associated HVAC usage estimate for each of said plurality of causative agents toward said HVAC usage difference between said first and second historical time intervals.

3. The method according claim 1, wherein said first historical time period and said second historical time period are calendar months.

4. The method according claim 1, wherein said energy usage report further includes said associated HVAC usage estimate for at least said primary causative agent.

5. The method according to claim 4, wherein said energy usage report further includes at least one icon indicative of said primary causative agent.

6. The method according to claim 4, wherein said energy usage report further includes at least one tip on how to adjust said HVAC controller to result in future energy savings.

7. A method for generating an energy usage report for an HVAC system controlled by a programmable thermostat, the method comprising:
registering the programmable thermostat by pairing it with a management account using a registration server;
gathering, by a management account server, data on a plurality of metrics related to energy consumption by said HVAC system during a time period from the programmable thermostat;
modeling a plurality of candidate contributors using data on said plurality of metrics for said time period to form a plurality of candidate models, wherein:
at least one of said plurality of candidate contributors is potentially qualified for causing usage or non-usage of said HVAC system during said time period; and
the plurality of candidate contributors comprises: weather, temperature schedule, occupancy, and manual temperature settings;
determining qualified candidate contributors from each of said plurality of candidate models, wherein said qualified candidate contributors are attributed to cause usage or non-usage of said HVAC system during said time period;
quantifying an estimated HVAC usage or non-usage during said time period for at least one of said qualified candidate contributors from at least one of said plurality of candidate models;
accessing, by an access client executed by a remote computerized device, the management account paired with the HVAC controller; and
providing, by the access client executed by the remote computerized device, at least said estimated HVAC usage or non-usage for said at least one qualified candidate contributor on said energy usage report.

8. The method according to claim 7, wherein said estimated HVAC usage or non-usage is measured in units of time.

9. The method according to claim 7, wherein said estimated HVAC usage or non-usage is measured in units of energy.

10. The method according to claim 8, wherein said time period comprises a first time period and a second time period subsequent to said first time period, said method further comprising:
computing a first run time of said HVAC system for said first time period and a second run time of said HVAC system for said second time period;
computing a run-time difference by subtracting said second run time from said first run time;
gathering a first data set on said plurality of metrics related to energy consumption by said HVAC system for said first time period;
gathering a second data set on said plurality of metrics related to energy consumption by said HVAC system for said second time period;
modeling said plurality of candidate contributors from said first data set to form a first plurality of candidate models and from said second data set to form a second plurality of candidate models for said second time period;
determining qualified candidate contributors from each of said plurality of candidate contributors, wherein said qualified candidate contributors likely cause usage or non-usage of said HVAC system in said second time period as compared to said first time period;
quantifying a first estimated HVAC usage or non-usage for said first time period, using said first plurality of candidate models, for at least one of said qualified candidate contributors, and a second estimated HVAC usage or non-usage for said second time period, using said second plurality of candidate models, for said at least one of said qualified candidate contributors;
computing at least one estimated usage or non-usage difference by subtracting said first estimated HVAC usage or non-usage for said at least one of said qualified candidate contributors from said second estimated HVAC usage or non-usage for said at least one of said qualified candidate contributors; and
reporting at least (i) said run-time difference and (ii) said at least one estimated usage difference for said at least one qualified candidate contributor on said energy usage report.

11. The method according to claim 10, wherein said quantifying step further comprises using a heat slope or cool slope to quantify said first estimated HVAC usage or non-usage and said second estimated HVAC usage or non-usage.

12. The method according to claim 10 further comprising:
ranking said at least one qualified candidate contributor in order of magnitude of said estimated usage difference for said at least one qualified candidate contributor;
wherein said reporting step further comprises reporting said estimated usage or non-usage for said at least one qualified candidate contributor in order of magnitude with a description for an attributed rationale for said estimated usage or non-usage for said at least one eligible contributor.

13. The method according to claim 12, wherein said reporting step further comprises reporting an icon with said estimated usage or non-usage for said at least one qualified candidate contributor, wherein said icon is indicative of said attributed rationale.

14. The method according to claim 12 further comprising reporting at least one tip on how to adjust said programmable thermostat to result in future energy savings.

15. The method according to claim 10, wherein said plurality of candidate contributors are selected from the group consisting of weather, away settings, schedule temperature settings, manual temperature settings, and difference between said first time period and said second time period.

16. The method according to claim 10 wherein said first time period is a calendar month and said second time period is a subsequent calendar month.

* * * * *